United States Patent
Allen et al.

(10) Patent No.: US 12,387,224 B2
(45) Date of Patent: Aug. 12, 2025

(54) OPERATIONAL EMISSIONS FRAMEWORK

(71) Applicant: Schlumberger Technology Corporation, Sugar Land, TX (US)

(72) Inventors: Marcos Allen, Rio de Janeiro (BR); Paul Bolchover, Beijing (CN); Kevin Andre Hermansen, Lysaker (NO); Ashley Bernard Johnson, Cambridge (GB); Diego Medina, Beijing (CN); Aleksandr Nifantov, Dubai (UA); Chaobo Qi, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 329 days.

(21) Appl. No.: 17/664,111

(22) Filed: May 19, 2022

(65) Prior Publication Data

US 2022/0372860 A1   Nov. 24, 2022

Related U.S. Application Data

(60) Provisional application No. 63/280,912, filed on Nov. 18, 2021, provisional application No. 63/203,000, (Continued)

(51) Int. Cl.
*G06Q 10/00* (2023.01)
*E21B 7/00* (2006.01)
(Continued)

(52) U.S. Cl.
CPC ............ *G06Q 30/018* (2013.01); *E21B 7/00* (2013.01); *E21B 43/16* (2013.01);
(Continued)

(58) Field of Classification Search
CPC .................................................... G06Q 50/00
(Continued)

(56) References Cited

U.S. PATENT DOCUMENTS

2006/0195264 A1   8/2006   Galil El Askary
2008/0040182 A1   2/2008   Wegner et al.
(Continued)

FOREIGN PATENT DOCUMENTS

CN   112070331 A   12/2020
JP   2009199351 A   9/2009
(Continued)

OTHER PUBLICATIONS

GHG-Protocol, downloaded on Sep. 8, 2024 from [https://ghgprotocol.org/sites/default/files/standards/ghg_project_accounting.pdf], 2005, 148 pages.
(Continued)

*Primary Examiner* — Mustafa Iqbal
(74) *Attorney, Agent, or Firm* — Jeffrey D. Frantz

(57) ABSTRACT

A method for generating a drilling plan for drilling a wellbore at a field includes receiving data. The data includes one or more of geological properties at the field, wellbore properties, drilling tool parameters, rig characteristics of drilling rigs, and working practices of a plurality of drilling crews. The method also includes generating a plurality of candidate drilling plans for drilling the wellbore at the field. The method also includes estimating one or more outputs for the candidate drilling plans based at least partially upon the data. The one or more outputs include an amount of emissions generated to drill the wellbore using the candidate drilling plans. The method also includes presenting for selection one or more of the candidate drilling plans based at least partially upon the one or more outputs.

7 Claims, 32 Drawing Sheets

Related U.S. Application Data filed on Jul. 2, 2021, provisional application No. 63/201,931, filed on May 19, 2021.

(51) Int. Cl.
| | |
|---|---|
| *E21B 43/00* | (2006.01) |
| *E21B 43/16* | (2006.01) |
| *G06Q 10/0631* | (2023.01) |
| *G06Q 30/00* | (2023.01) |
| *G06Q 30/018* | (2023.01) |
| *G06Q 50/00* | (2024.01) |
| *G06Q 50/02* | (2012.01) |

(52) U.S. Cl.
CPC ....... *G06Q 10/06313* (2013.01); *G06Q 50/02* (2013.01); *E21B 2200/20* (2020.05); *Y02P 90/84* (2015.11)

(58) Field of Classification Search
USPC ........................................................ 705/7.23
See application file for complete search history.

(56) References Cited

U.S. PATENT DOCUMENTS

| | | | |
|---|---|---|---|
| 2009/0125436 A1 | 5/2009 | Palanchian et al. | |
| 2011/0060572 A1* | 3/2011 | Brown | E21B 43/00 703/10 |
| 2011/0144791 A1 | 6/2011 | Loldj et al. | |
| 2012/0109611 A1* | 5/2012 | Loizzo | E21B 41/0064 703/10 |
| 2012/0290220 A1 | 11/2012 | Antolin et al. | |
| 2013/0080213 A1 | 3/2013 | Peters | |
| 2013/0161097 A1 | 6/2013 | Benson et al. | |
| 2013/0211807 A1 | 8/2013 | Templeton-Barrett et al. | |
| 2016/0273314 A1 | 9/2016 | Tanuma et al. | |
| 2018/0031533 A1 | 2/2018 | Rawat et al. | |
| 2018/0266241 A1 | 9/2018 | Ferguson et al. | |
| 2019/0120023 A1* | 4/2019 | Ocegueda-Hernandez | E21B 44/00 |
| 2020/0003812 A1 | 1/2020 | Gross et al. | |
| 2021/0222518 A1* | 7/2021 | Bardy | E21B 41/00 |
| 2021/0272591 A1* | 9/2021 | Benson | E21B 44/00 |
| 2022/0270227 A1* | 8/2022 | Affleck | G06T 7/001 |
| 2022/0374913 A1 | 11/2022 | Allen | |
| 2023/0186000 A1* | 6/2023 | Ozbek | E21B 49/00 175/61 |

FOREIGN PATENT DOCUMENTS

| | | |
|---|---|---|
| WO | 03027796 A2 | 4/2003 |
| WO | 2013188241 A2 | 12/2013 |
| WO | 2016094338 A1 | 6/2016 |
| WO | 2020003202 A1 | 1/2020 |
| WO | 2020139345 A1 | 7/2020 |

OTHER PUBLICATIONS

"The Greenhouse Gas Protocol, A Corporate Accounting and Reporting Standard, Revised Edition", World Business Council for Sustainable Development and the World Resources Institute, ISBN 1-56973-568-9, downloaded from https://ghgprotocol.org/sites/default/files/standards/ghg-protocol-revised.pdf, 2004 [Accessed Nov. 14, 2022], 116 pages.

Allen, M. "Measuring of Carbon Footprint in Offshore Drilling", SPE 208683-MS, presented at the IADC/SPE International Drilling Conference and Exhibition, Galveston, Texas, USA, 2022, 26 pages.

Gilbert, Y. et al., "Reducing the Carbon Footprint of Drilling and Completion Operations", SPE 126756, presented at the SPE International Conference on Health, Safety and Environment in Oil and Gas Exploration and Production, Rio de Janeiro, Brazil, 2010, 15 pages.

Baker Hughes Press Release, "Baker Hughes Announces Aug. 2020 Rig Counts", Baker Hughes Investor Center, [Online] Downloaded from: [https://investors.bakerhughes.com/news-releases/news-release-details/baker-hughes-announces-august-2020-rig-counts#:~:text=The%20international%20offshore%20rig%20count,244%20counted%20in%20August%202019%20], 2020, [Accessed Nov. 14, 2022], 3 pages.

Brath, B. E., "T&D World—Leveraging Lithium-Ion Energy Storage to Create Low-Emissions Offshore Drilling Rig", [Online], Downloaded from: [https://www.tdworld.com/distributed-energy-resources/energy-storage/article/21148768/siemens-energy-inc-leveraging-lithiumion-energy-storage-to-create-lowemissions-offshore-drilling-rig], 2020, [Accessed Nov. 14, 2022], 12 pages.

Gillenwater, M., "Calculation Tool For Direct Emissions From Stationary Combustion", [Online], Downloaded from: [https://ghgprotocol.org/sites/default/files/Stationary_Combustion_Guidance_final_1.pdf], 2005, [Accessed Nov. 14, 2022], GHG Calculation Tools, 94 pages.

International Maritime Organization, "Third IMO GHG Study 2014 Executive Summary and Final Report", London, United Kingdom, 2014, 327 pages.

Product and Technical Data Sheet, "AW 139—Simply No Rivals", [Online], Downloaded from: [https://www.leonardocompany.com/en/products/aw139], 2021, [Accessed Nov. 14, 2022], Leonardo Company, 4 pages.

"Offshore-drilling outlook to 2035", [Online], Downloaded from: [https://www.mckinsey.com/industries/oil-and-gas/our-insights/offshore-drilling-outlook-to-2035], 2019, [Accessed Nov. 14, 2022], McKinsey & Company, 4 pages.

"The future is now: How oil and gas companies can decarbonize", [Online], Downloaded from: [https://www.mckinsey.com/industries/oil-and-gas/our-insights/the-future-is-now-how-oil-and-gas-companies-can-decarbonize], 2020, [Accessed Nov. 14, 2022], McKinsey & Company, 6 pages.

"GHG Protocol—GHG Emissions from Transport or Mobile Sources version 2.6", [Online], [Downloaded from [https://ghgprotocol.org/sites/default/files/Transport_Tool_v2_6.xlsx], 2015, [Accessed Nov. 14, 2022], World Resources Institute.

Search Report and Written Opinion of International Patent Application No. PCT/US2022/030065 dated Sep. 15, 2022, 10 pages.

Search Report and Written Opinion of International Patent Application No. PCT/US2022/030066 dated Sep. 23, 2022, 10 pages.

Office Action issued in U.S. Appl. No. 17/664,123 dated Feb. 15, 2024, 26 pages.

Skjong, E. et al., "Approaches to Economic Energy Management in Diesel-Electric Marine Vessels", IEEE Transactions on Transportation Electrification, 2017, 3(1), 14 pages.

* cited by examiner

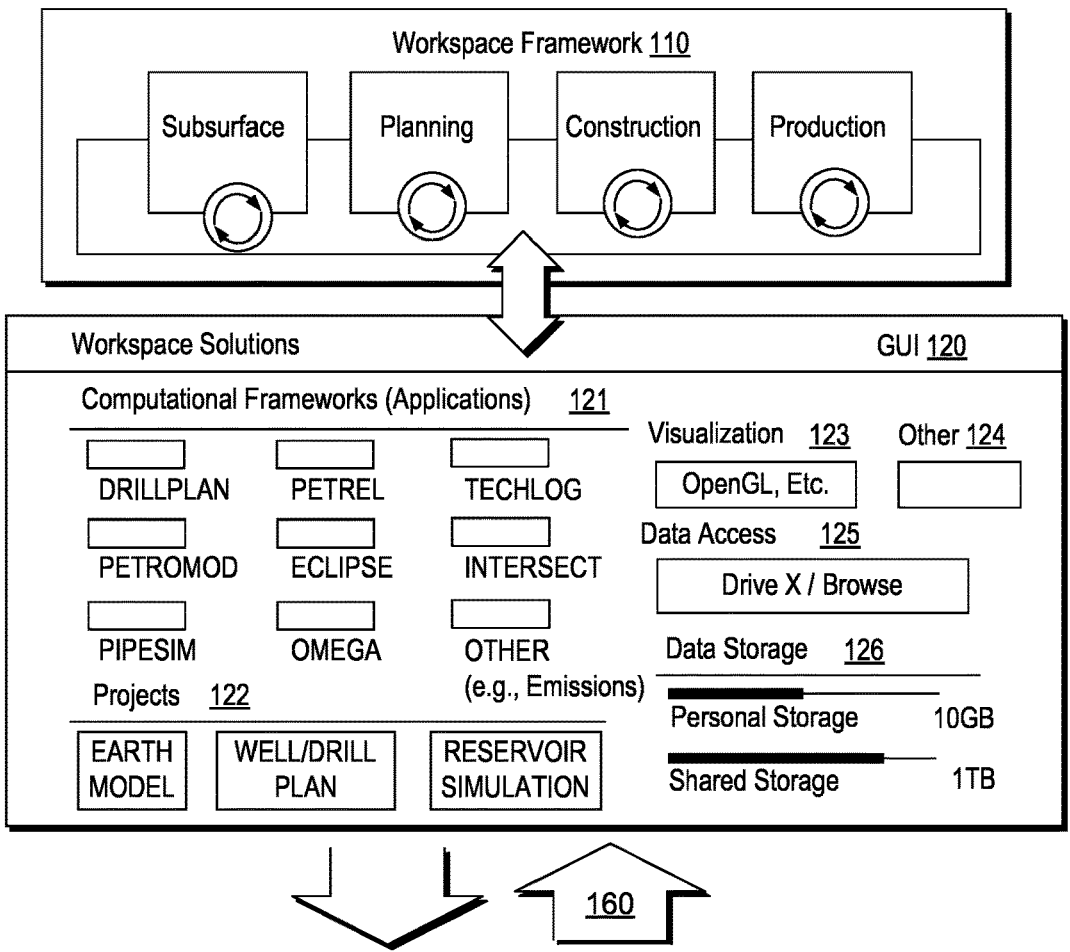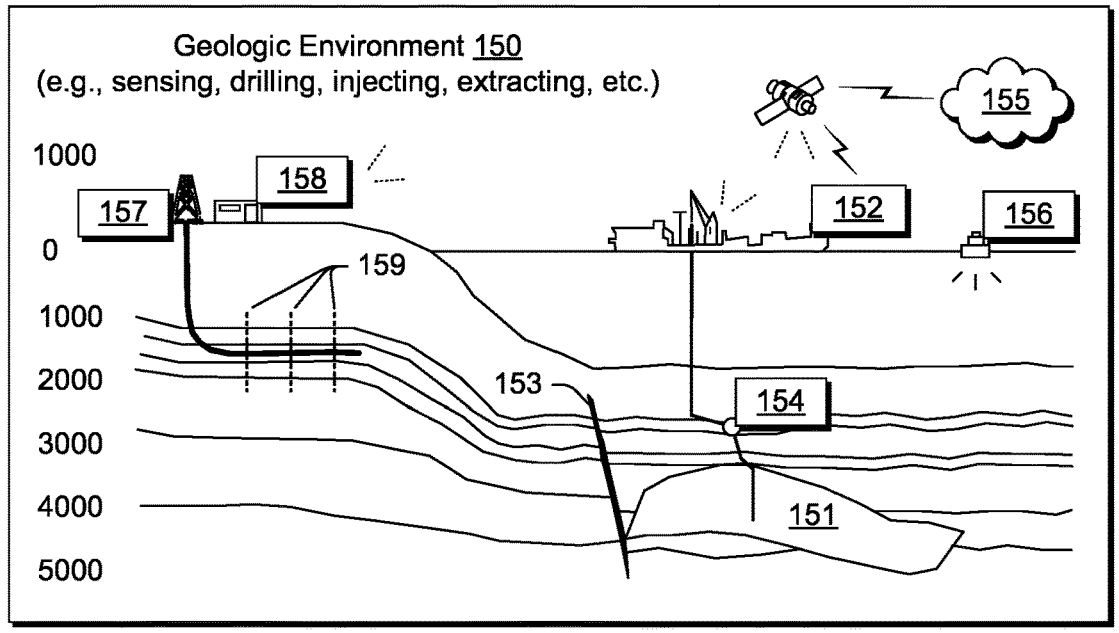
Fig. 1

| SCOPE 1 ☁ | SCOPE 2 ☁ | SCOPE 3 ☁ |
|---|---|---|
| GREENHOUSE GAS EMISSIONS FROM:<br>○ FUEL IN:<br>○ VEHICLES<br>○ GENERATORS<br>○ PUMPS/QQUIPMENT<br>○ VESSELS/RIGS<br>○ NATURAL GAS IN HEATERS | GREENHOUSE GAS EMISSIONS FROM:<br>○ ELECTRICITY THAT WE PURCHASE<br>○ HEAT THAT WE PURCHASE | GREENHOUSE GAS EMISSIONS FROM:<br>○ PRODUCTS AND SERVICES THAT OUR SUPPLIERS PROVIDE US<br>○ SERVICES THAT OUR CONTRACTORS PROVIDE US<br>○ PRODUCTS AND SERVICES THAT WE PROVIDE TO OUR CUSTOMERS |

| MVP | PHASE 1 | PHASE 2 | PHASE 3 |
|---|---|---|---|
| SCOPE 1 GHG EMISSIONS ESTIMATION FOR:<br>☐ DIRECT EMISSIONS AT THE WELL SITE, EXCLUDING FLARING AND VENTING<br>☐ TRANSPORTATION FOR EQUIPMENT AND MATERIAL (MANUAL INPUT)<br>SIMPLIFIED RIG EQUIPMENT CONFIGURATION<br>BASIC REPORTING | EXTENSION OF GHG EMISSIONS ESTIMATION TO:<br>☐ AUTOMATED CALCULATION FOR TRANSPORTATION OF MATERIALS (TUBULAR, CEMENT, FLUIDS)<br>☐ SCOPE 2 - ELECTRICITY (IF IT IS HIGH PRIORITY)<br>DETAILED REPORTING | CLOSING THE LOOP<br>☐ GHG EMISSIONS ESTIMATION DATA IN DDP<br>☐ DETAILED RIG EQUIPMENT CONFIGURATION MODEL TO USE HISTORICAL DATA<br>☐ GHG EMISSIONS ESTIMATION USING HISTORICAL DATA | ADDITIONAL FEATURES<br>☐ GHG EMISSIONS ESTIMATION WITH CALIBRATION FROM OFFSET DAT<br>☐ SCOPE 3 GHG EMISSIONS ESTIMATION FOR WASTE DISPOSAL AND PRODUCTION OF MATERIALS (FEASIBILITY TO BE EVALUATED)<br>☐ SCOPE 1 GHG EMISSIONS ESTIMATION FOR FLARING AND VENTING AT THE WELL SITE |

GUI 1700

| GHG EMISSIONS ESTIMATOR | | | | | |
|---|---|---|---|---|---|
| SHARE ☑ | 🖫 SAVE | ✎ RENAME | ⊙ VIEW HISTORY | | |

| ACTIVITY LIST | EDIT COLLAPSE ALL PHASE VIEW ⚙ | | | | |
|---|---|---|---|---|---|
| | CLEAN TIME (H) | NPT (H) | TOTAL TIME (H) | CUM. TIME (D) | |
| ⊟ CONSTRUCT WELL | | | | | |
| ⊟ CONSTRUCT SECTION | 36 IN | | | | | |
| ⊟ DRILL SECTION | 1312.34-1532.15 FT | | | | | |
| ⊟ DRILLING RUN | 1312.34-5-1532.15 FT | | | | | |
| MAKE UP BHA | 0-226.14 FT | 2.00 | 0.10 | 2.10 | 0.09 |
| TRIP IN TO DEPTH | 226.14-1312.34... | 0.59 | 0.03 | 0.62 | 0.11 |
| DRILL TO DEPTH | 36 IN | 1312.34-15... | 3.14 | 0.16 | 3.30 | 0.25 |
| CIRCULATE TO CONDITION HOLE | 1.00 | 0.05 | 1.05 | 0.29 | |
| PUMP SLUG_SWEEP_PILL_SPACER | 1.00 | 0.05 | 1.05 | 0.34 | |
| TRIP OUT TO DEPTH | 1532.15-226.... | 3.05 | 0.15 | 3.21 | 0.47 |
| LAY DOWN BHA | 226.14-0 FT | 1.00 | 0.05 | 1.05 | 0.52 |
| ⊟ CASE SECTION | | | | | |
| ⊟ RUN CASING | | | | | |
| RIG UP TO RUN CASING | 1.00 | 0.05 | 1.05 | 0.56 | |
| MAKE UP SHOE TRACK | 0-100 FT | 1.00 | 0.05 | 1.05 | 0.60 |
| RUN IN CASING TO DEPTH | 30 IN 10... | 2.39 | 0.12 | 2.51 | 0.71 |

☼ ♂ ⌁ ⓘ

| PARAMETERS | SOURCE ASSIGNMENT |
|---|---|
| ACTIVITY LIST | |
| SEARCH | |
| ⊟ DRILL SECTION | ☑ MUD PUMPS |
| ⊟ CASED HOLE | ☑ RIG. MISC. EQUIPMENT |
| WHIPSTOCK_RUN | ☑ CUSTOM EQUIPMENT 1 |
| ⊟ CLEAN OUT RUN | ☐ CUSTOM EQUIPMENT 2 |
| ⊟ CORING RUN | ☐ CUSTOM EQUIPMENT 3 |
| ⊟ DRILL STEM TEST RUN | |
| ⊟ DRILLING RUN | |
| CIRCULATE TO CONDITION DRILLING FLUID | |
| CIRCULATE TO CONDITION HOLE | |

FIG. 17

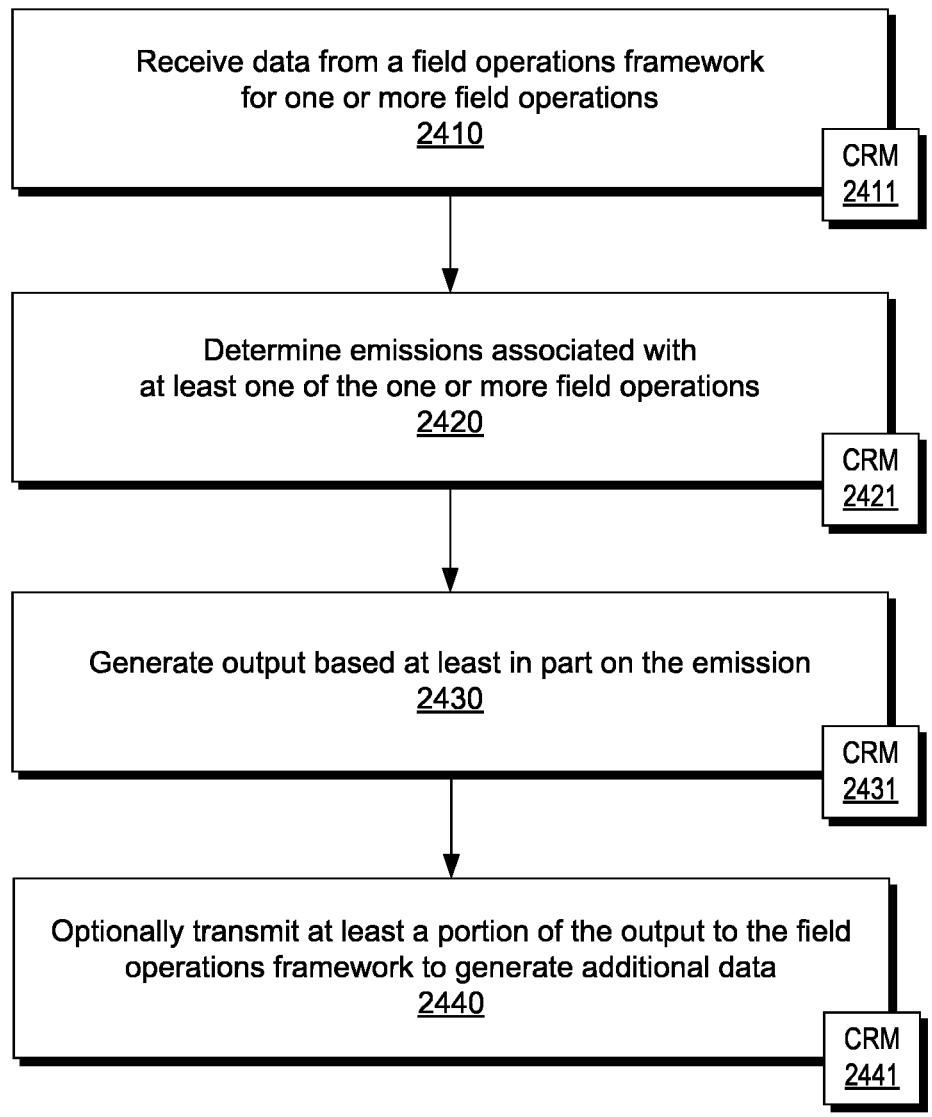
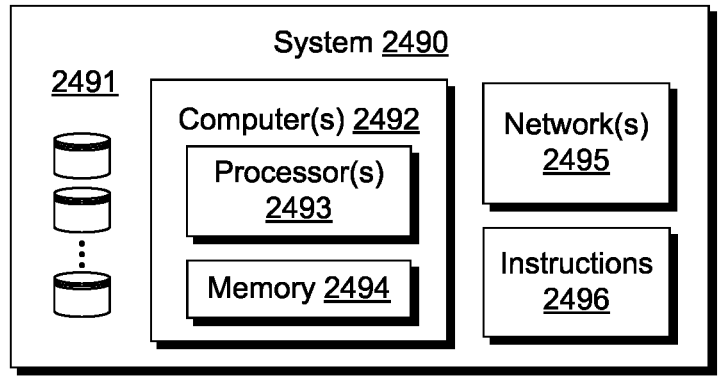
Fig. 24

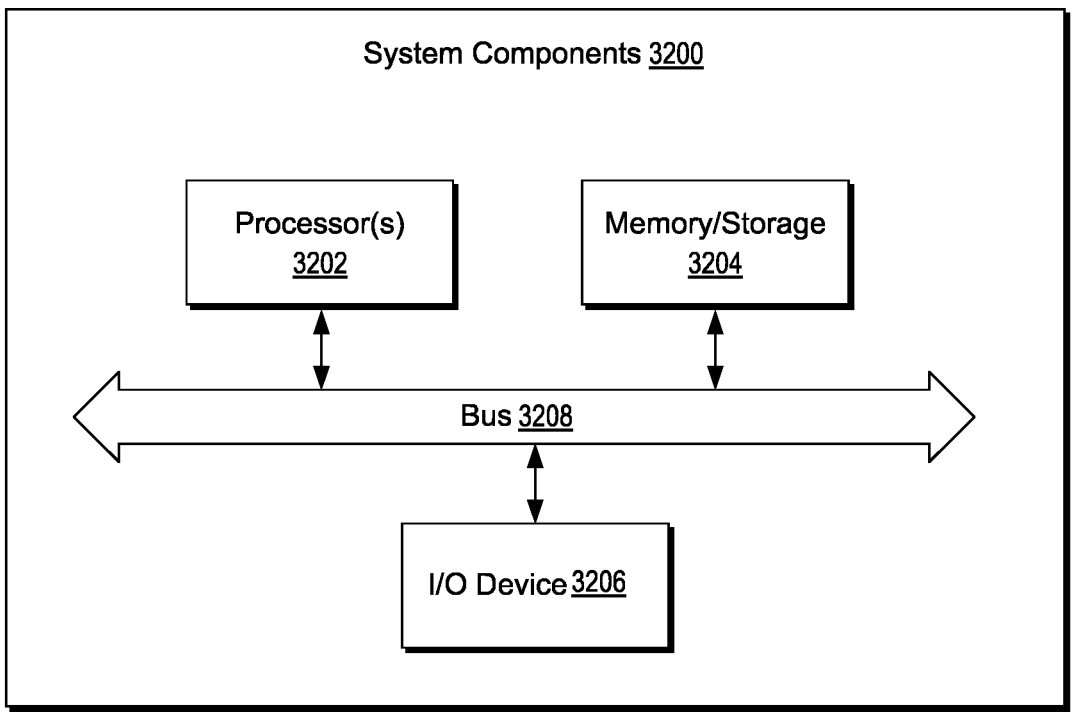
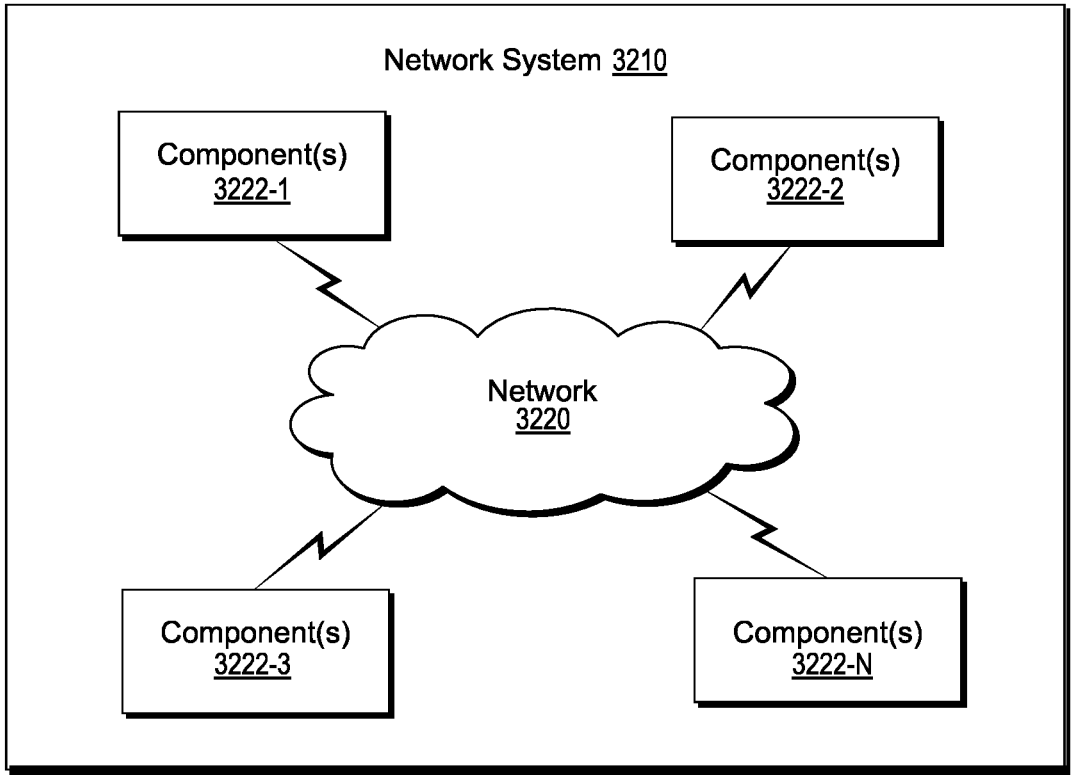
Fig. 32

OPERATIONAL EMISSIONS FRAMEWORK

CROSS-REFERENCE TO RELATED APPLICATIONS

This application claims priority to U.S. Provisional Patent Application No. 63/201,931, filed on May 19, 2021; U.S. Provisional Patent Application No. 63/203,000, filed on Jul. 2, 2021; and U.S. Provisional Patent Application No. 63/280,912, filed on Nov. 18, 2021. The entirety of these applications is incorporated by reference herein.

BACKGROUND

A drill plan is a plan for drilling a wellbore in a subterranean formation. The plan may include inputs such as well geometries, casing programs, mud considerations, well control concerns, initial bit selections, offset well information, pore pressure estimations, economics, and special procedures that may be implemented during the course of the well. The drill plan may be adjusted to modify (e.g., optimize) outputs of the drill plan such as the time and/or cost to complete drilling, completion, and/or production.

SUMMARY

A method for generating a drilling plan for drilling a wellbore at a field is disclosed. The method includes receiving data. The data includes one or more of geological properties at the field, wellbore properties, drilling tool parameters, rig characteristics of drilling rigs, and working practices of a plurality of drilling crews. The method also includes generating a plurality of candidate drilling plans for drilling the wellbore at the field. The method also includes estimating one or more outputs for the candidate drilling plans based at least partially upon the data. The one or more outputs include an amount of emissions generated to drill the wellbore using the candidate drilling plans. The method also includes presenting for selection one or more of the candidate drilling plans based at least partially upon the one or more outputs.

A computing system is also disclosed. The computing system includes one or more processors and a memory system. The memory system includes one or more non-transitory computer-readable media storing instructions that, when executed by at least one of the one or more processors, cause the computing system to perform operations. The operations include receiving data. The data includes rig characteristics of drilling rigs. The operations also include generating a model to simulate a plurality of different drilling plans for drilling the wellbore at the field based at least partially upon the data. The rig characteristics are different for each of the drilling plans. The operations also include determining one or more outputs for each drilling plan. The one or more outputs include a cost to drill the wellbore using the drilling plan, a time to drill the wellbore using the drilling plan, an amount of emissions generated to drill the wellbore using the drilling plan, or a combination thereof. The operations also include presenting for selection one of the drilling plans based at least partially upon the one or more outputs.

A non-transitory computer-readable medium is also disclosed. The medium stores instructions that, when executed by at least one processor of a computing system, cause the computing system to perform operations. The operations include receiving historical data from one or more first previously-drilled wellbores at a field and one or more second previously-drilled wellbores at one or more other fields. The historical data includes geological properties at the field, the one or more other fields, or both. The geological properties include porosity, permeability, resistivity, heterogeneity, and formation strength. The historical data also includes wellbore properties of the one or more first previously-drilled wellbores and the one or more second previously-drilled wellbores. The wellbore properties include geometry, trajectory, casing points, and completion design. The historical data also includes drilling tool parameters of drilling tools used to drill the one or more first previously-drilled wellbores and the one or more second previously-drilled wellbores. The drilling parameters include steerability, durability, rate of penetration (ROP), rotary speed, torque, flow rate, and pressure drop. The historical data also includes rig characteristics of drilling rigs used to drill the one or more first previously-drilled wellbores and the one or more second previously-drilled wellbores. The rig characteristics include specifications of equipment on the drilling rigs, operating performance of the equipment, and an amount of emissions generated by the equipment. The equipment includes one or more generators. The historical data also includes working practices of a plurality of drilling crews used to drill the one or more first previously-drilled wellbores and the one or more second previously-drilled wellbores. The working practices includes times when the drilling crews run the one or more generators and a number of the one or more generators that the working crews runs at each time. The operations also include generating a model to simulate a plurality of different drilling plans for drilling the wellbore at the field based at least partially upon the historical data. One or more of the geological properties, the wellbore properties, the drilling tool parameters, the rig characteristics, and the working practices is different for each of the drilling plans. The operations also include determining outputs for each drilling plan. The outputs include a cost to drill the wellbore using the drilling plan, a time to drill the wellbore using the drilling plan, and the amount of emissions generated by the equipment to drill the wellbore using the drilling plan. The operations also include presenting for selection one of the drilling plans based at least partially upon the one or more outputs.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 1 illustrates an example of a system that includes various management components to manage various aspects of a geologic environment, according to an embodiment.

FIG. 13 illustrates an example of a system, according to an embodiment.

FIG. 16 illustrates an example of a graphical user interface, according to an embodiment.

FIG. 17 illustrates an example of a graphical user interface, according to an embodiment.

FIG. 24 illustrates an example of a method and an example of a system, according to an embodiment.

FIG. 32 illustrates example components of a system and a networked system, according to an embodiment.

DETAILED DESCRIPTION

Figure 2:
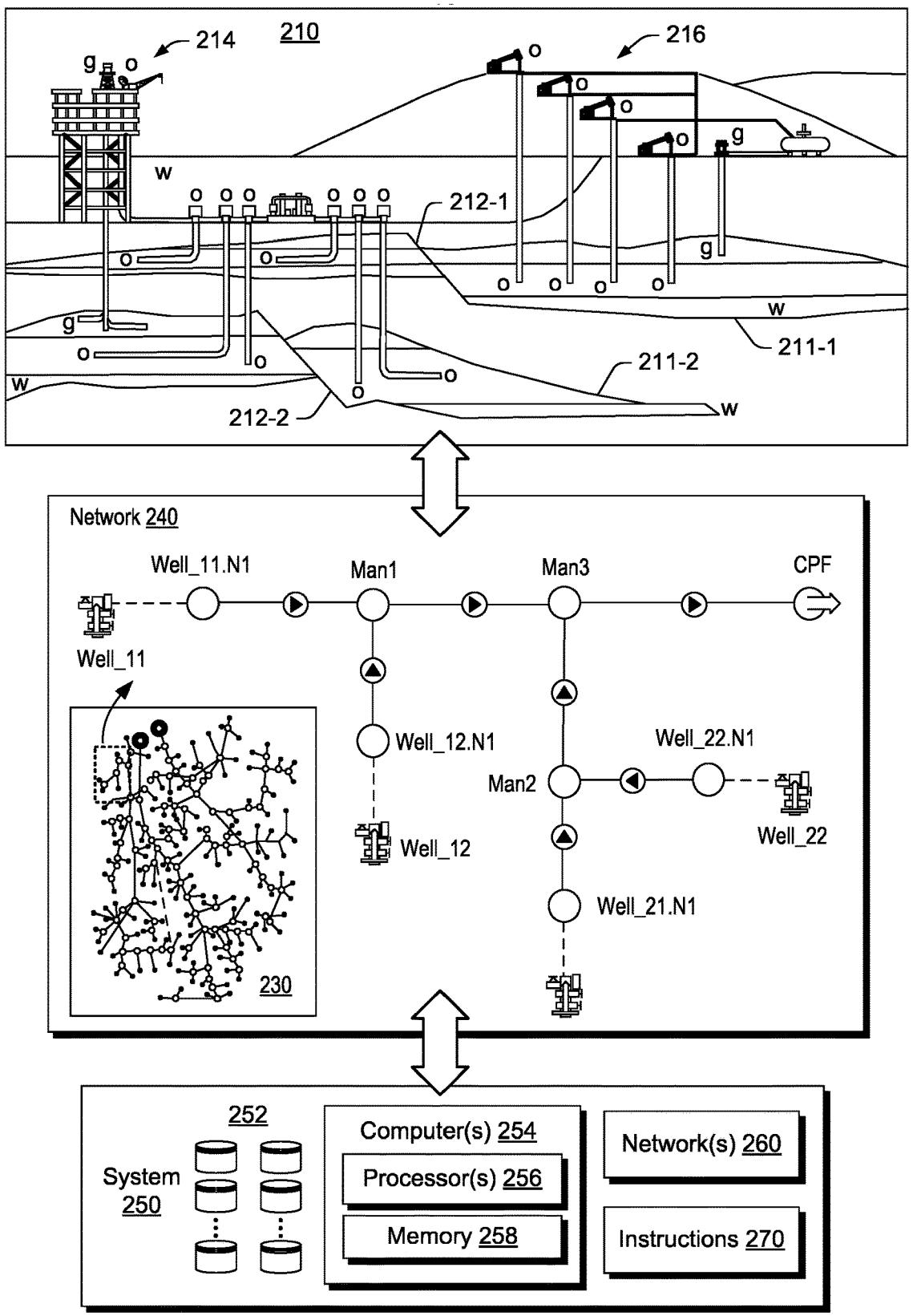
FIG. 2 illustrates an example of a system and examples of equipment in a geologic environment, according to an embodiment.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, INTERSECT, PIPESIM and OMEGA frameworks (Schlumberger Limited, Houston, Texas). As to another type of framework, consider, for example, an emissions framework (EF), which may be operable in combination with one or more other frameworks to make determinations as to emissions (e.g., of one or more field operations, etc.). In such an example, an EF may provide feedback such that another framework can operate on output of the EF, for example, to revise a plan, revise a control scheme, etc., which may be in a manner that aims to reduce one or more types of emissions and/or other impact from an activity, etc.

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive E&P environment (Schlumberger Limited, Houston, Texas) for utilization in geosciences and geoengineering, for example, to analyze subsurface data from exploration to production of fluid from a reservoir.

The TECHLOG framework can handle and process field and laboratory data for a variety of geologic environments (e.g., deepwater exploration, shale, etc.). The TECHLOG framework can structure wellbore data for analyses, planning, etc.

The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI cognitive E&P environment, for example, for rapid simulation of multiple concurrent cases. For example, a workflow may utilize one or more of the DELFI on demand reservoir simulation features.

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (Schlumberger Limited, Houston Texas). As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that can optimize one or more operational scenarios at least in part via simulation of physical phenomena.

The OMEGA framework includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density. The OMEGA framework also includes features for RTM, FDMOD, adaptive beam migration (ABM), Gaussian packet migration (Gaussian PM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools. Various features can be included for processing various types of data such as, for example, one or more of: land, marine, and transition zone data; time and depth data; 2D, 3D, and 4D surveys; isotropic and anisotropic (TTI and VTI) velocity fields; and multicomponent data.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G software packages. Examples of such software packages include the PETREL framework. As an example, a system or systems may utilize a framework such as the DELFI framework (Schlumberger Limited, Houston, Texas). Such a framework may operatively couple various other frameworks to provide for a multi-framework workspace. As an example, the GUI 120 of FIG. 1 may be a GUI of the DELFI framework.

In the example of FIG. 1, the visualization 123 may be implemented via the workspace framework 110, for example, to perform tasks as associated with one or more of subsurface regions, planning operations, constructing wells and/or surface fluid networks, and producing from a reservoir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.).

Field acquisition equipment may be utilized to acquire seismic data, which may be in the form of traces where a trace can include values organized with respect to time and/or depth (e.g., consider 1D, 2D, 3D or 4D seismic data). For example, consider acquisition equipment that acquires digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, a deepest boundary depth may be estimated to be about 10 km (e.g., assuming a speed of sound of about 5 km per second).

As an example, a model may be a simulated version of a geologic environment. As an example, a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model that that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

A simulator can be utilized to simulate the exploitation of a real reservoir, for example, to examine different productions scenarios to find an optimal one before production or further production occurs. A reservoir simulator does not provide an exact replica of flow in and production from a reservoir at least in part because the description of the reservoir and the boundary conditions for the equations for flow in a porous rock are generally known with an amount of uncertainty. Certain types of physical phenomena occur at a spatial scale that can be relatively small compared to size of a field. A balance can be struck between model scale and computational resources that results in model cell sizes being of the order of meters; rather than a lesser size (e.g., a level of detail of pores). A modeling and simulation workflow for multiphase flow in porous media (e.g., reservoir rock, etc.) can include generalizing real micro-scale data from macro scale observations (e.g., seismic data and well data) and upscaling to a manageable scale and problem size. Uncertainties can exist in input data and solution procedure such that simulation results too are to some extent uncertain. A process known as history matching can involve comparing simulation results to actual field data acquired during production of fluid from a field. Information gleaned from history matching, can provide for adjustments to a model, data, etc., which can help to increase accuracy of simulation.

As an example, a simulator may utilize various types of constructs, which may be referred to as entities. Entities may include earth entities or geological objects such as wells, surfaces, reservoirs, etc. Entities can include virtual representations of actual physical entities that may be reconstructed for purposes of simulation. Entities may include entities based on data acquired via sensing, observation, etc. (e.g., consider entities based at least in part on seismic data and/or other information). As an example, an entity may be characterized by one or more properties (e.g., a geometrical pillar grid entity of an earth model may be characterized by a porosity property, etc.). Such properties may represent one or more measurements (e.g., acquired data), calculations, etc.

As an example, a simulator may utilize an object-based software framework, which may include entities based on pre-defined classes to facilitate modeling and simulation. As an example, an object class can encapsulate reusable code and associated data structures. Object classes can be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

While several simulators are illustrated in the example of FIG. 1, one or more other simulators may be utilized, additionally or alternatively. For example, consider the VISAGE geomechanics simulator (Schlumberger Limited, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, $CO_2$ disposal, etc. The MANGROVE simulator (Schlumberger Limited, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increased perforation efficiency and recovery.

The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes (e.g., with respect to one or more geologic environments, etc.). Such a framework may be considered an application (e.g., executable using one or more devices) and may be considered a data-driven application (e.g., where data is input for purposes of modeling, simulating, etc.).

As mentioned, a framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks. The DELFI environment may be referred to as the DELFI framework, which may be a framework of frameworks. As an example, the DELFI framework can include various other frameworks, which can include, for example, one or more types of models (e.g., simulation models, etc.).

FIG. 2 shows an example of a geologic environment 210 that includes reservoirs 211-1 and 211-2, which may be faulted by faults 212-1 and 212-2, an example of a network of equipment 230, an enlarged view of a portion of the network of equipment 230, referred to as network 240, and an example of a system 250. FIG. 2 shows some examples of offshore equipment 214 for oil and gas operations related to the reservoir 211-2 and onshore equipment 216 for oil and gas operations related to the reservoir 211-1.

In the example of FIG. 2, the various equipment 214 and 216 can include drilling equipment, wireline equipment, production equipment, etc. For example, consider the equipment 214 as including a drilling rig that can drill into a formation to reach a reservoir target where a well can be completed for production of hydrocarbons. In such an example, one or more features of the system 100 of FIG. 1 may be utilized. For example, consider utilizing the DRILLPLAN framework to plan, execute, etc., one or more drilling operations.

In FIG. 2, the network 240 can be an example of a relatively small production system network. As shown, the network 240 forms somewhat of a tree like structure where flowlines represent branches (e.g., segments) and junctions represent nodes. As shown in FIG. 2, the network 240 provides for transportation of oil and gas fluids from well locations along flowlines interconnected at junctions with final delivery at a central processing facility.

In the example of FIG. 2, various portions of the network 240 may include conduits. For example, consider a perspective view of a geologic environment that includes two conduits which may be a conduit to Man1 and a conduit to Man3 in the network 240.

As shown in FIG. 2, the example system 250 includes one or more information storage devices 252, one or more computers 254, one or more networks 260 and instructions 270 (e.g., organized as one or more sets of instructions). As to the one or more computers 254, each computer may include one or more processors (e.g., or processing cores) 256 and memory 258 for storing the instructions 270 (e.g., one or more sets of instructions), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252. As an example, information that may be stored in one or more of the storage devices 252 may include information about equipment, location of equipment, orientation of equipment, fluid characteristics, etc.

As an example, the instructions 270 can include instructions (e.g., stored in the memory 258) executable by at least one of the one or more processors 256 to instruct the system 250 to perform various actions. As an example, the system 250 may be configured such that the instructions 270 provide for establishing a framework, for example, that can perform network modeling (see, e.g., the PIPESIM framework of the example of FIG. 1, etc.). As an example, one or more methods, techniques, etc. may be performed using one or more sets of instructions, which may be, for example, the instructions 270 of FIG. 2.

As an example, a model may be made that models a geologic environment in combination with equipment, wells, etc. For example, a model may be a flow simulation model for use by a simulator to simulate flow in an oil, gas or oil and gas production system. Such a flow simulation model may include equations, for example, to model multiphase flow from a reservoir to a wellhead, from a wellhead to a reservoir, etc. A flow simulation model may also include equations that account for flowline and surface facility performance, for example, to perform a comprehensive production system analysis.

As an example, a flow simulation model may be a network model that includes various sub-networks specified using nodes, segments, branches, etc. As an example, a flow simulation model may be specified in a manner that provides for modeling of branched segments, multilateral segments, complex completions, intelligent downhole controls, etc. As an example, one or more portions of a production network (e.g., optionally sub-networks, etc.) or a group of signal components and/or controllers may be modeled as sub-models.

As an example, a system may provide for transportation of oil and gas fluids from well locations to processing facilities and may represent a substantial investment in infrastructure with both economic and environmental impact. Simulation of such a system, which may include hundreds or thousands of flow lines and production equipment interconnected at junctions to form a network, can involve multiphase flow science and, for example, use of engineering and mathematical techniques for large systems of equations.

As an example, a flow simulation model may include equations for performing nodal analysis, pressure-volume-temperature (PVT) analysis, gas lift analysis, erosion analysis, corrosion analysis, production analysis, injection analysis, etc. In such an example, one or more analyses may be based, in part, on a simulation of flow in a modeled network.

As to nodal analysis, it may provide for evaluation of well performance, for making decisions as to completions, etc. A nodal analysis may provide for an understanding of behavior of a system and optionally sensitivity of a system (e.g., production, injection, production and injection). For example, a system variable may be selected for investigation and a sensitivity analysis performed. Such an analysis may include plotting inflow and outflow of fluid at a nodal point or nodal points in the system, which may indicate where certain opportunities exist (e.g., for injection, for production, etc.).

A modeling framework may include instructions (e.g., processor-executable instructions) to facilitate generation of a flow simulation model. For example, instructions may provide for modeling completions for vertical wells, completions for horizontal wells, completions for fractured wells, etc. A modeling framework may include instructions for particular types of equations, for example, black-oil equations, equation-of-state (EOS) equations, etc. A modeling framework may include instructions for artificial lift, for example, to model fluid injection, fluid pumping, etc. As an example, consider a set of instructions (e.g., a component) that includes features for modeling one or more electric submersible pumps (ESPs) (e.g., based in part on pump performance curves, motors, cables, etc.).

As an example, an analysis using a flow simulation model may be a network analysis to: identify production bottlenecks and constraints; assess benefits of new wells, additional pipelines, compression systems, etc.; calculate deliverability from field gathering systems; predict pressure and temperature profiles through flow paths; or plan full-field development.

As an example, a flow simulation model may provide for analyses with respect to future times, for example, to allow for optimization of production equipment, injection equipment, etc. As an example, consider an optimal time-based and conditional-event logic representation for daily field development operations that can be used to evaluate drilling of new developmental wells, installing additional processing facilities over time, choke-adjusted wells to meet production and operating limits, shutting in of depleting wells as reservoir conditions decline, etc.

As to equations, sets of conservation equations for mass momentum and energy describing single, two or three phase flow (e.g., according to one or more of a LEDAFLOW™ (Kongsberg Oil & Gas Technologies AS, Sandvika, Norway), OLGA™ model (Schlumberger Ltd, Houston, Texas), TUFFP unified mechanistic models (Tulsa University Fluid Flow Projects, Tulsa, Oklahoma), etc.).

Various equipment that may be at a site can include rig equipment. For example, consider rig equipment that includes a platform, a derrick, a crown block, a line, a traveling block assembly, drawworks and a landing (e.g., a monkeyboard). As an example, the line may be controlled at least in part via the drawworks such that the traveling block assembly travels in a vertical direction with respect to the platform. For example, by drawing the line in, the drawworks may cause the line to run through the crown block and lift the traveling block assembly skyward away from the platform; whereas, by allowing the line out, the drawworks may cause the line to run through the crown block and lower the traveling block assembly toward the platform. Where the traveling block assembly carries pipe (e.g., casing, etc.), tracking of movement of the traveling block may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.). As an example, one or more types of fuel may be available for an internal combustion engine, which may be a piston engine, a turbine engine, a rotary engine, etc.

Exhaust gas or flue gas can be emitted as a result of combustion of fuels such as natural gas, gasoline (petrol), diesel fuel, fuel oil, biodiesel blends, coal, etc. According to the type of engine, emissions may be discharged into the atmosphere through an exhaust pipe, flue gas stack, propelling nozzle, etc. As an example, emissions may disperse downwind in a pattern such as an exhaust plume. Depending on type of combustion engine, various other routes for emissions may occur (e.g., leaks, etc.), which may be of fuel, lubricant, exhaust, etc. Internal combustion engines and/or electric motors may be utilized for one or more purposes in the field (e.g., transport, pumping, rotating, lifting, etc.).

As to some examples of greenhouse gas (GHG), consider one or more of water vapor ($H_2O$), carbon dioxide ($CO_2$), methane ($CH_4$), nitrous oxide ($N_2O$), and ozone ($O_3$). As an example, an emissions framework can include one or more features for determinations as to particular components, which may or may not be considered GHG components. As an example, consider nitrogen ($N_2$), oxygen ($O_2$), and argon (Ar), which may not be considered greenhouse gases because molecules containing two atoms of the same element such as $N_2$ and $O_2$ have no net change in the distribution of their electrical charges when they vibrate, and monatomic gases such as Ar do not have vibrational modes. Hence, such gases tend to be unaffected by infrared radiation. Some molecules containing just two atoms of different elements, such as carbon monoxide (CO) and hydrogen chloride (HCl), do absorb infrared radiation, but such molecules may be short-lived in the atmosphere owing to their reactivity or solubility. Such molecules may not contribute substantially to a greenhouse effect. As explained, an emissions framework can include computing stoichiometric quantities for reactions, etc., which may include components that are and/or are not considered GHG.

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrickman may be a rig crew member that works on a platform attached to a derrick or a mast. A derrick can include a landing on which a derrickman may stand. As an example, such a landing may be about 10 meters or more above a rig floor. In an operation referred to as trip out of the hole (TOH), a derrickman may wear a safety harness that enables leaning out from the work landing (e.g., monkeyboard) to reach pipe located at or near the center of a derrick or a mast and to throw a line around the pipe and pull it back into its storage location (e.g., fingerboards), for example, until it may be desirable to run the pipe back into the bore. As an example, a rig may include automated pipe-handling equipment such that the derrickman controls the machinery rather than physically handling the pipe.

As an example, a trip may refer to the act of pulling equipment from a bore and/or placing equipment in a bore. As an example, equipment may include a drillstring that can be pulled out of a hole and/or placed or replaced in a hole. As an example, a pipe trip may be performed where a drill bit has dulled or has otherwise ceased to drill efficiently and is to be replaced. As an example, a trip that pulls equipment out of a borehole may be referred to as pulling out of hole (POOH) and a trip that runs equipment into a borehole may be referred to as running in hole (RIH).

Figure 3:
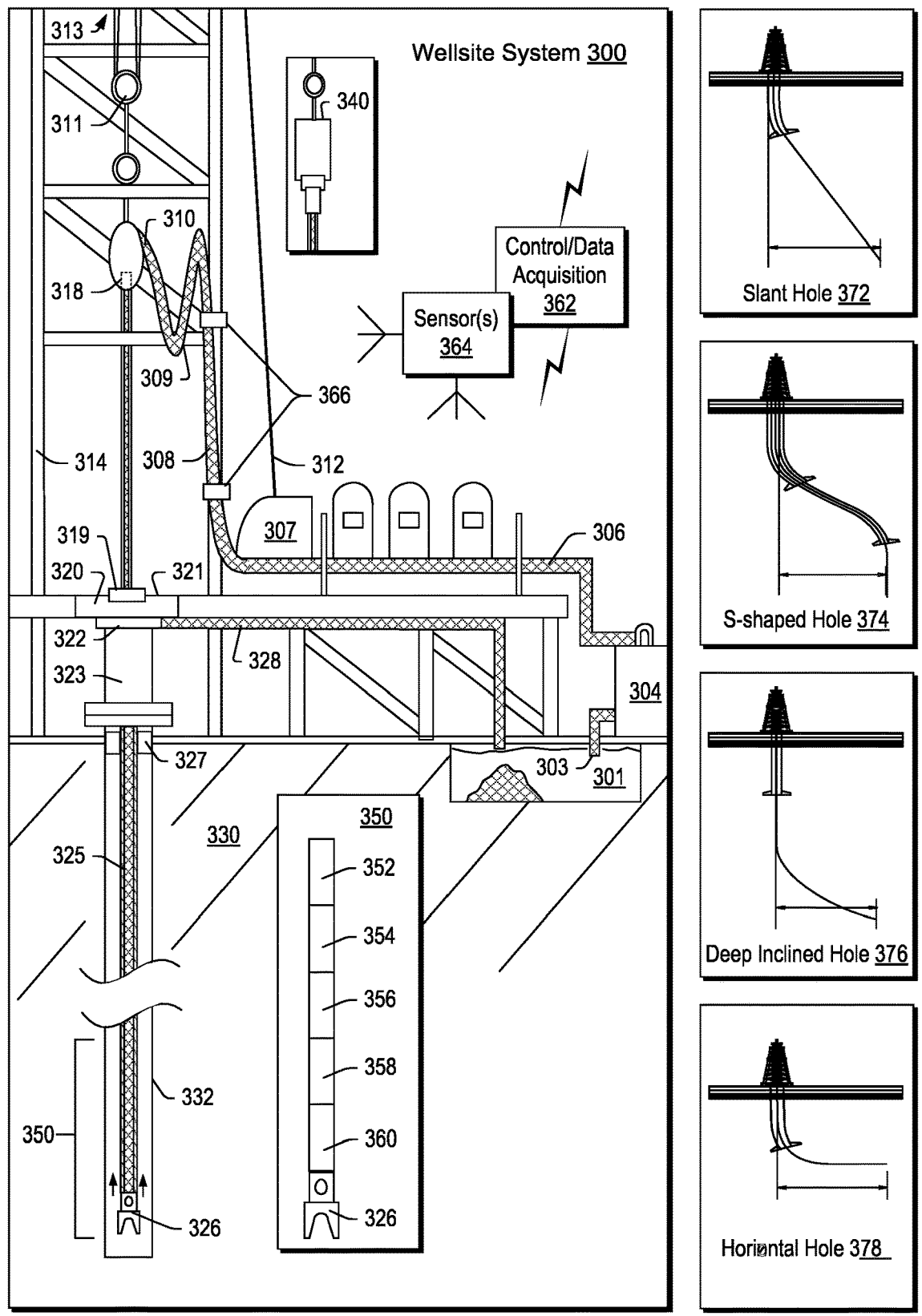
FIG. 3 illustrates examples of equipment and examples of hole types, according to an embodiment.

FIG. 3 shows an example of a wellsite system 300 (e.g., at a wellsite that may be onshore or offshore). As shown, the wellsite system 300 can include a mud tank 301 for holding mud and other material (e.g., where mud can be a drilling fluid), a suction line 303 that serves as an inlet to a mud pump 304 for pumping mud from the mud tank 301 such that mud flows to a vibrating hose 306, a drawworks 307 for winching drill line or drill lines 312, a standpipe 308 that receives mud from the vibrating hose 306, a kelly hose 309 that receives mud from the standpipe 308, a gooseneck or goosenecks 310, a traveling block 311, a crown block 313 for carrying the traveling block 311 via the drill line or drill lines 312, a derrick 314, a kelly 318 or a top drive 340, a kelly drive bushing 319, a rotary table 320, a drill floor 321, a bell nipple 322, one or more blowout preventors (BOPs) 323, a drillstring 325, a drill bit 326, a casing head 327 and a flow pipe 328 that carries mud and other material to, for example, the mud tank 301.

In the example system of FIG. 3, a borehole 332 is formed in subsurface formations 330 by rotary drilling; noting that various example embodiments may also use one or more directional drilling techniques, equipment, etc.

As shown in the example of FIG. 3, the drillstring 325 is suspended within the borehole 332 and has a drillstring assembly 350 that includes the drill bit 326 at its lower end. As an example, the drillstring assembly 350 may be a bottom hole assembly (BHA).

The wellsite system 300 can provide for operation of the drillstring 325 and other operations. As shown, the wellsite system 300 includes the traveling block 311 and the derrick 314 positioned over the borehole 332. As mentioned, the wellsite system 300 can include the rotary table 320 where the drillstring 325 pass through an opening in the rotary table 320.

As shown in the example of FIG. 3, the wellsite system 300 can include the kelly 318 and associated components, etc., or the top drive 340 and associated components. As to a kelly example, the kelly 318 may be a square or hexagonal metal/alloy bar with a hole drilled therein that serves as a mud flow path. The kelly 318 can be used to transmit rotary motion from the rotary table 320 via the kelly drive bushing 319 to the drillstring 325, while allowing the drillstring 325 to be lowered or raised during rotation. The kelly 318 can pass through the kelly drive bushing 319, which can be driven by the rotary table 320. As an example, the rotary table 320 can include a master bushing that operatively couples to the kelly drive bushing 319 such that rotation of the rotary table 320 can turn the kelly drive bushing 319 and hence the kelly 318. The kelly drive bushing 319 can include an inside profile matching an outside profile (e.g., square, hexagonal, etc.) of the kelly 318; however, with slightly larger dimensions so that the kelly 318 can freely move up and down inside the kelly drive bushing 319.

As to a top drive example, the top drive 340 can provide functions performed by a kelly and a rotary table. The top drive 340 can turn the drillstring 325. As an example, the top drive 340 can include one or more motors (e.g., electric and/or hydraulic) connected with appropriate gearing to a short section of pipe called a quill, that in turn may be screwed into a saver sub or the drillstring 325 itself. The top drive 340 can be suspended from the traveling block 311, so the rotary mechanism is free to travel up and down the derrick 314. As an example, a top drive 340 may allow for drilling to be performed with more joint stands than a kelly/rotary table approach.

In the example of FIG. 3, the mud tank 301 can hold mud, which can be one or more types of drilling fluids. As an example, a wellbore may be drilled to produce fluid, inject fluid or both (e.g., hydrocarbons, minerals, water, etc.).

In the example of FIG. 3, the drillstring 325 (e.g., including one or more downhole tools) may be composed of a series of pipes threadably connected together to form a long tube with the drill bit 326 at the lower end thereof. As the drillstring 325 is advanced into a wellbore for drilling, at some point in time prior to or coincident with drilling, the mud may be pumped by the pump 304 from the mud tank 301 (e.g., or other source) via a the lines 306, 308 and 309 to a port of the kelly 318 or, for example, to a port of the top drive 340. The mud can then flow via a passage (e.g., or passages) in the drillstring 325 and out of ports located on the drill bit 326 (see, e.g., a directional arrow). As the mud exits the drillstring 325 via ports in the drill bit 326, it can then circulate upwardly through an annular region between an outer surface(s) of the drillstring 325 and surrounding wall(s) (e.g., open borehole, casing, etc.), as indicated by directional arrows. In such a manner, the mud lubricates the drill bit 326 and carries heat energy (e.g., frictional or other energy) and formation cuttings to the surface where the mud (e.g., and cuttings) may be returned to the mud tank 301, for example, for recirculation (e.g., with processing to remove cuttings, etc.).

The mud pumped by the pump 304 into the drillstring 325 may, after exiting the drillstring 325, form a mudcake that lines the wellbore which, among other functions, may reduce friction between the drillstring 325 and surrounding wall(s) (e.g., borehole, casing, etc.). A reduction in friction may facilitate advancing or retracting the drillstring 325. During a drilling operation, the entire drillstring 325 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 326 of the drillstring 325 at a bottom of a wellbore, pumping of the mud commences to lubricate the drill bit 326 for purposes of drilling to enlarge the wellbore. As mentioned, the mud can be pumped by the pump 304 into a passage of the drillstring 325 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 325) may be transmitted uphole to an uphole device, which may relay such information to other equipment for processing, control, etc.

As an example, telemetry equipment may operate via transmission of energy via the drillstring 325 itself. For example, consider a signal generator that imparts coded energy signals to the drillstring 325 and repeaters that may receive such energy and repeat it to further transmit the coded energy signals (e.g., information, etc.).

As an example, the drillstring 325 may be fitted with telemetry equipment 352 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 3, an uphole control and/or data acquisition system 362 may include circuitry to sense pressure pulses generated by telemetry equipment 352 and, for example, communicate sensed pressure pulses or information derived therefrom for process, control, etc.

The assembly 350 of the illustrated example includes a logging-while-drilling (LWD) module 354, a measurement-while-drilling (MWD) module 356, an optional module 358, a rotary-steerable system (RSS) and/or motor 360, and the drill bit 326. Such components or modules may be referred to as tools where a drillstring can include a plurality of tools.

As to a RSS, it involves technology utilized for directional drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit (e.g., during directional drilling, etc.). A PDM operates as drilling fluid is pumped through it where the PDM converts hydraulic power of the drilling fluid into mechanical power to cause the bit to rotate.

As an example, a PDM may operate in a combined rotating mode where surface equipment is utilized to rotate a bit of a drillstring (e.g., a rotary table, a top drive, etc.) by rotating the entire drillstring and where drilling fluid is utilized to rotate the bit of the drillstring. In such an example, a surface RPM (SRPM) may be determined by use of the surface equipment and a downhole RPM of the mud motor may be determined using various factors related to flow of drilling fluid, mud motor type, etc. As an example, in the combined rotating mode, bit RPM can be determined or estimated as a sum of the SRPM and the mud motor RPM, assuming the SRPM and the mud motor RPM are in the same direction.

As an example, a PDM mud motor can operate in a so-called sliding mode, when the drillstring is not rotated from the surface. In such an example, a bit RPM can be determined or estimated based on the RPM of the mud motor.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 354 may be housed in a suitable type of drill collar and can contain one or a plurality of selected types of logging tools. It will also be understood that more than one LWD and/or MWD module can be employed, for example, as represented at by the module 356 of the drillstring assembly 350. Where the position of an LWD module is mentioned, as an example, it may refer to a module at the position of the LWD module 354, the module 356, etc. An LWD module can include capabilities for measuring, processing, and storing information, as well as for communicating with the surface equipment. In the illustrated example, the LWD module 354 may include a seismic measuring device.

The MWD module 356 may be housed in a suitable type of drill collar and can contain one or more devices for measuring characteristics of the drillstring 325 and the drill bit 326. As an example, the MWD tool 356 may include equipment for generating electrical power, for example, to power various components of the drillstring 325. As an example, the MWD tool 354 may include the telemetry equipment 352, for example, where the turbine impeller can generate power by flow of the mud; it being understood that other power and/or battery systems may be employed for purposes of powering various components. As an example, the MWD module 356 may include one or more of the following types of measuring devices: a weight-on-bit measuring device, a torque measuring device, a vibration measuring device, a shock measuring device, a stick slip measuring device, a direction measuring device, and an inclination measuring device.

FIG. 3 also shows some examples of types of holes that may be drilled. For example, consider a slant hole 372, an S-shaped hole 374, a deep inclined hole 376 and a horizontal hole 378.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 3, the wellsite system 300 can include one or more sensors 364 that are operatively coupled to the control and/or data acquisition system 362. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 300. As an example, a sensor or sensor may be at an offset wellsite where the wellsite system 300 and the offset wellsite are in a common field (e.g., oil and/or gas field).

As an example, one or more of the sensors 364 can be provided for tracking pipe, tracking movement of at least a portion of a drillstring, etc.

As an example, the system 300 can include one or more sensors 366 that can sense and/or transmit signals to a fluid conduit such as a drilling fluid conduit (e.g., a drilling mud conduit). For example, in the system 300, the one or more sensors 366 can be operatively coupled to portions of the standpipe 308 through which mud flows. As an example, a downhole tool can generate pulses that can travel through the mud and be sensed by one or more of the one or more sensors 366. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 300 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 4:
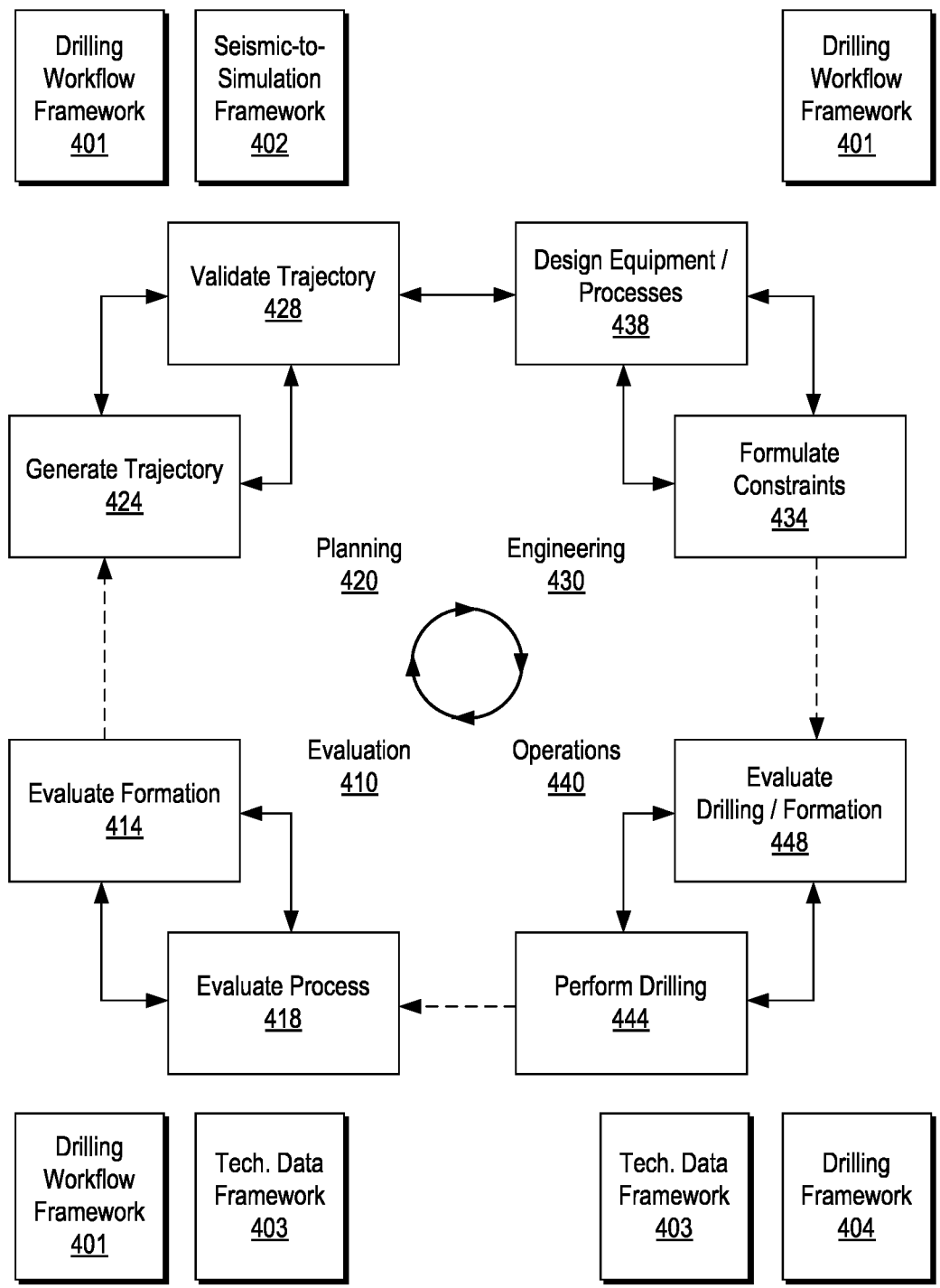
FIG. 4 illustrates an example of a system, according to an embodiment.

FIG. 4 shows an example of a system 400 that includes various equipment for evaluation 410, planning 420, engineering 430 and operations 440. For example, a drilling workflow framework 401, a seismic-to-simulation framework 402, a technical data framework 403 and a drilling framework 404 may be implemented to perform one or more processes such as a evaluating a formation 414, evaluating a process 418, generating a trajectory 424, validating a trajectory 428, formulating constraints 434, designing equipment and/or processes based at least in part on constraints 438, performing drilling 444 and evaluating drilling and/or formation 448.

In the example of FIG. 4, the seismic-to-simulation framework 402 can be, for example, the PETREL framework (Schlumberger, Houston, Texas) and the technical data framework 403 can be, for example, the TECHLOG framework (Schlumberger, Houston, Texas).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. An example of an object-based framework is the MICROSOFT .NET framework (Redmond, Washington), which provides a set of extensible object classes. In the .NET framework, an object class encapsulates a module of reusable code and associated data structures. Object classes can be used to instantiate object instances for use in by a program, script, etc. For example, borehole classes may define objects for representing boreholes based on well data.

As an example, a framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks.

As an example, a framework can include an analysis component that may allow for interaction with a model or model-based results (e.g., simulation results, etc.). As to simulation, a framework may operatively link to or include a simulator such as the ECLIPSE reservoir simulator (Schlumberger, Houston Texas), the INTERSECT reservoir simulator (Schlumberger, Houston Texas), etc.

The aforementioned PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As mentioned with respect to the DELFI environment, one or more frameworks may be interoperative and/or run upon one or another. As an example, a framework environment marketed as the OCEAN framework environment (Schlumberger, Houston, Texas) may be utilized, which allows for integration of add-ons (or plug-ins) into a PETREL framework workflow. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. In a framework environment (e.g., OCEAN, DELFI, etc.), a model simulation layer can include or operatively link to a model-centric framework. In an example embodiment, a framework may be considered to be a data-driven application. For example, the PETREL framework can include features for model building and visualization. As an example, a model may include one or more grids where a grid can be a spatial grid that conforms to spatial locations per acquired data (e.g., satellite data, logging data, seismic data, etc.).

As an example, a model simulation layer may provide domain objects, act as a data source, provide for rendering and provide for various user interfaces. Rendering capabilities may provide a graphical environment in which applications can display their data while user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 400 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL framework, for example, that operates on seismic data, seismic attribute(s), etc.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA framework, marketed by Schlumberger, Houston, Texas) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL framework, etc.).

As an example, a workflow may be a process implementable at least in part in a framework environment and by one or more frameworks. As an example, a workflow may include one or more worksteps that access a set of instructions such as a plug-in (e.g., external executable code, etc.). As an example, a framework environment may be cloud-based where cloud resources are utilized that may be operatively coupled to one or more pieces of field equipment such that data can be acquired, transmitted, stored, processed, analyzed, etc., using features of a framework environment. As an example, a framework environment may employ various types of services, which may be backend, frontend or backend and frontend services. For example, consider a client-server type of architecture where communications may occur via one or more application programming interfaces (APIs), one or more microservices, etc.

As an example, a framework may provide for modeling petroleum systems. For example, the modeling framework marketed as the PETROMOD framework (Schlumberger, Houston, Texas), which includes features for input of various types of information (e.g., seismic, well, geological, etc.) to model evolution of a sedimentary basin. The PETROMOD framework provides for petroleum systems modeling via input of various data such as seismic data, well data and other geological data, for example, to model evolution of a sedimentary basin. The PETROMOD framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL framework, workflows may be constructed to provide basin-to-prospect scale exploration solutions. Data exchange between frameworks can facilitate construction of models, analysis of data (e.g., PETROMOD framework data analyzed using PETREL framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG framework. As an example, the TECHLOG framework can be interoperable with one or more other frameworks such as, for example, the PETREL framework.

As an example, various aspects of a workflow may be completed automatically, may be partially automated, or may be completed manually, as by a human user interfacing with a software application that executes using hardware (e.g., local and/or remote). As an example, a workflow may be cyclic, and may include, as an example, four stages such as, for example, an evaluation stage (see, e.g., the evaluation equipment 410), a planning stage (see, e.g., the planning equipment 420), an engineering stage (see, e.g., the engineering equipment 430) and an execution stage (see, e.g., the operations equipment 440). As an example, a workflow may commence at one or more stages, which may progress to one or more other stages (e.g., in a serial manner, in a parallel manner, in a cyclical manner, etc.).

As an example, a workflow can commence with an evaluation stage, which may include a geological service provider evaluating a formation (see, e.g., the evaluation block 414). As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory (see, e.g., the generation block 424), which may involve execution of one or more G&G software packages. Examples of such software packages include the PETREL framework. As an example, a G&G service provider may determine a well trajectory or a section thereof, based on, for example, one or more model(s) provided by a formation evaluation (e.g., per the evaluation block 414), and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design (see, e.g., the validation block 428). Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory (see, e.g., the design block 338). In some embodiments, a second engineering service provider may perform such design using one of more software applications. Such designs may be stored in one or more databases maintained by one or more servers, which may, for example, employ STUDIO framework tools (Schlumberger, Houston, Texas), and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like (see, e.g., the formulation block 434). As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters (see, e.g., the blocks 344 and 348). As an example, operating parameters, formation encountered, data collected while drilling (e.g., using logging-while-drilling or measuring-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review (see, e.g., the evaluation block 418). As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in any gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc., basis.

Well planning can include determining a path of a well (e.g., a trajectory) that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

As an example, a system can allow for a reduction in waste, for example, as may be defined according to LEAN. In the context of LEAN, consider one or more of the following types of waste: transport (e.g., moving items unnecessarily, whether physical or data); inventory (e.g., components, whether physical or informational, as work in process, and finished product not being processed); motion (e.g., people or equipment moving or walking unnecessarily to perform desired processing); waiting (e.g., waiting for information, interruptions of production during shift change, etc.); overproduction (e.g., production of material, information, equipment, etc. ahead of demand); over processing (e.g., resulting from poor tool or product design creating activity); and defects (e.g., effort involved in inspecting for and fixing defects whether in a plan, data, equipment, etc.). As an example, a system that allows for actions (e.g., methods, workflows, etc.) to be performed in a collaborative manner can help to reduce one or more types of waste.

As an example, a system can be utilized to implement a method for facilitating distributed well engineering, planning, and/or drilling system design across multiple computation devices where collaboration can occur among various different users (e.g., some being local, some being remote, some being mobile, etc.). In such a system, the various users via appropriate devices may be operatively coupled via one or more networks (e.g., local and/or wide area networks, public and/or private networks, land-based, marine-based and/or areal networks, etc.).

As an example, a system may allow well engineering, planning, and/or drilling system design to take place via a subsystems approach where a wellsite system is composed of various subsystem, which can include equipment subsystems and/or operational subsystems (e.g., control subsystems, etc.). As an example, computations may be performed using various computational platforms/devices that are operatively coupled via communication links (e.g., network links, etc.). As an example, one or more links may be operatively coupled to a common database (e.g., a server site, etc.). As an example, a particular server or servers may manage receipt of notifications from one or more devices and/or issuance of notifications to one or more devices. As an example, a system may be implemented for a project where the system can output a well plan, for example, as a digital well plan, a paper well plan, a digital and paper well plan, etc. Such a well plan can be a complete well engineering plan or design for the particular project.

Figure 5:
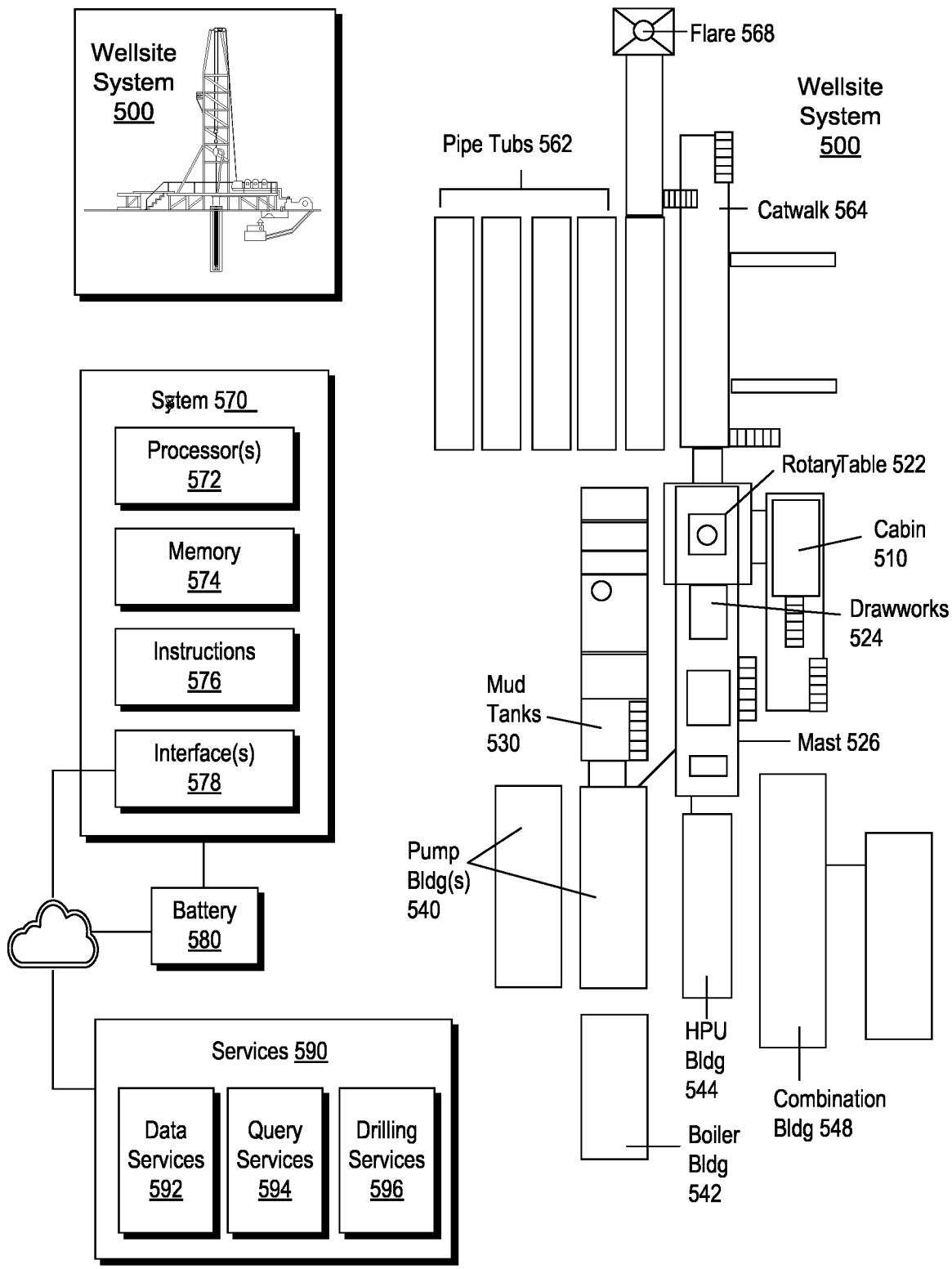
FIG. 5 illustrates an example of a wellsite system and an example of a computing system, according to an embodiment.

FIG. 5 shows an example of a wellsite system 500, specifically, FIG. 5 shows the wellsite system 500 in an approximate side view and an approximate plan view along with a block diagram of a system 570.

In the example of FIG. 5, the wellsite system 500 can include a cabin 510, a rotary table 522, drawworks 524, a mast 526 (e.g., optionally carrying a top drive, etc.), mud tanks 530 (e.g., with one or more pumps, one or more shakers, etc.), one or more pump buildings 540, a boiler building 542, an HPU building 544 (e.g., with a rig fuel tank, etc.), a combination building 548 (e.g., with one or more generators, etc.), pipe tubs 562, a catwalk 564, a flare 568, etc. Such equipment can include one or more associated functions and/or one or more associated operational risks, which may be risks as to time, resources, and/or humans.

As shown in the example of FIG. 5, the wellsite system 500 can include a system 570 that includes one or more processors 572, memory 574 operatively coupled to at least one of the one or more processors 572, instructions 576 that can be, for example, stored in the memory 574, and one or more interfaces 578. As an example, the system 570 can include one or more processor-readable media that include processor-executable instructions executable by at least one of the one or more processors 572 to cause the system 570 to control one or more aspects of the wellsite system 500. In such an example, the memory 574 can be or include the one or more processor-readable media where the processor-executable instructions can be or include instructions. As an example, a processor-readable medium can be a computer-readable storage medium that is not a signal and that is not a carrier wave.

FIG. 5 also shows a battery 580 that may be operatively coupled to the system 570, for example, to power the system 570. As an example, the battery 580 may be a back-up battery that operates when another power supply is unavailable for powering the system 570. As an example, the battery 580 may be operatively coupled to a network, which may be a cloud network. As an example, the battery 580 can include smart battery circuitry and may be operatively coupled to one or more pieces of equipment via a SMBus or other type of bus.

In the example of FIG. 5, services 590 are shown as being available, for example, via a cloud platform. Such services can include data services 592, query services 594 and drilling services 596. As an example, the services 590 may be part of a system such as the system 400 of FIG. 4.

As an example, the system 570 may be utilized to generate one or more rate of penetration drilling parameter values, which may, for example, be utilized to control one or more drilling operations.

Figure 6:
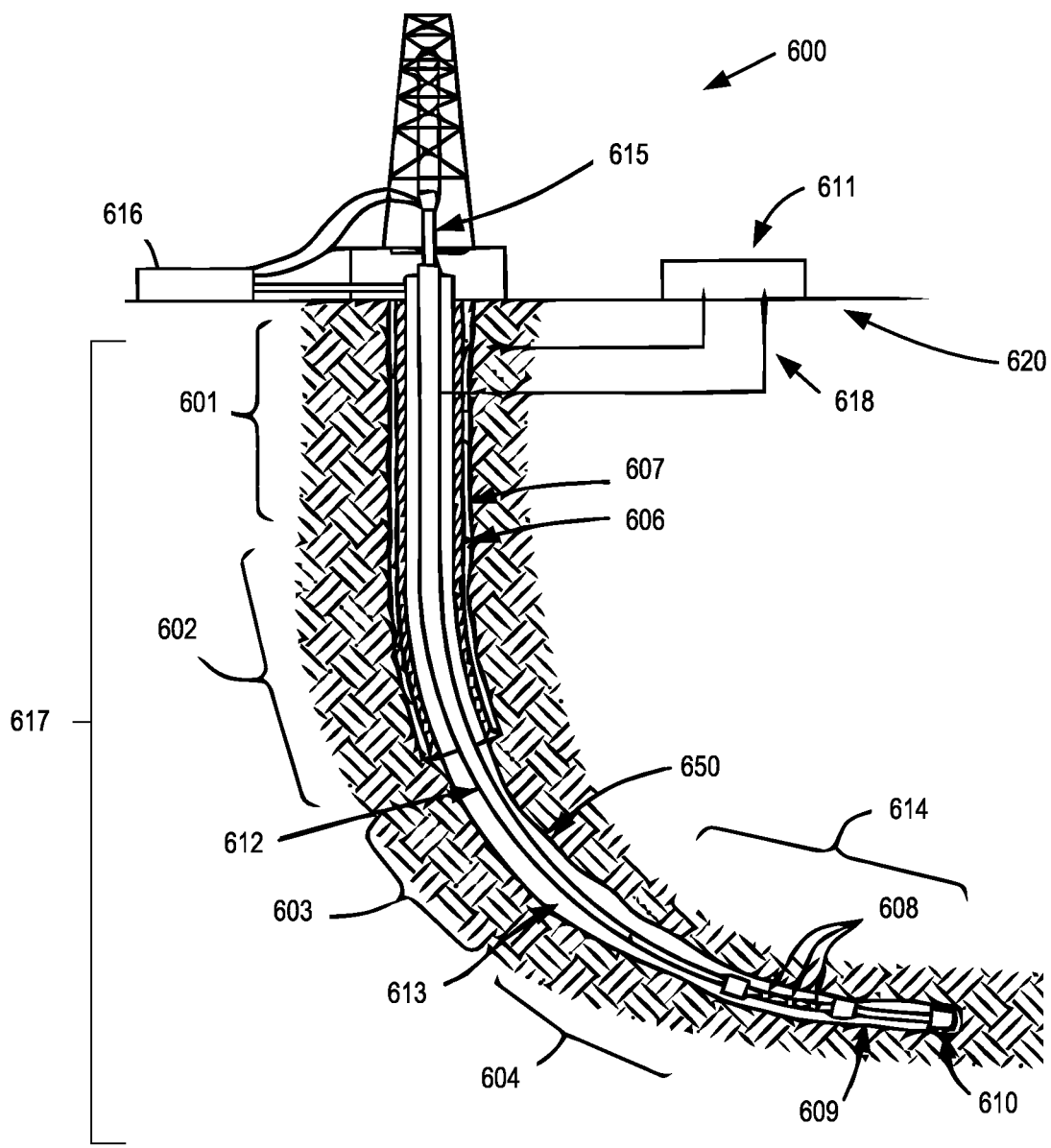
FIG. 6 illustrates an example of equipment in a geologic environment, according to an embodiment.

FIG. 6 shows a schematic diagram depicting an example of a drilling operation of a directional well in multiple sections. The drilling operation depicted in FIG. 6 includes a wellsite drilling system 600 and a field management tool 620 for managing various operations associated with drilling a bore hole 650 of a directional well 617. The wellsite drilling system 600 includes various components (e.g., drillstring 612, annulus 613, bottom hole assembly (BHA) 614, kelly 615, mud pit 616, etc.). As shown in the example of FIG. 6, a target reservoir may be located away from (as opposed to directly under) the surface location of the directional well 617. In such an example, special tools or techniques may be used to ensure that the path along the bore hole 650 reaches the particular location of the target reservoir.

As an example, the BHA 614 may include sensors 608, a rotary steerable system (RSS) 609, and a bit 610 to direct the drilling toward the target guided by a pre-determined survey program for measuring location details in the well. Furthermore, the subterranean formation through which the directional well 617 is drilled may include multiple layers (not shown) with varying compositions, geophysical characteristics, and geological conditions. Both the drilling planning during the well design stage and the actual drilling according to the drilling plan in the drilling stage may be performed in multiple sections (see, e.g., sections 601, 602, 603 and 604), which may correspond to one or more of the multiple layers in the subterranean formation. For example, certain sections (e.g., sections 601 and 602) may use cement 607 reinforced casing 606 due to the particular formation compositions, geophysical characteristics, and geological conditions.

In the example of FIG. 6, a surface unit 611 may be operatively linked to the wellsite drilling system 600 and the field management tool 620 via communication links 618. The surface unit 611 may be configured with functionalities to control and monitor the drilling activities by sections in real time via the communication links 618. The field management tool 620 may be configured with functionalities to store oilfield data (e.g., historical data, actual data, surface data, subsurface data, equipment data, geological data, geophysical data, target data, anti-target data, etc.) and determine relevant factors for configuring a drilling model and generating a drilling plan. The oilfield data, the drilling model, and the drilling plan may be transmitted via the communication link 618 according to a drilling operation workflow. The communication links 618 may include a communication subassembly.

During various operations at a wellsite, data can be acquired for analysis and/or monitoring of one or more operations. Such data may include, for example, subterranean formation, equipment, historical and/or other data. Static data can relate to, for example, formation structure and geological stratigraphy that define the geological structures of the subterranean formation. Static data may also include data about a bore, such as inside diameters, outside diameters, and depths. Dynamic data can relate to, for example, fluids flowing through the geologic structures of the subterranean formation over time. The dynamic data may include, for example, pressures, fluid compositions (e.g. gas oil ratio, water cut, and/or other fluid compositional information), and states of various equipment, and other information.

The static and dynamic data collected via a bore, a formation, equipment, etc. may be used to create and/or update a three dimensional model of one or more subsurface formations. As an example, static and dynamic data from one or more other bores, fields, etc. may be used to create and/or update a three dimensional model. As an example, hardware sensors, core sampling, and well logging techniques may be used to collect data. As an example, static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once a well is formed and completed, depending on the purpose of the well (e.g., injection and/or production), fluid may flow to the surface (e.g., and/or from the surface) using tubing and other completion equipment. As fluid passes, various dynamic measurements, such as fluid flow rates, pressure, and composition may be monitored. These parameters may be used to determine various characteristics of a subterranean formation, downhole equipment, downhole operations, etc.

As an example, a system can include a framework that can acquire data such as, for example, real time data associated with one or more operations such as, for example, a drilling operation or drilling operations. As an example, consider the PERFORM toolkit framework (Schlumberger Limited, Houston, Texas).

As an example, a service can be or include one or more of OPTIDRILL, OPTILOG and/or other services marketed by Schlumberger Limited, Houston, Texas.

The OPTIDRILL technology can help to manage downhole conditions and BHA dynamics as a real time drilling intelligence service. The service can incorporate a rigsite display (e.g., a wellsite display) of integrated downhole and surface data that provides actionable information to mitigate risk and increase efficiency. As an example, such data may be stored, for example, to a database system (e.g., consider a database system associated with the STUDIO framework).

The OPTILOG technology can help to evaluate drilling system performance with single- or multiple-location measurements of drilling dynamics and internal temperature from a recorder. As an example, post-run data can be analyzed to provide input for future well planning.

As an example, information from a drill bit database may be accessed and utilized. For example, consider information from Smith Bits (Schlumberger Limited, Houston, Texas), which may include information from various operations (e.g., drilling operations) as associated with various drill bits, drilling conditions, formation types, etc.

As an example, one or more QTRAC services (Schlumberger Limited, Houston Texas) may be provided for one or more wellsite operations. In such an example, data may be acquired and stored where such data can include time series data that may be received and analyzed, etc.

As an example, one or more M-I SWACO services (M-I L.L.C., Houston, Texas) may be provided for one or more wellsite operations. For example, consider services for value-added completion and reservoir drill-in fluids, additives, cleanup tools, and engineering. In such an example, data may be acquired and stored where such data can include time series data that may be received and analyzed, etc.

As an example, one or more ONE-TRAX services (e.g., via the ONE-TRAX software platform, M-I L.L.C., Houston, Texas) may be provided for one or more wellsite operations. In such an example, data may be acquired and stored where such data can include time series data that may be received and analyzed, etc.

As an example, various operations can be defined with respect to WITS or WITSML, which are acronyms for well-site information transfer specification or standard (WITS) and markup language (WITS ML). WITS/WITSML specify how a drilling rig or offshore platform drilling rig can communicate data. For example, as to slips, which are an assembly that can be used to grip a drillstring in a relatively non-damaging manner and suspend the drillstring in a rotary table, WITS/WITSML define operations such as "bottom to slips" time as a time interval between coming off bottom and setting slips, for a current connection; "in slips" as a time interval between setting the slips and then releasing them, for a current connection; and "slips to bottom" as a time interval between releasing the slips and returning to bottom (e.g., setting weight on the bit), for a current connection.

Well construction can occur according to various procedures, which can be in various forms. As an example, a procedure can be specified digitally and may be, for example, a digital plan such as a digital well plan. A digital well plan can be an engineering plan for constructing a wellbore. As an example, procedures can include information such as well geometries, casing programs, mud considerations, well control concerns, initial bit selections, offset well information, pore pressure estimations, economics and special procedures that may be utilized during the course of well construction, production, etc. While a drilling procedure can be carefully developed and specified, various conditions can occur that call for adjustment to a drilling procedure.

As an example, an adjustment can be made at a rigsite when acquisition equipment acquires information about conditions, which may be for conditions of drilling equipment, conditions of a formation, conditions of fluid(s), conditions as to environment (e.g., weather, sea, etc.), etc. Such an adjustment may be made on the basis of personal knowledge of one or more individuals at a rigsite. As an example, an operator may understand that conditions call for an increase in mudflow rate, a decrease in weight on bit, etc. Such an operator may assess data as acquired via one or more sensors (e.g., torque, temperature, vibration, etc.). Such an operator may call for performance of a procedure, which may be a test procedure to acquire additional data to understand better actual physical conditions and physical phenomena that may occur or that are occurring. An operator may be under one or more time constraints, which may be driven by physical phenomena, such as fluid flow, fluid pressure, compaction of rock, borehole stability, etc. In such an example, decision making by the operator can depend on time as conditions evolve. For example, a decision made at one fluid pressure may be sub-optimal at another fluid pressure in an environment where fluid pressure is changing. In such an example, timing as to implementing a decision as an adjustment to a procedure can have a broad ranging impact. An adjustment to a procedure that is made too late or too early can adversely impact other procedures compared to an adjustment to a procedure that is made at an optimal time (e.g., implemented at the optimal time).

Figure 7:
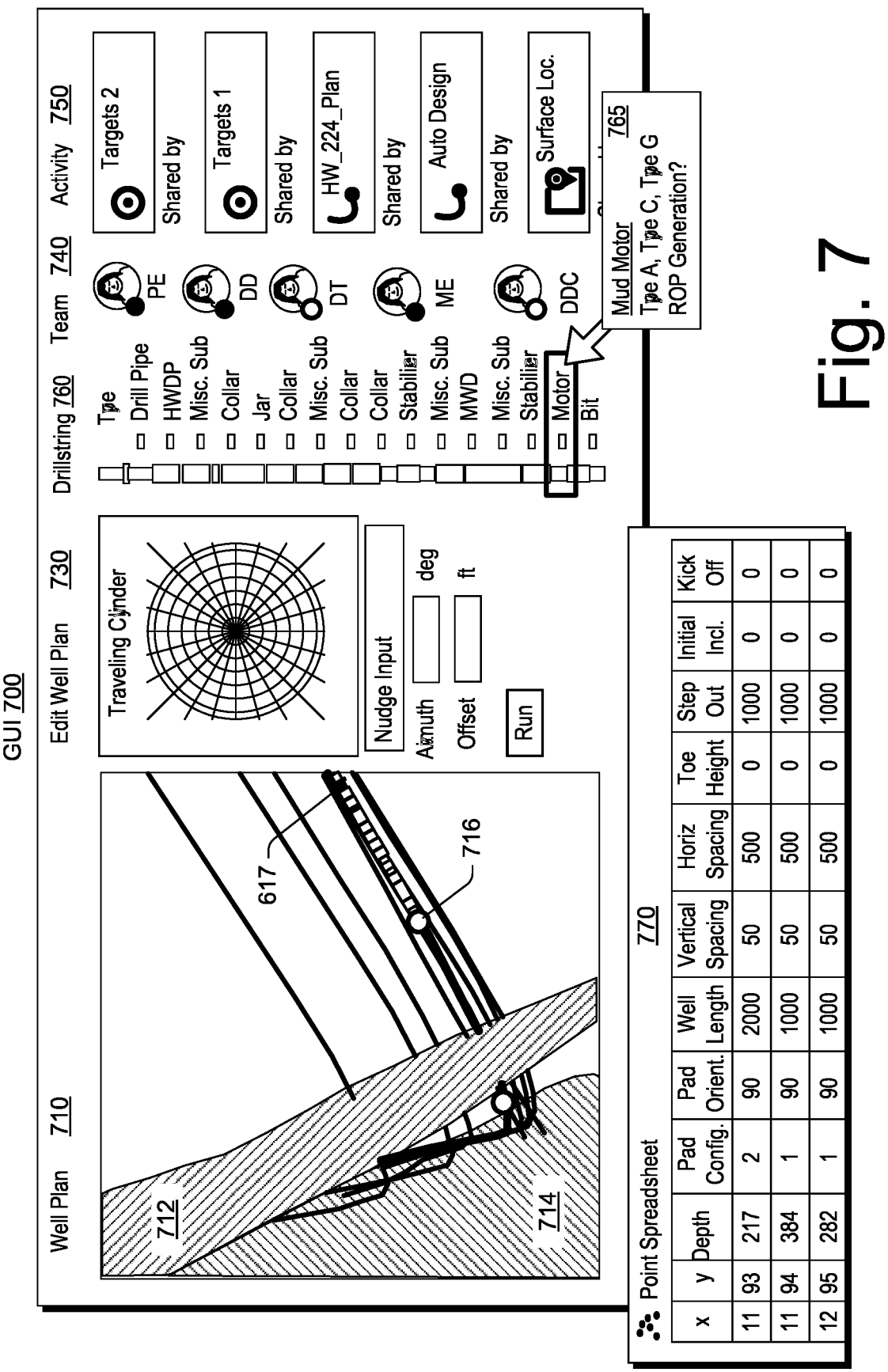
FIG. 7 illustrates an example of a graphical user interface, according to an embodiment.

FIG. 7 shows an example of a graphical user interface (GUI) 700 that includes information associated with a well plan. Specifically, the GUI 700 includes a panel 710 where surfaces representations 712 and 714 are rendered along with well trajectories where a location 716 can represent a position of a drillstring 717 along a well trajectory. The GUI 700 may include one or more editing features such as an edit well plan set of features 730. The GUI 700 may include information as to individuals of a team 740 that are involved, have been involved and/or are to be involved with one or more operations. The GUI 700 may include information as to one or more activities 750.

As shown in the example of FIG. 7, the GUI 700 can include a graphical control of a drillstring 760 where, for example, various portions of the graphical control of the drillstring 760 may be selected to expose one or more associated parameters (e.g., type of equipment, equipment specifications, operational history, etc.). In the example of FIG. 7, the drillstring graphical control 760 includes components such as drill pipe, heavy weight drill pipe (HWDP), subs, collars, jars, stabilizers, motor(s) and a bit. A drillstring can be a combination of drill pipe, a bottom hole assembly (BHA) and one or more other tools, which can include one or more tools that can help a drill bit turn and drill into material (e.g., a formation).

As an example, a workflow can include utilizing the graphical control of the drillstring 760 to select and/or expose information associated with a component or components such as, for example, a bit and/or a mud motor. In the example of FIG. 7, a graphical control 765 is shown that can be rendered responsive to interaction with the graphical control of the drillstring 760, for example, to select a type of component and/or to specify one or more features of the drillstring 760 (e.g., for training a neural network model, etc.). As to the graphical control 765, it may provide output to an emissions framework (EF), as the type of motor and/or use thereof may impact emissions of one or more field operations. As explained, a drill bit may be rotated via one or more mechanisms (e.g., rotary drive, top drive, mud motor, etc.). Such modes of operation can be associated with particular types of energy utilization. As an example, the GUI 700 can include one or more fields and/or pop-ups that can be generated based at least in part on output of an EF. For example, consider the graphical control 765 being highlighted as to a particular type of mud motor that will make a field operation (e.g., drilling) more efficient and/or otherwise reduce emissions (e.g., compared to another mode, etc.). As an example, an EF can output a schedule, which may be a schedule associated with energy utilization, drilling mode, etc. For example, consider a schedule that associates drilling mode (e.g., rotational and sliding) with respect to depth and/or time and emissions. In such an example, the schedule may be rendered to a display such that a user may identify particular points, times, regions, etc., where emissions may be less or may be more (e.g., as associated with a digital drill plan and/or execution thereof, etc.).

FIG. 7 also shows an example of a table 770 as a point spreadsheet that specifies information for a plurality of wells. As shown in the example table 770, coordinates such as "x" and "y" and "depth" can be specified for various features of the wells, which can include pad parameters, spacings, toe heights, step outs, initial inclinations, kick offs, etc.

Figure 8:
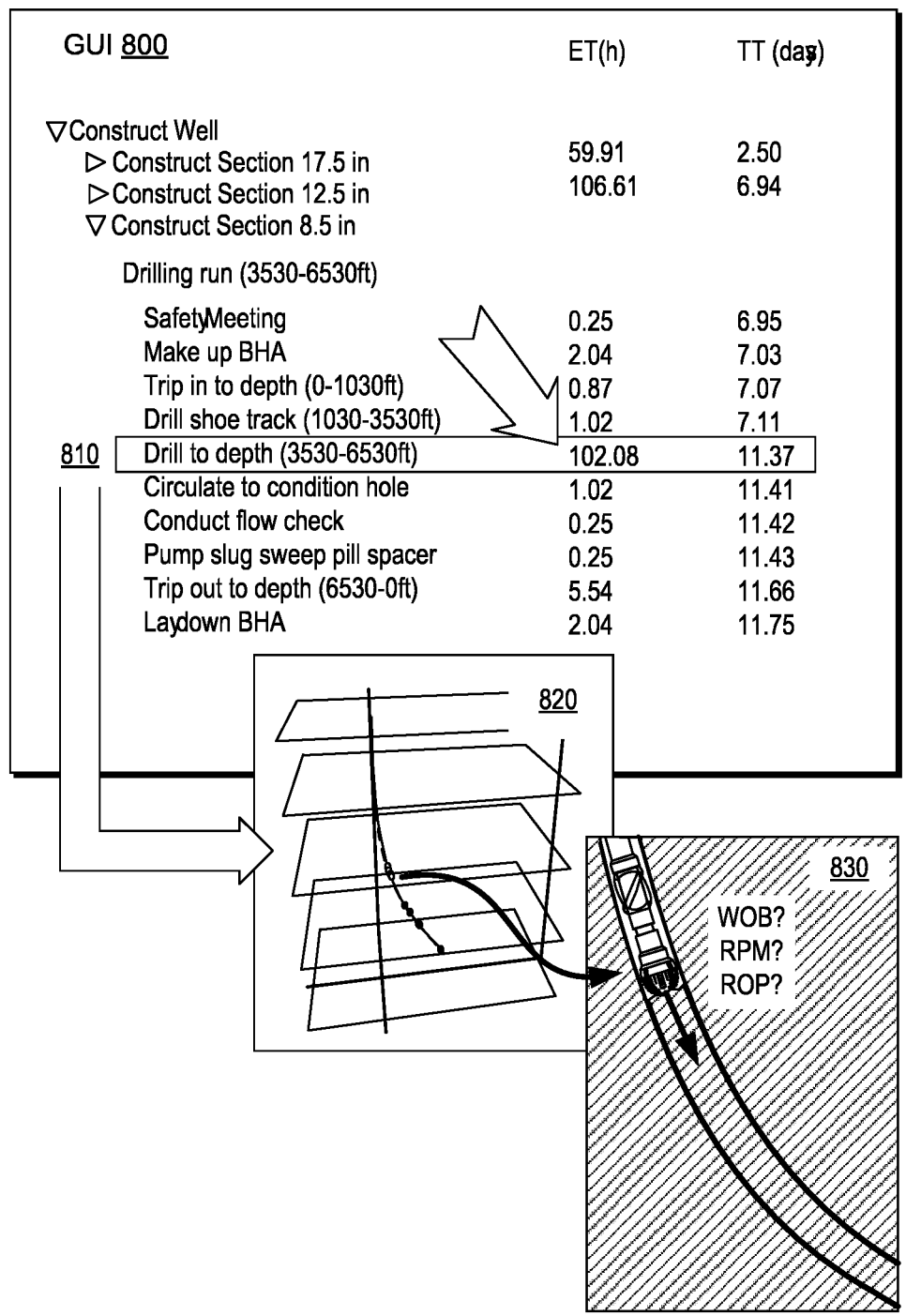
FIG. 8 illustrates an example of a graphical user interface, according to an embodiment.

FIG. 8 shows an example of a graphical user interface 800 that includes various types of information for construction of a well where times are rendered for corresponding actions. In the example of FIG. 8, the times are shown as an estimated time (ET) in hours and a total or cumulative time (TT), which is in days. Another time may be a clean time, which can be for performing an action or actions without occurrence of non-productive time (NPT) while the estimated time (ET) can include NPT, which may be determined using one or more databases, probabilistic analysis, etc. In the example of FIG. 8, the total time (TT or cumulative time) may be a sum of the estimated time column. As an example, during execution and/or replanning the GUI 800 may be rendered and revised accordingly to reflect changes. As shown in the example of FIG. 8, the GUI 800 can include selectable elements and/or highlightable elements. As an example, an element may be highlighted responsive to a signal that indicates that an activity is currently being performed, is staged, is to be revised, etc. For example, a color coding scheme may be utilized to convey information to a user via the GUI 800.

As to the highlighted element 810 ("Drill to depth (3530-6530 ft)") the estimated time is 102.08 hours, which is greater than four days. For the drilling run for the 8.5 inch section of the borehole, the highlighted element 810 is the longest in terms of estimated time. FIG. 8 also shows a GUI 820 for a borehole trajectory and a GUI 830 of a drillstring with a drill bit where drilling may proceed according to a weight on bit (WOB) and a rotational speed (RPM) to achieve a rate of penetration (ROP). In the example of FIG. 8, the GUI 830 and parameters thereof may be associated with energy utilization and emissions and/or other impact.

As an example, the GUI 830 may be operatively coupled to an emissions framework such that, for example, variations in RPM and/or WOB can be visualized with respect to emissions, which may provide for optimizations, control, etc. As an example, an ROP may be associated with emissions where an optimal ROP may be an ROP that considers emissions. For example, consider an ROP per unit energy expended and/or type of emissions associated with that energy expenditure. In such an example, changes may occur in a manner dependent on mode of drilling (e.g., rotational, sliding, etc.). As an example, a drilling run (e.g., the drill to depth) may be associated with a GHG and/or a carbon credit. As an example, an optimization scheme may aim to optimize the drilling run within the limits of the GHG and/or carbon credit. Such an approach can apply the credit to field operations that can best utilize the credit for drilling advancement while reducing utilization elsewhere, which may be achieved through drilling techniques, operation of mud pumps, etc.

As an example, the GUI 800 can be operatively coupled to one or more systems that can assist and/or control one or more drilling operations. For example, consider a system that generates rate of penetration values, which may be, for example, rate of penetration set points. Such a system may be an automation assisted system and/or a control system. For example, a system may render a GUI that displays one or more generated rate of penetration values and/or a system may issue one or more commands to one or more pieces of equipment to cause operation thereof at a generated rate of penetration (e.g., per a WOB, a RPM, etc.). As an example, a time estimate may be given for the drill to depth operation using manual, automated and/or semi-automated drilling. For example, where a driller enters a sequence of modes, the time estimate may be based on that sequence; whereas, for an automated approach, a sequence can be generated (e.g., an estimated automated sequence, a recommended estimated sequence, etc.) with a corresponding time estimate. In such an approach, a driller may compare the sequences and select one or the other or, for example, generate a hybrid sequence (e.g., part manual and part automated, etc.).

As an example, a system can include a framework for emissions (e.g., an emissions framework or EF). For example, consider a framework for estimating emissions that can include greenhouse gas (GHG) emissions where the framework may be part of a framework environment such as in the system 100 of FIG. 1.

An emissions framework may assess and/or optimize one or more operations. For example, as explained with respect to drilling, energy can be utilized to perform various tasks such as rotating a drillstring, rotating a drill bit, pulling a drillstring out of a hole, running a drillstring into a hole, pumping mud, flaring gas, etc. Where operations include hydraulic fracturing, the emissions framework may account for manufacturing and/or transport related emissions for fluids, chemicals, etc. In such an example, onsite pumping equipment may be considered as a power sink for which energy is expended.

In various instances, the emissions framework may provide output particular values that may be associated with regulated components, market related components, etc. For example, carbon metrics may be germane to reports and/or carbon markets (e.g., carbon credits, etc.). One or more costs, efficiencies, etc., may be considered by the emissions framework, which may be used to output a plan, execution of the plan, maintenance and/or control of planned wells, fluid networks, processing facilities, etc.

The emissions framework may be used to manage environmental risks, identify reduction opportunities, and/or provide public reporting. The emissions framework may output information with one or more indicators as to how accurate and/or how probable estimates may be. The emissions framework may operate according to various boundaries that can be defined to reflect the reality of one or more operations being performed. The emissions framework may include selectable output formats, metrics, calculation methodologies, etc., which may comport with regulations, company formats, etc. Such an approach can help to quantify and identify trends and assess performance over time.

The emissions framework can include a database or library of operations, supplies, sources, etc. Such an approach can help to construct representations of a company's environmental footprint. As an example, an emissions framework can include or provide access to an inventory of items relevant to a company's activities, which can be defining with appropriate boundaries that reflect the reality of each of the activities (e.g., along with inclusion of relevant impact sources, etc.). In various instances, an emissions framework can provide for transparency, for example, via documentation of data sources and calculations used, along with calculations methodologies that can help to minimize uncertainties.

The emissions framework can be operated to account for particular localities, times of year, weather, etc. For example, depending on weather, emissions may change or behave differently. The presence of humidity (e.g., rain, snow, etc.) can have an impact on emissions and how such emissions may impact an environment (e.g., travel, dissipate, react, etc.).

A framework environment can include an option for execution of a framework that may run in the background, foreground or both. For example, the DRILLPLAN framework in the example system 100 of FIG. 1 can be executed where an emissions framework can be optionally instantiated for foreground and/or background execution that can assess information of the DRILLPLAN framework with respect to emissions. In such an example, the emissions framework may act in response by making suggestions and/or changes that can help reduce emissions, tailor emissions, balance emissions, select one type of emissions over another, etc. One approach can take into account multiple sources of energy, supplies, equipment, etc., and life cycle analyses, cradle-to-cradle analyses, regulations, weather, project durations, etc. Where certain operations can be powered by solar energy (e.g., battery stored or direct), time of day (e.g., night or day), weather, etc., may be taken into account. For example, consider utilizing solar energy during sunny days where sufficient sunshine exists to power particular equipment (e.g., pumps, sensors, etc.). In instances where weather, time of day, time of year, etc., reduce solar energy generation, the emissions framework may recommend and/or change to another source of energy. In such a manner, equipment, equipment operations, etc., may be optimized to reduce emissions. In such an example, the emissions framework may generate a time-based schedule, a state-based schedule, etc., which may be driven by sensor data and/or other information (e.g., operational triggers, etc.). In this example, a plan such as a well plan may be accompanied by and/or include an emissions related schedule.

The emissions framework can be used to develop an environmental footprint via one or more modeling approaches for digital management of GHG emissions, water usage, wastes handling during well construction activities, etc. The emissions framework may be used to perform simulations, optionally in combination with one or more other frameworks, such that a footprint or footprints can be understood and utilized as part of well planning, monitoring impact levels during well operations and, for example, for continuously reducing emissions/impacts.

A model may be a machine learning model that can be trained to generate a trained machine learning model. The model may utilize sensor data, which may be from one or more types of sensors. The sensor(s) may be a site-based sensor, a sky based sensor (e.g., drone, satellite, etc.), or another type of sensor.

Various types of data may be utilized for insight to calibrate estimations and recognize improvement opportunities, and define metrics to incorporate one or more footprints as part of well planning optimization workflows. Estimates, footprints, etc., may be presented in a probabilistic manner with, for example, P10, P50, P90 bounds. An emissions framework can utilize a scope-based approach where various scopes are taken into account for purposes of determining emissions, utilization of resources, etc.

Figure 9:
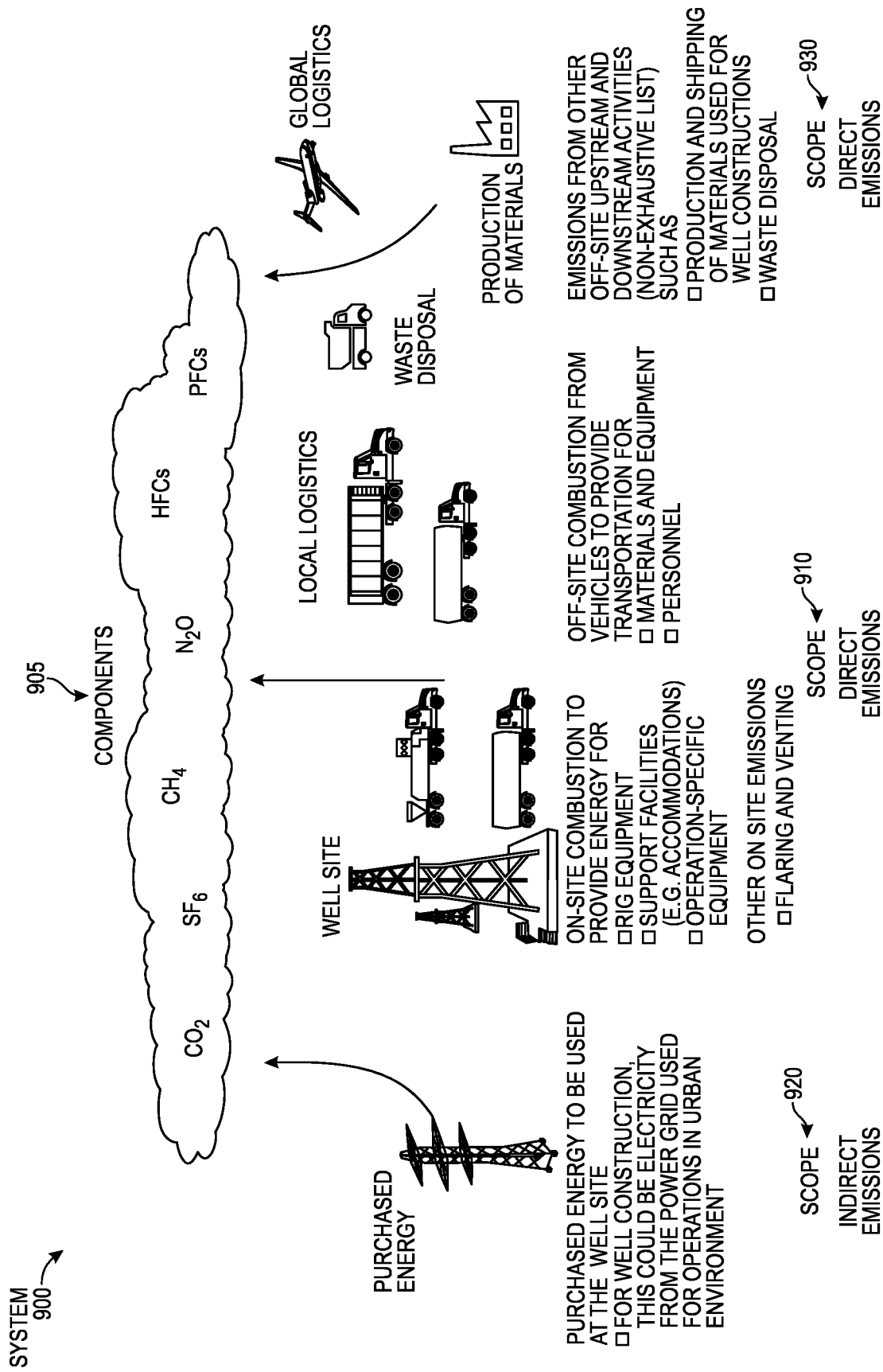
FIG. 9 illustrates an example of a system, according to an embodiment.

FIG. 9 shows an example of a system 900 that can output components 905, which may be GHG components, based on one or more scopes (three are shown: 910, 920 and 930). As shown, the scope 910 can consider on-site combustion to provide energy for rig equipment, support facilities (e.g., accommodations), operation-specific equipment, off-site combustion from vehicles to provide transportation for materials and equipment, personnel, etc. For example, a gas turbine power generator may be utilized to generate electrical power from a hydrocarbon, hydrogen, etc., combustion source. Site emissions such as emissions from flaring gas, venting gas, etc., which may be generated during one or more well operations may be considered.

As to the scope 920, the EF may consider purchased energy to be used at a well site. For well construction, such energy may be electricity from the power grid used for operations in urban environment.

As to the scope 930, the EF may consider emissions from one or more other off-site upstream and downstream activities such as, for example, production and shipping of materials used for well constructions, waste disposal, etc.

A scope or scopes may follow one or more types of standardized protocols, as described in "The Greenhouse Gas Protocol, A Corporate Accounting and Reporting Standard", Revised Edition, of the World Business Council for Sustainable Development and the World Resources Institute, ISBN 1-56973-568-9 (116 pages), which is incorporated by reference herein.

Figure 10:
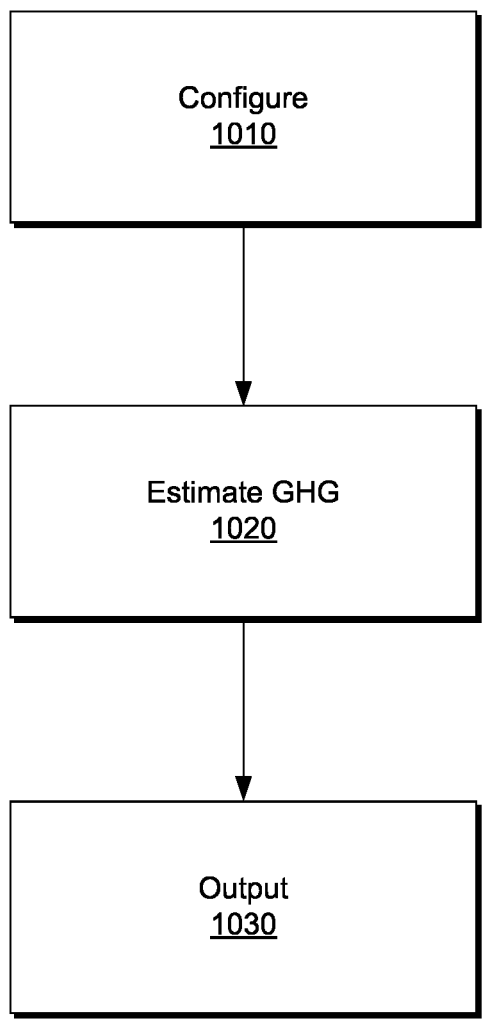
FIG. 10 illustrates an example of a method, according to an embodiment.

FIG. 10 shows an example of a method 1000 that includes a configuration block 1010, an estimation block 1020, and an output block 1030. The block 1010 can be utilized for identifying emission sources (e.g., by scope, etc.) and defining parameters (e.g., emission factors, GWP, etc.). The block 1010 can also be utilized for identifying utilization of sources by activity and defining parameters to estimate energy consumption (e.g., by source type, from well plan data or manual input for data not available as part of the design, etc.). The block 1010 can also be utilized for calculating approaches (e.g., estimation using calculated energy consumed, power/energy consumption by source/activity from offset data, and/or a hybrid approach (estimation corrected by calibration factors from offset data), etc.).

The block 1020 can be utilized for calculating and/or estimating energy consumption for each activity from sources, estimating emissions by activity and GHG type, and/or calculating combined emissions (CO2-e), by activity and total (e.g., using GWP, etc.). The block 1030 can be utilized for defining output structure and/or metrics, for example, according to agreed data model(s) (e.g., to exchange data between planning and operations), consolidating GHG emissions output by defined metrics (e.g., per activity, per day, per activity type, per drilled length, etc.) and/or generating report(s) of total GHG emissions, metrics, and associated data (e.g. source of parameters used for estimation) according to selected standard(s).

As an example, the method 1000 may be integrated into one or more frameworks, environments, etc. As explained, a framework may be executed in combination with an EF such that output of the EF can inform operations of and/or interactions with the framework.

Figure 11:
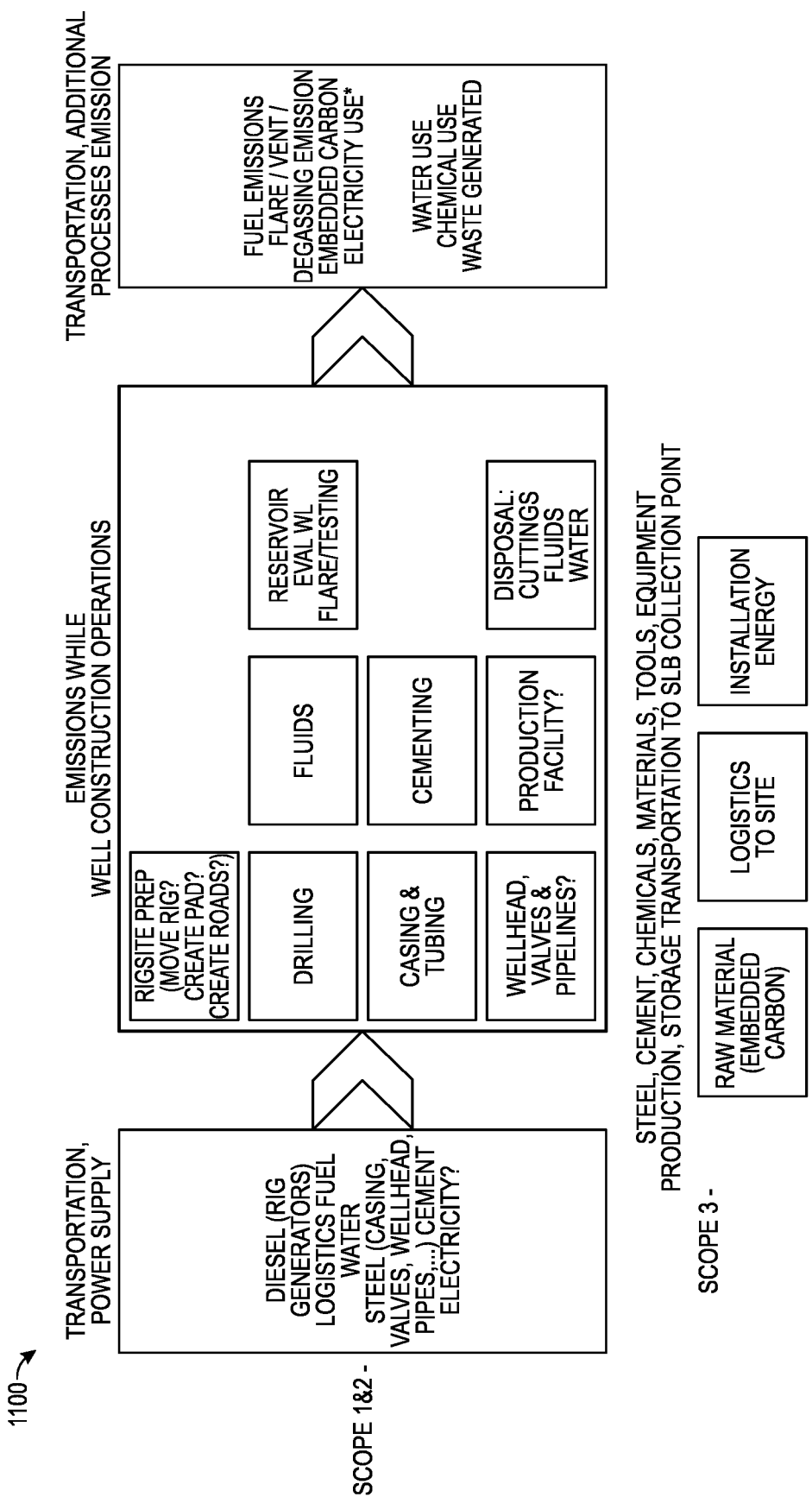
FIG. 11 illustrates an example of a system, according to an embodiment.

FIG. 11 shows an example of a system 1100 that can be utilized to perform one or more workflows. As an example, the EF can include one or more features of the system 1100, which may, for example, provide for execution of a method such as the method 1000 of FIG. 10. As an example, the graphics of FIG. 11 may be part of a graphical user interface (GUI), which may be rendered to a display and selected, highlighted, animated, etc., for various types of interactions.

Figure 12:
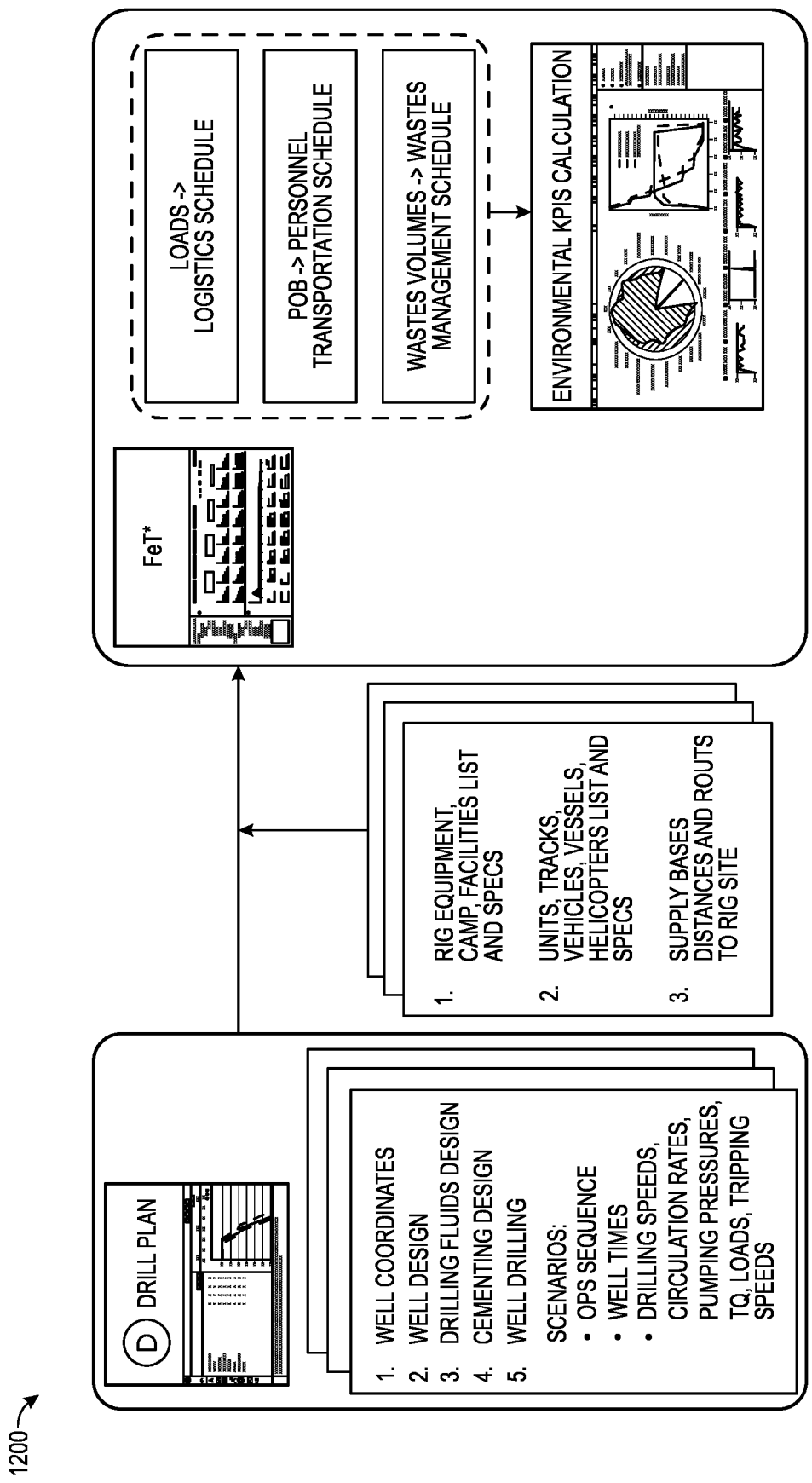
FIG. 12 illustrates an example of a system, according to an embodiment.

FIG. 12 shows an example of a workflow 1200, which can include, for example, execution of the EF in combination with a framework such as the DRILLPLAN framework. As shown, various outputs from the framework can be combined with other information and utilized by the EF to generate environmental performance indicators (PIs), which may be rendered in graphical form, numeric form, etc., to a display (e.g., as a GUI, etc.).

As explained, a scenario can include execution of the DRILLPLAN framework for well construction planning within the DELFI environment, which can provide for preparation of a well plan that includes the well design, operations sequence, and/or well time and cost. Such outputs can be inputs to the EF, which may, in turn, provide outputs that can be utilized for one or more revisions to the DRILLPLAN framework. In such an example, a loop or loops (e.g., iterations) may be generated that inform the DRILLPLAN framework based on computations as to emissions, impacts, etc. (e.g., consider GHG emissions and/or impacts).

As an example, a system may provide for processing data, capturing additional data (e.g., from one or more sources), simulating a GHG footprint or footprints to generate one or more environmental PIs. In another example, the EF may provide for sensitivity analysis and calibration, which may help to optimize a plan and adjust one or more models (e.g., using available offset data to improve calculations accuracy, etc.).

As to some examples of workflows, three workflows are presented below, which may be described using themes.

Example Workflow A—GHG Footprint Calculation for Well Planning

Such a workflow can provide for managing of GHG emissions. For a well construction activity, the EF can generate a GHG footprint estimation during the well planning phase to establish a base line PI(s). During an execution phase, such a workflow can evaluate the simulated value(s) with real values to calculate performance. Such an approach can include comparing footprints of different well design options and, for example, proposing one or more optimization solutions to reduce the overall environmental impact of the well construction process. Such a workflow can be part of a solution to estimate environmental footprint using the well design data and additional operations/logistic data available.

Example Workflow B—Real-Time Monitoring of GHG Footprint

Once a GHG plan/model is created (e.g., as per Workflow A), Workflow B can then monitor the real-time operations GHG emissions versus the plan based on the one or more PIs for reporting purposes and AFE tracking. Such an approach may provide for a subsequent workflow (e.g., Workflow C) for learning from the actual well and calibrating. Workflow B can provide a solution to calculate and track one or more PIs for GHG emissions during real-time well operations.

Example Workflow C—GHG Footprint Calibration Using Offset Data

Such a workflow can provide for calculation of one or more GHG footprints that can include one or more assumptions that could potentially make the output different from actual measurements. For example, after actual collection of the real emissions data during execution phase (as per Workflow B), Workflow C may calibrate and/or validate one or more existing calculation models to have higher forecast accuracy for further planned wells. For example, consider a machine learning (ML) approach where one or more models can be revised, further trained, etc. Workflow C may provide a solution to calibrate footprint(s) calculated forecast using offset data and/or real-time data to improve calculation accuracy.

FIG. 13 shows an example of a scope-based approach 1300 where multiple scopes and/or phases can be defined and utilized, for example, via an EF and/or one or more other frameworks. A system can include a configuration templates manager that includes a configuration template editor to define estimation parameters. The system can include a GHG emissions estimator task and object at a well level, a GHG emissions estimator editor to define estimation parameters from the configuration template and user input, a GHG emissions AEA to calculate GHG emissions for a well activity plan (e.g., including automated power inputs for activities from engineering data, etc.) and, for example, a report generator as per desired outputs.

Figure 14:
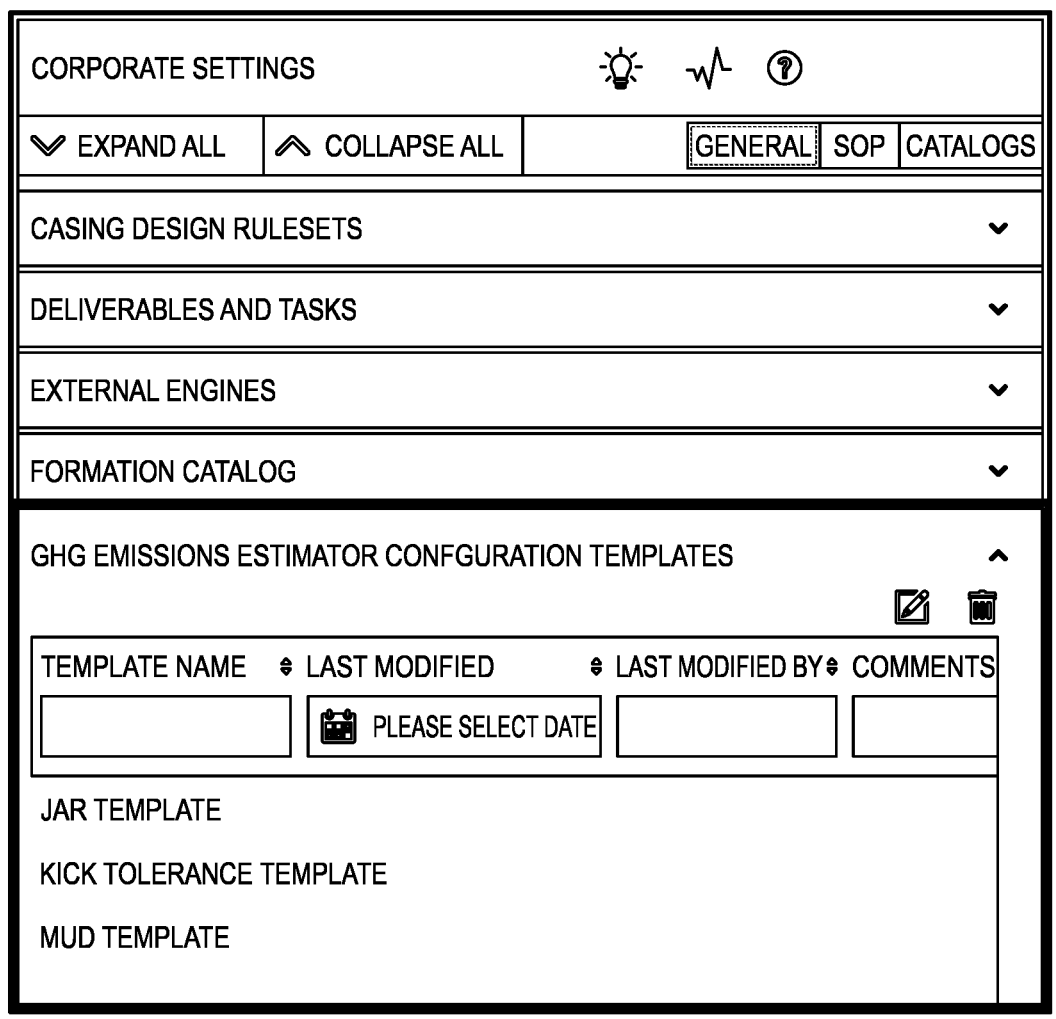
FIG. 14 illustrates an example of a graphical user interface, according to an embodiment.

FIG. 14 shows an example of a GUI 1400 for multiple configuration templates for a GHG emissions estimator to define estimation parameters for different operational environments. As shown, the configuration templates managed can be for a particular context such as corporate settings with one or more options to add, edit and delete templates. Such a GUI can provide access to a configuration template editor.

Figure 15:
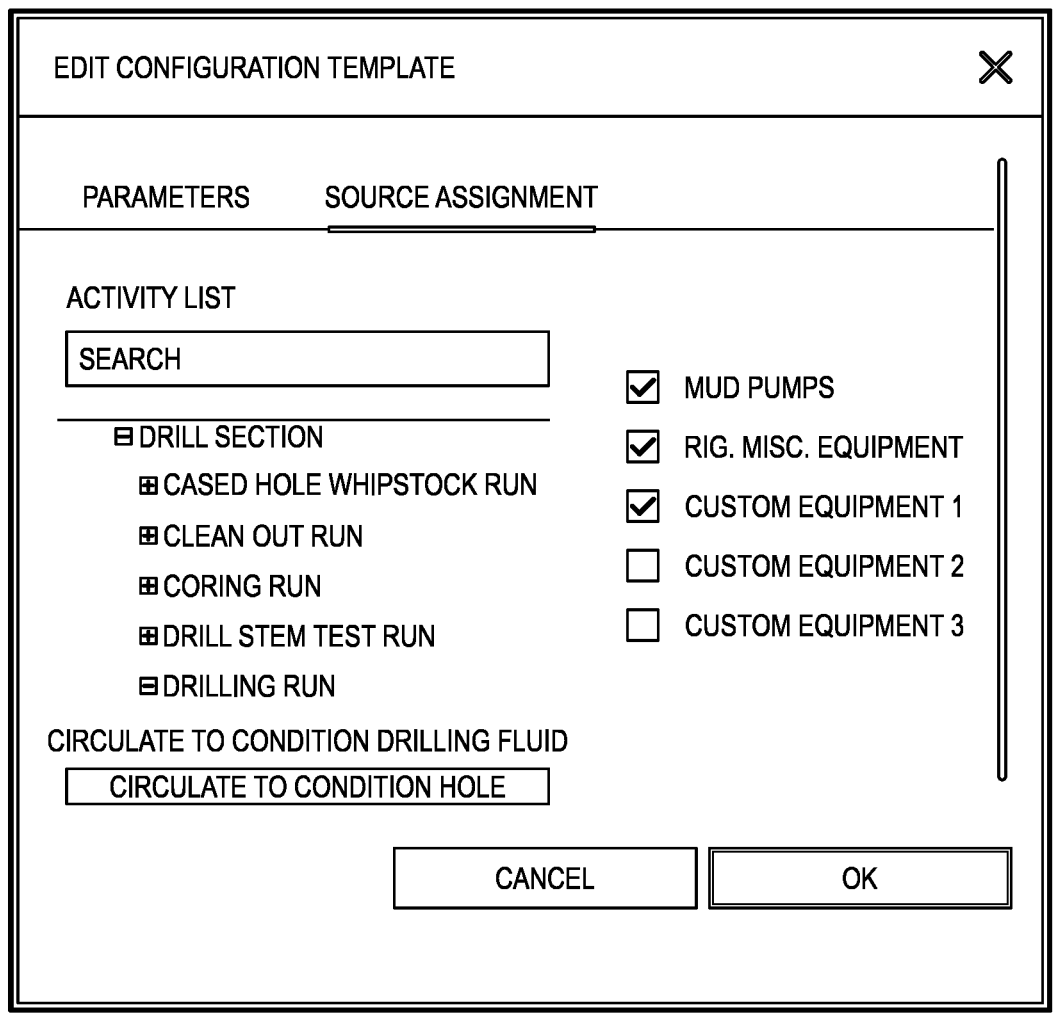
FIG. 15 illustrates an example of a graphical user interface, according to an embodiment.

FIG. 15 shows an example of a GUI 1500 for a configuration template editor to set up a GHG emissions estimation for a specific operating environment. As shown, such a GUI can provide for various parameters, which may include GWP to consolidate emissions by CO2-e, emissions target for AEA limits, emissions source specific parameters, rig parameters, list(s) of equipment parameters, fuel data (e.g., properties, consumption and emissions factors), other equipment parameters (e.g., mobile wireline, cementing, etc.), vehicles (e.g., transportation, drone, etc.) parameters, emissions factors by unit of measurement (e.g. distance, passenger, etc.), and source assignment (e.g., assignment of emissions sources for activities in a catalog to have pre-defined assignment where main rig equipment may have automatic assignment to specific activities to enable automatic calculation of energy using engineering data, etc.).

Figure 16:
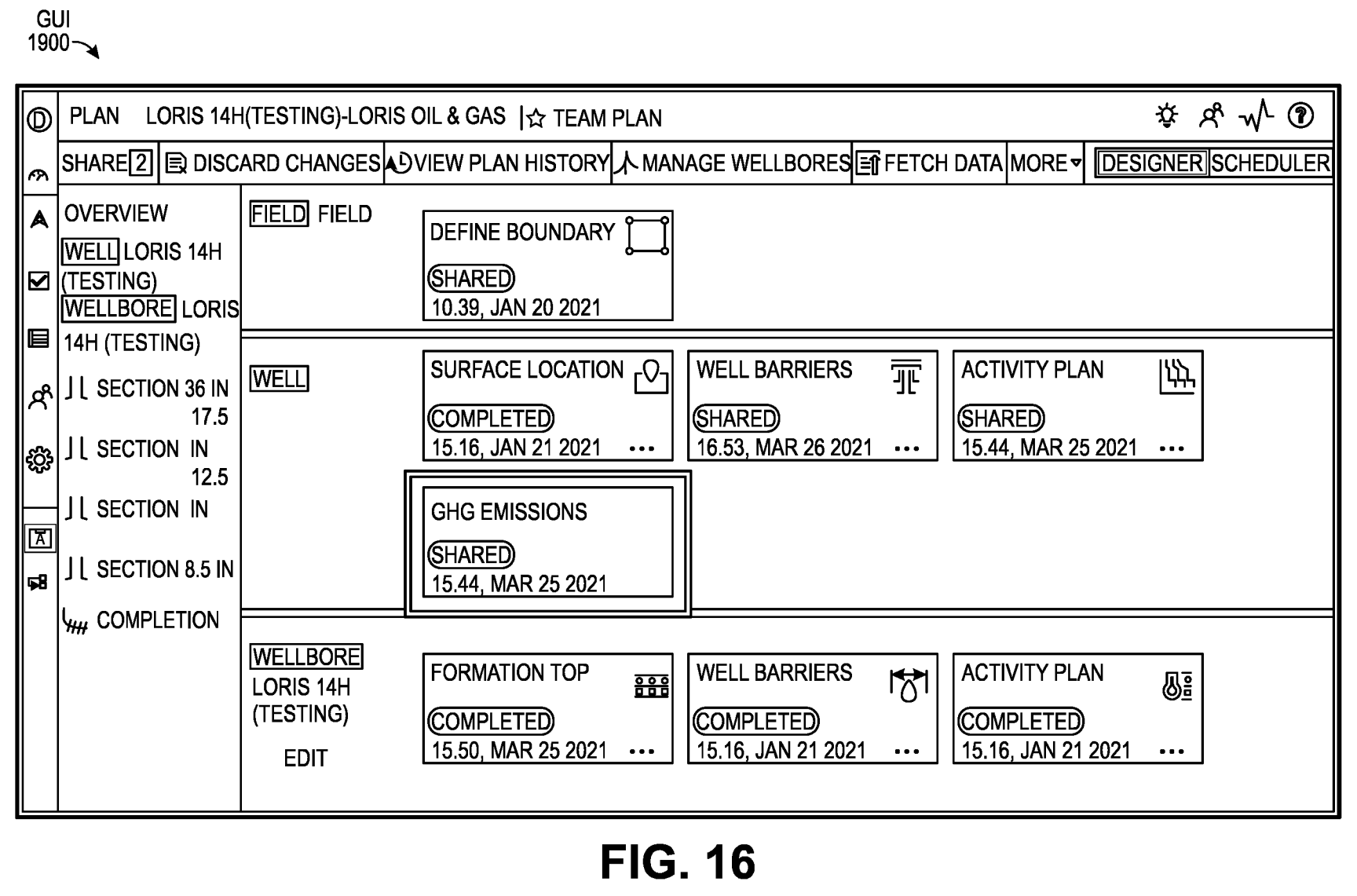

FIG. 16 shows an example of a GUI 1600 for a GHG emissions estimator task and object, at a well level. FIG. 17 shows an example of a GUI 1700 for a GHG emissions estimator editor page to configure an estimation(s), which can include one or more of: selection of configuration templates, a view list of activities, definition of parameters and source assignment by activity from the template with the ability to override values, display of estimated emissions by activity (including consolidation by activity level), a context pane with objects used for estimation (e.g., engineering data for automated estimation of energy, etc.), and/or an option for exporting report and results plots to be assessed (e.g., an individual and/or team dashboard, etc.).

Figure 18:
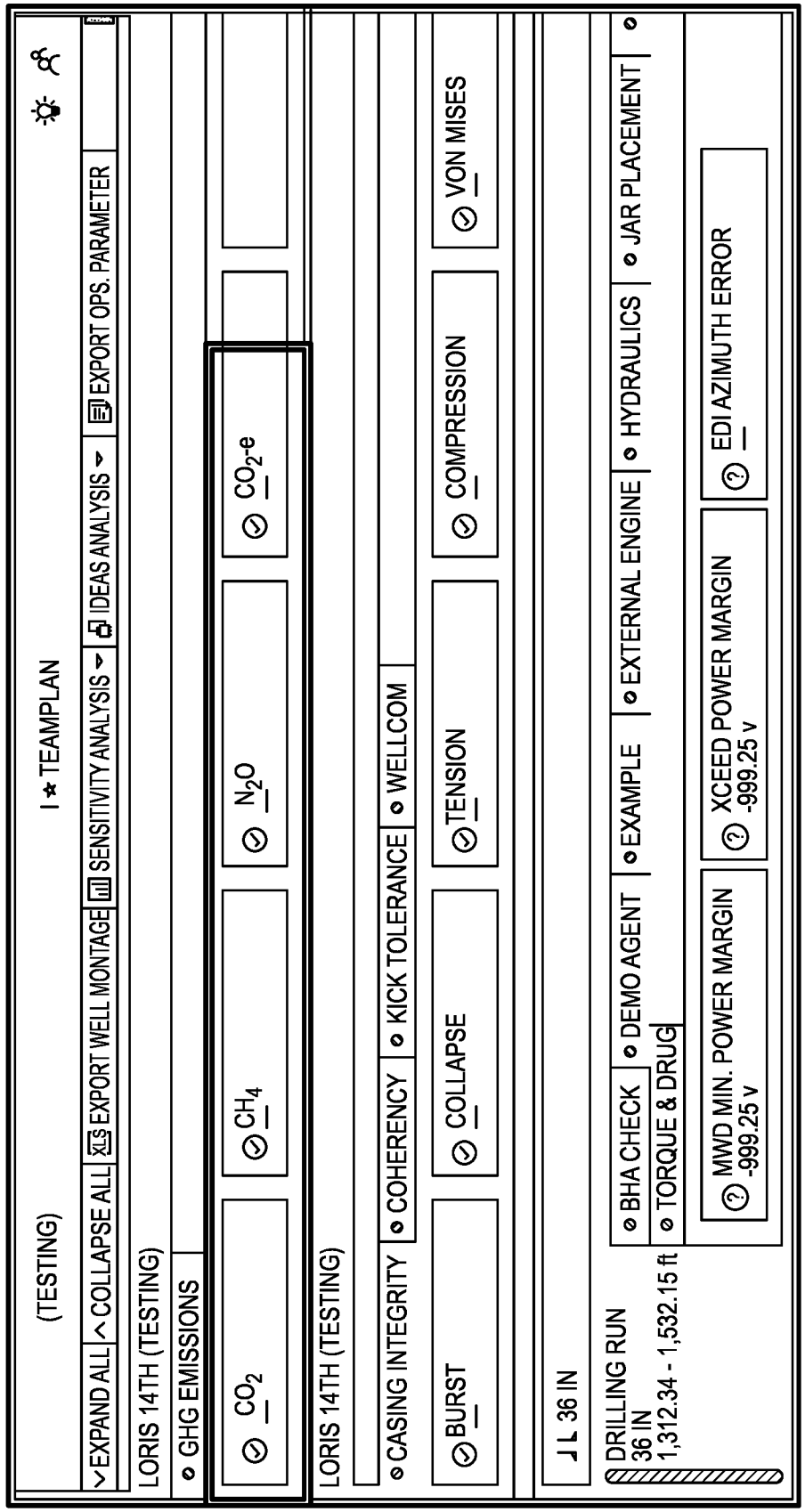
FIG. 18 illustrates an example of a graphical user interface, according to an embodiment.

FIG. 18 shows an example of a GUI 1800 for a GHG emissions estimator AEA at well level with consolidated emission results for each GHG and combined emissions (CO2-e). In such an example, the GUI 1800 may utilize limits defined in a configuration template and can include an AEA in editor and plan validation page.

Figure 19:
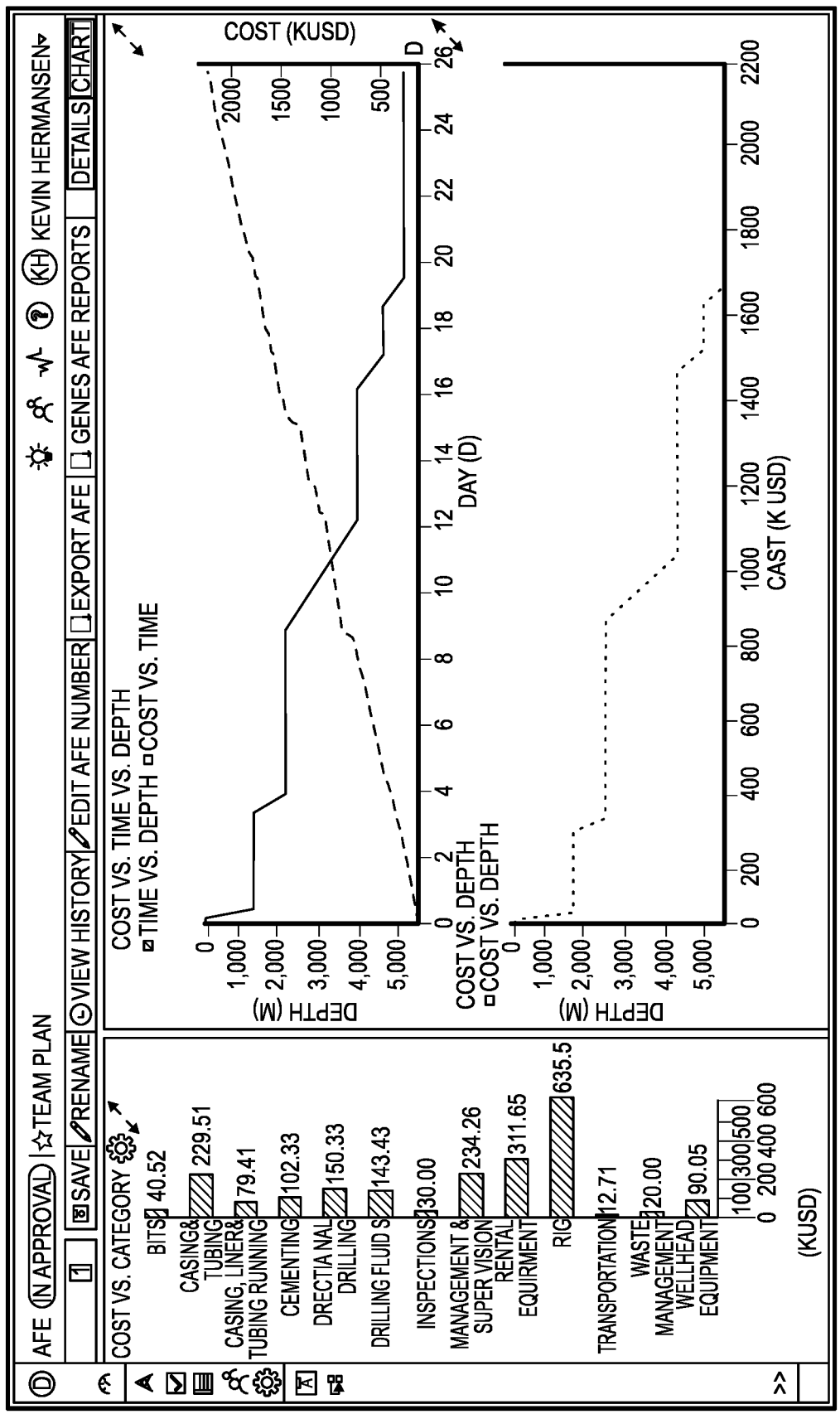
FIG. 19 illustrates an example of a graphical user interface, according to an embodiment.

FIG. 19 shows an example of a GUI 1900 for a GHG emissions estimation report. The format can be defined based on demands (e.g., industry, standards, regulatory agencies, etc.). The EF can be utilized for one or more of rig load analysis, theoretical power demands, real-time power ratings, real-time power demands, real time CO2 emissions (e.g., baseline), well construction activity planning, etc. The EF may be operatively coupled to one or more databases, include one or more computation applications and visualization applications (e.g., web dashboard, etc.), which may be interoperative with one or more other frameworks. The EF can provide for reporting capabilities, which may be defined based on operator and/or regulatory demands.

Figure 20:
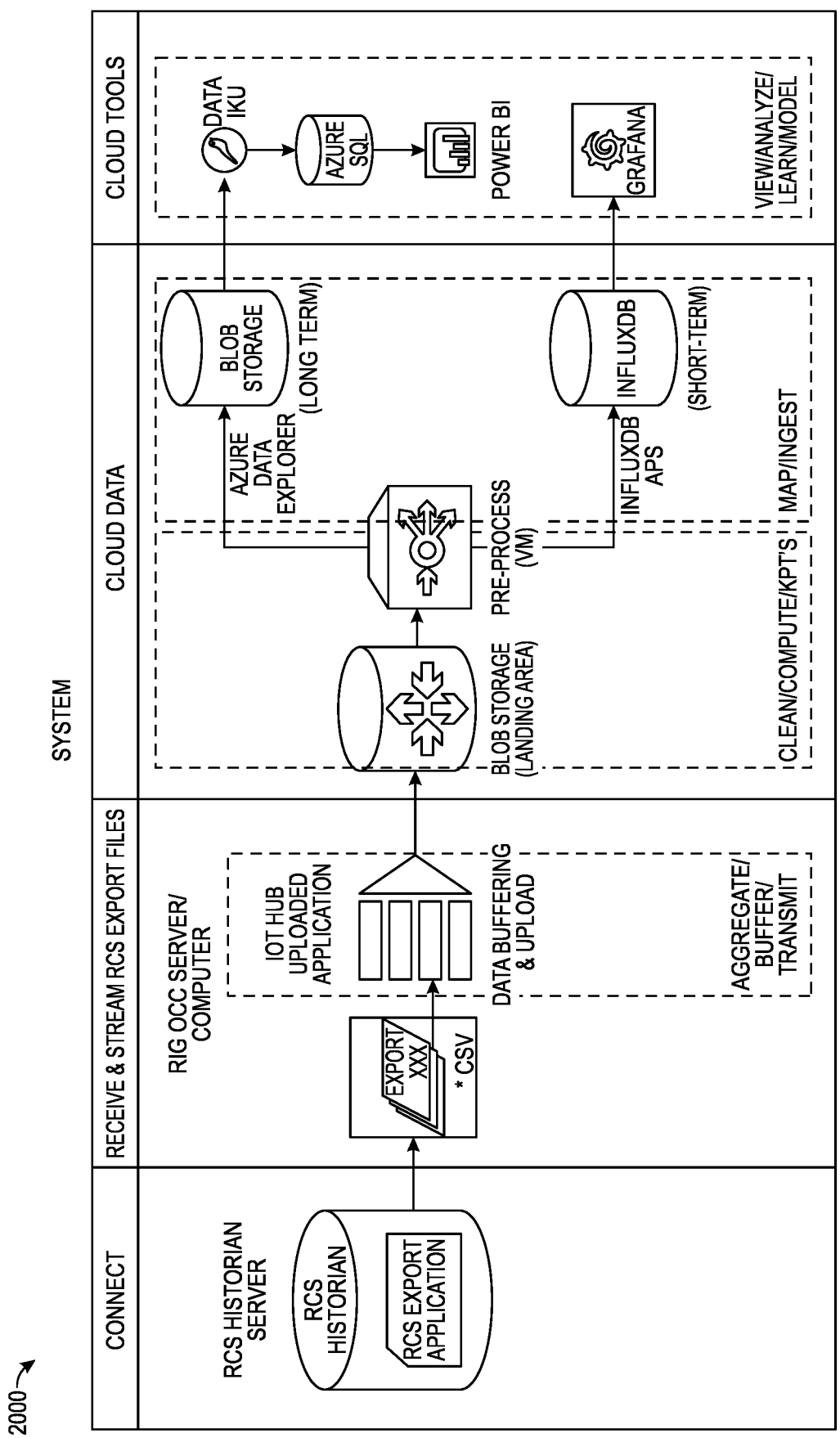
FIG. 20 illustrates an example of a system, according to an embodiment.

FIG. 20 shows an example of a system 2000 that includes a database with historian application(s), a rig server/computer, cloud access to cloud-based components, and access to one or more cloud-based tools (e.g., DATA IKU, AZURE SQL, POWER BI, GRAFANA, etc.). One or more features can provide for machine learning, which may be utilized to train one or more machine learning models. As to the GRAFANA tool, it can provide a multi-platform open source analytics and interactive visualization web application. For example, the tool may provide charts, graphs, and alerts for the web when connected to supported data sources. The tool can be used to monitor dashboards using interactive query builders and can include a front end and back end (e.g., written in TypeScript and Go, respectively).

The system 2000 can provide for aggregation of operational data, streaming and storage of operational data (e.g., to Well Construction Data Foundation (WCDF)), consolidation of emissions data (e.g., from one or more sources), and/or an interface of power management and operational data to Well Construction Data Foundation (WCDF) for analysis and reporting, etc.

Figure 21:
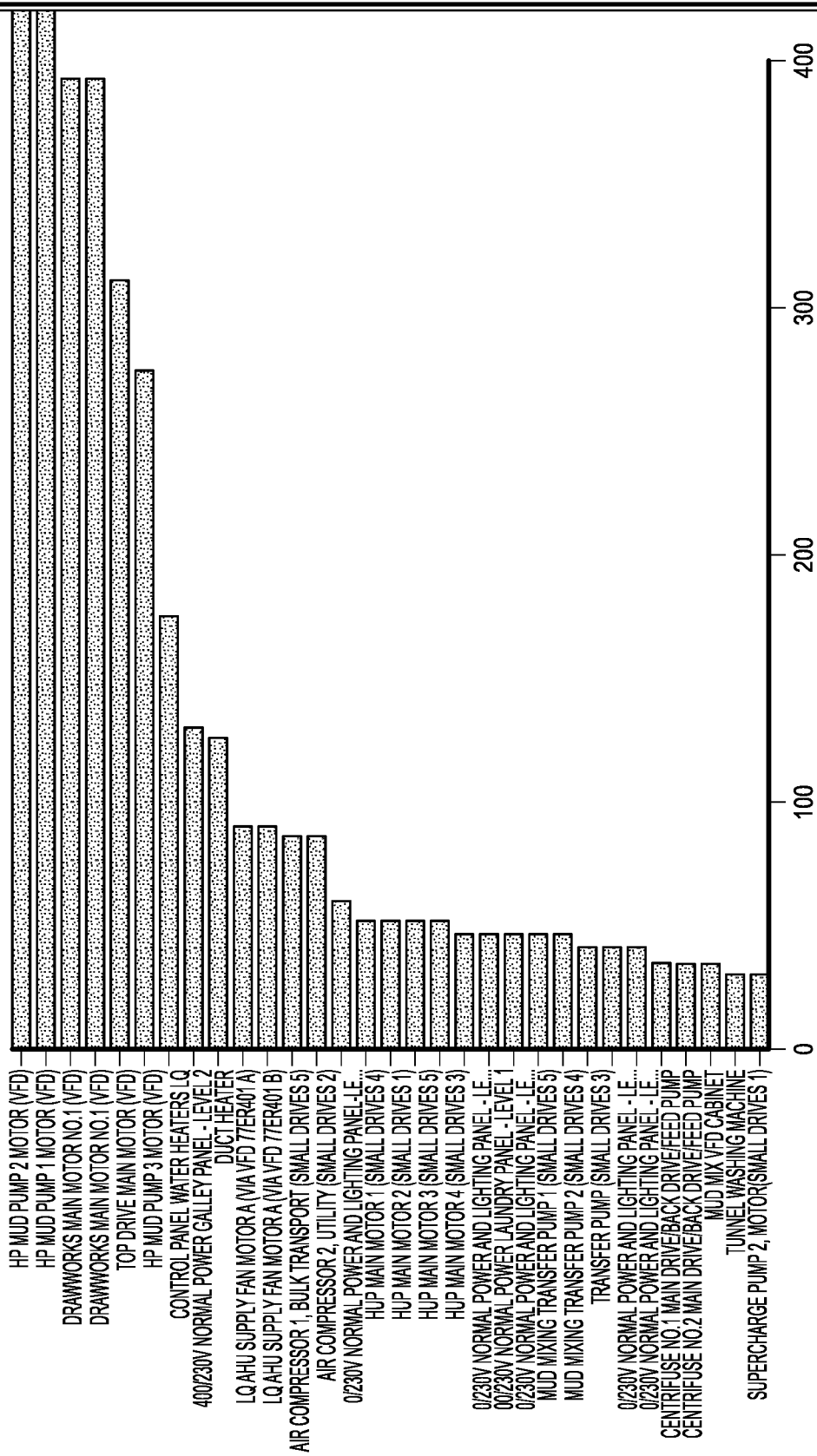
FIG. 21 illustrates an example of a graphical user interface, according to an embodiment.
Figure 22:
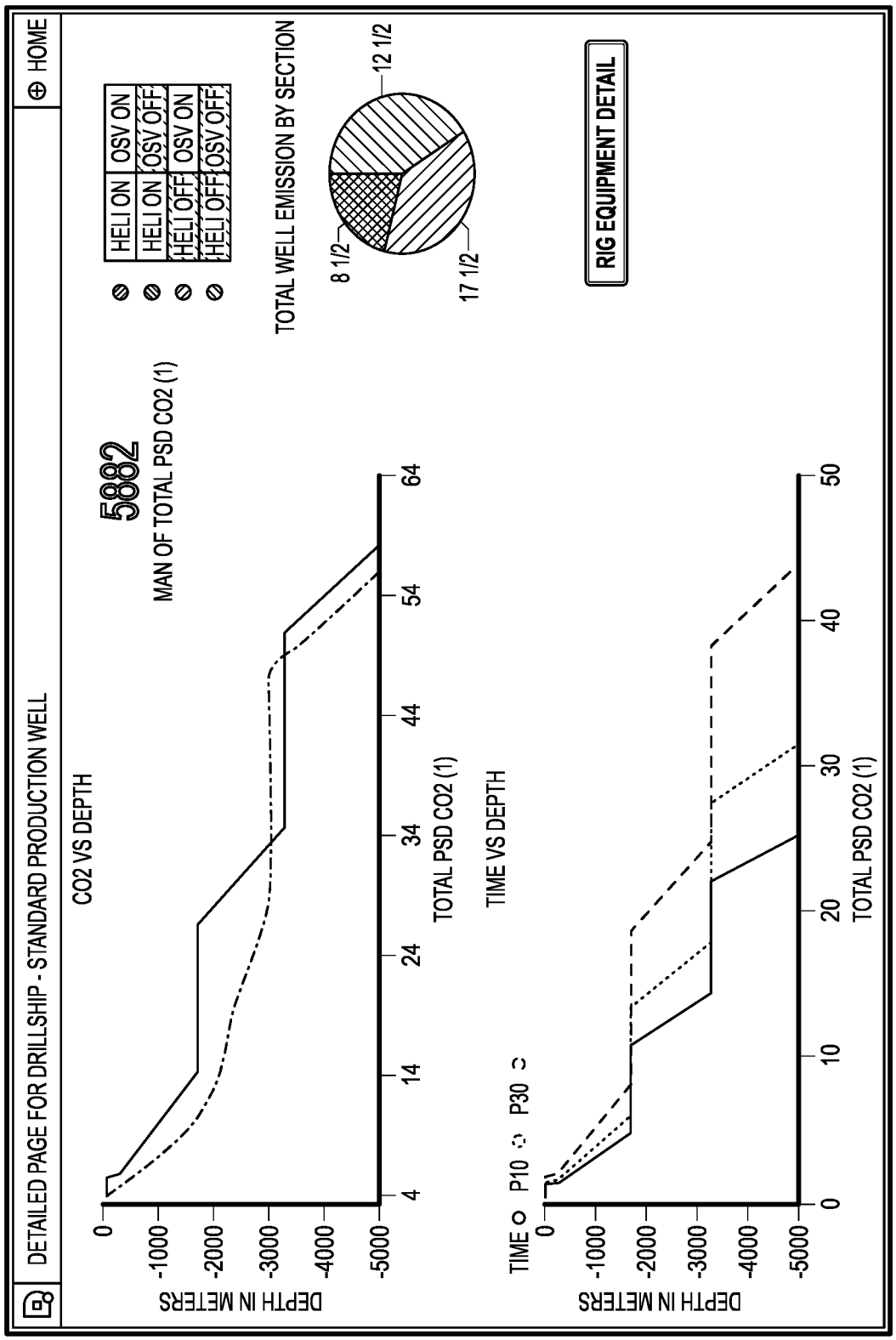
FIG. 22 illustrates an example of a graphical user interface, according to an embodiment.

FIGS. 21 and 22 show example GUIs 2100 and 2200, respectively. As explained, a system can include one or more tools or access thereto for building one or more types of dashboards for operational monitoring of emissions, optionally against an established baseline. The GUI 2100, 2200 can provide for visualization of GHG emission trends, baseline vs. operational GHG emissions, etc. A database (WCDF) of baseline and trending data can be generated and/or accessed, for example, using a visualization and/or benchmarking dashboard. As shown in the example of FIG. 22, the GUI 2200 can provide for real-time trending of CO2 emissions building on a baseline footprint, for example, for one or more drilling campaigns, wells, etc.

Figure 23:
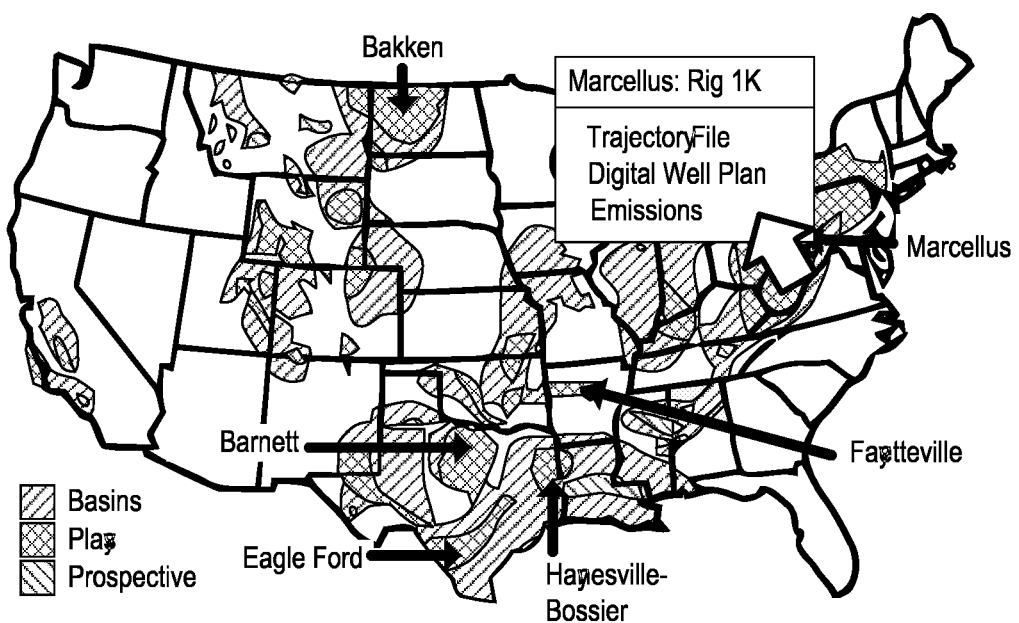
FIG. 23 illustrates an example of a graphical user interface, according to an embodiment.

FIG. 23 shows an example of a GUI 2300 that includes various types of regions, formations, basins, etc. The EF may be tailored to a particular region, which may provide for access to local regulations, local weather, etc. For example, a rig site may be selected in the Marcellus region where the GUI 2300 can provide for selection of related information, frameworks, etc. In such an example, one or more comparisons may be made with respect to one or more other sites, etc. A digital well plan may be accessed, and emissions may be accessed. These may be linked and/or generated in combination via a framework environment such as that shown in FIG. 1. A map such as that of the GUI 2300 may be utilized to render visualizations of trends, which may depend on operations, weather, activities, etc. For example, a GHG emissions visualization map can be utilized to visualize GHG emissions and/or trends at a plurality of sites shown on the map. Such a visualization can provide an indication of activities, increase in activities, decrease in activities, etc. An operator may select a particular site and, for example, execute the EF to modify (e.g., optimize)

activities at the selected site to reduce emissions, tailor emissions, schedule emissions, etc. In various instances, emissions can be adjusted responsive to weather, demand in energy, etc. For example, in a region where cold weather is expected, energy source, utilization and/or generation may be shifted such that residential demand is more readily met. In such an example, a fluid production and/or distribution network may be modified (e.g., optimized) for delivery, and flared and/or vented gas may be directed to distribution, etc.

A system may include a computational framework that can utilize a Representational State Transfer (REST) API, which is of a style that defines a set of constraints to be used for creating web services. Web services that conform to the REST architectural style, termed RESTful web services, provide interoperability between computer systems on the Internet. RESTful web services can allow one or more requesting systems to access and manipulate textual representations of web resources by using a uniform and predefined set of stateless operations. One or more other kinds of web services may be utilized (e.g., such as SOAP web services) that may expose their own sets of operations.

As an example, a computational controller operatively coupled to equipment at a rigsite (e.g., a wellsite, etc.) can utilize one or more APIs to interact with a computational framework that includes an agent or agents. In such an example, one or more calls may be made where, in response, one or more actions are provided (e.g., control actions for drilling). In such an example, a call may be made with various types of data (e.g., observables, etc.) and a response can depend at least in part on such data. For example, observables may be transmitted and utilized by an agent to infer a state where an action is generated based at least in part on the inferred state and where the action can be transmitted and utilized by a controller to control activities at a rigsite.

FIG. 24 shows an example of a method 2400 and an example of a system 2490 that may be used to perform at least a portion of the method 2400. As shown, the method 2400 includes a reception block 2410 for receiving data from a field operations framework for one or more field operations. The method 2400 also includes a determination block 2420 for determining emissions associated with at least one of the one or more field operations. The method 2400 also includes a generation block 2430 for generating output based at least in part on the emissions. The method 2400 can also include a transmission block 2440, for example, to optionally transmit at least a portion of the output to the field operations framework to generate additional data. For example, a loop may exist where the field operations framework (e.g., or frameworks as may be in an environment such as in FIG. 1), can revise computations, recommendations, etc.

In the example of FIG. 24, one or more simulations may be executed. For example, a simulation of energy utilization may be executed that relates to drilling (e.g., a rate of penetration of drilling). For a drilling operation, various modes of drilling may be utilized such as, a rotating mode and/or a sliding mode. Drilling may utilize a rotary table (e.g., rotary drive), a top drive, and/or a mud motor that is/are driven by mud flow via a mud pump (e.g., at surface, etc.). An optimization may account for emissions such that a digital drilling plan is generated that meets desired objectives as to drilling a borehole to a reservoir target while providing for a reduction in emissions. While drilling is mentioned, one or more other types of field operations may be considered by an emissions framework.

The method 2400 is shown as including various computer-readable storage medium (CRM) blocks 2411, 2421, 2431 and 2441 that can include processor-executable instructions that can instruct a computing system, which can be a control system, to perform one or more of the actions described with respect to the method 2400.

In the example of FIG. 24, the system 2490 includes one or more information storage devices 2491, one or more computers 2492, one or more networks 2495 and instructions 2496. As to the one or more computers 2492, each computer may include one or more processors (e.g., or processing cores) 2493 and memory 2494 for storing the instructions 2496, for example, executable by at least one of the one or more processors 2493 (see, e.g., the blocks 2411, 2421, 2431 and 2441). As an example, a computer may include one or more network interfaces (e.g., wired or wireless), one or more graphics cards, a display interface (e.g., wired or wireless), etc.

The method 2400 may be a workflow that can be implemented using one or more frameworks that may be within a framework environment. The system 2490 can include local and/or remote resources. For example, a browser application may execute on a client device as a local resource with respect to a user of the browser application, and a cloud-based computing device as a remote resource with respect to the user. In such an example, the user may interact with the client device via the browser application where information is transmitted to the cloud-based computing device (or devices) and where information may be received in response and rendered to a display operatively coupled to the client device (e.g., via services, APIs, etc.).

Figure 25:
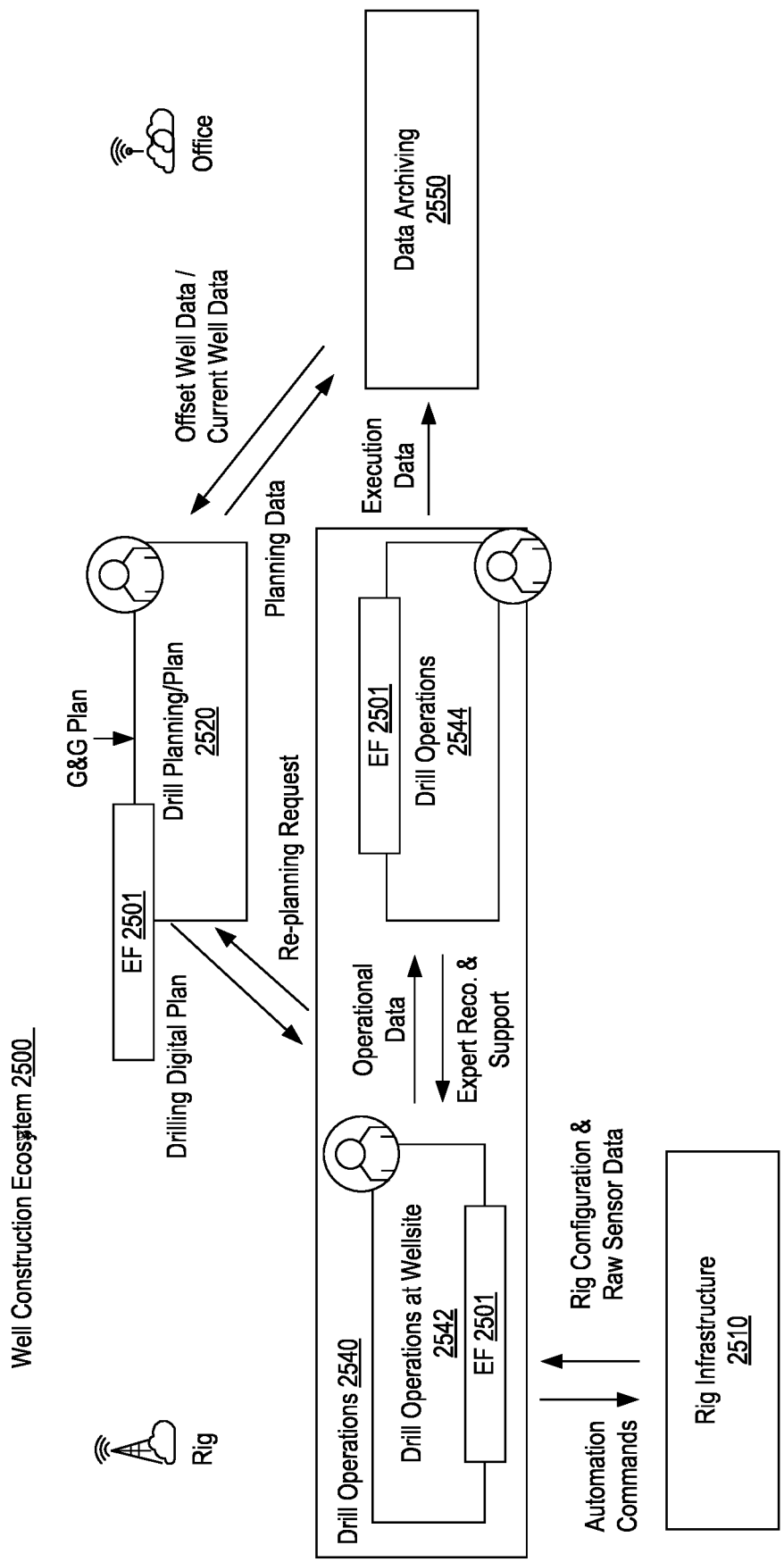
FIG. 25 illustrates an example of a system, according to an embodiment.

FIG. 25 shows an example of a system 2500 that can be a well construction ecosystem. The system 2500 can include one or more instances of an EF 2501 and can include a rig infrastructure 2510 and a drill plan component 2520 that can generate or otherwise transmit information associated with a plan to be executed utilizing the rig infrastructure 2510, for example, via a drilling operations layer 2540, which includes a wellsite component 2542 and an offsite component 2544. As shown, data acquired and/or generated by the drilling operations layer 2540 can be transmitted to a data archiving component 2550, which may be utilized, for example, for purposes of planning one or more operations (e.g., per the drill plan component 2520).

In the example of FIG. 25, the EF 2501 is shown as being implemented with respect to the drill plan component 2520, the wellsite component 2542, and/or the offsite component 2544.

The EF 2501 can interact with one or more of the components in the system 2500. As shown, the EF 2501 can be utilized in conjunction with the drill plan component 2520. In such an example, data accessed from the data archiving component 2550 may be utilized to assess output of the EF 2501 or, for example, may be utilized as input to the EF 2501. As an example, the data archiving component 2550 can include drilling data for one or more offset wells and/or one or more current wells pertaining to specifications for and/or operations of one or more types of bits, etc.

As shown in FIG. 25, various components of the drilling operations layer 2540 may utilize the EF 2501 and/or a drilling digital plan as output by the drill plan component 2520. During drilling, execution data can be acquired, which may be utilized by the EF 2501. Such execution data can be archived in the data archiving component 2550, which may be archived during one or more drill operations and may be available by the drill plan component 2520, for example, for re-planning, etc.

The system 2500 may be utilized for purposes of reward definition, reward adjustment, etc. For example, the system 2500 may be utilized for purposes of one or more safety constraints (e.g., formulation, adjustment, etc., of a safety constraint, etc.).

A method may be implemented in part using computer-readable media (CRM), for example, as a block, etc. that include information such as instructions suitable for execution by one or more processors (or processor cores) to instruct a computing device or system to perform one or more actions. A single medium may be configured with instructions to allow for, at least in part, performance of various actions of a method. A computer-readable medium (CRM) may be a computer-readable storage medium (e.g., a non-transitory medium) that is not a carrier wave.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

As an example, a method can include receiving data from a field operations framework for one or more field operations; determining emissions associated with at least one of the one or more field operations; and generating output based at least in part on the emissions. In such an example, the emissions can include at least one type of greenhouse gas emission.

As an example, at least one of one or more field operations can be a field operation that utilizes electrical energy. For example, consider a scenario where electrical energy is available via multiple energy sources. In such an example, output from an emissions framework can include information as to utilization as to at least one of the multiple energy sources.

As an example, a method can include outputting at least a portion of output of an emissions framework to a field operations framework for generation of data (e.g., a plan, a revised plan, a control schedule, control signals, etc.).

As an example, a field operations framework can be or include a drilling operations framework.

As an example, one or more field operations can include a top drive operation, a rotary drive operation, a mud pump operation, a mud motor operation, etc.

As an example, a field operation may include an artificial lift operation. Such an operation may utilize an electric submersible pump (ESP), gas lift, etc. As to an ESP, one or more sources of electrical energy may be available to power the ESP. For example, consider grid-based, solar-based, gas generator-based, etc. As an example, an emissions framework may output control decisions as to one or more artificial lift schedules, rates, energy sources, etc., which may aim to optimize production and emissions (e.g., minimize emissions, etc.).

As an example, a method can include determining emissions associated with at least one of one or more field operations via an emissions framework executing via at least one processor.

As an example, a method can include receiving location data for a site of at least one of one or more field operations. In such an example, the location data can include environmental data such as, for example, weather data, sunset/sunrise data, etc.

As an example, a method can include outputting an energy utilization schedule and associated emissions associated with energy utilization. In such an example, a real time graphical user interface may be rendered to track, trend, control, etc., energy utilization and/or emissions.

As an example, a method can include rendering a graphical user interface to a display. For example, consider a graphical user interface that includes an editable template for parameters associated with determining emissions and/or an editable template for parameters associated with equipment for at least one of one or more field operations.

As an example, a method can include determining emissions in a manner that accounts for at least one activity associated with drilling a section of a borehole, where, for example, the at least one activity includes at least one member selected from a group that includes a cased hole whipstock run, a clean out run, a coring run, a drill stem test run and a drilling run.

As an example, a system can include a processor; memory accessible to the processor; processor-executable instructions stored in the memory and executable by the processor to instruct the system to: receive data from a field operations framework for one or more field operations; determine emissions associated with at least one of the one or more field operations; and generate output based at least in part on the emissions.

As an example, one or more computer-readable storage media can include computer-executable instructions executable to instruct a computing system to: receive data from a field operations framework for one or more field operations; determine emissions associated with at least one of the one or more field operations; and generate output based at least in part on the emissions.

As an example, a computer program product can include executable instructions that can be executed to cause a system to operate according to one or more methods. For example, consider a computer program product that can include instructions executable to instruct a computing system to: receive data from a field operations framework for one or more field operations; determine emissions associated with at least one of the one or more field operations; and generate output based at least in part on the emissions.

Figure 26:
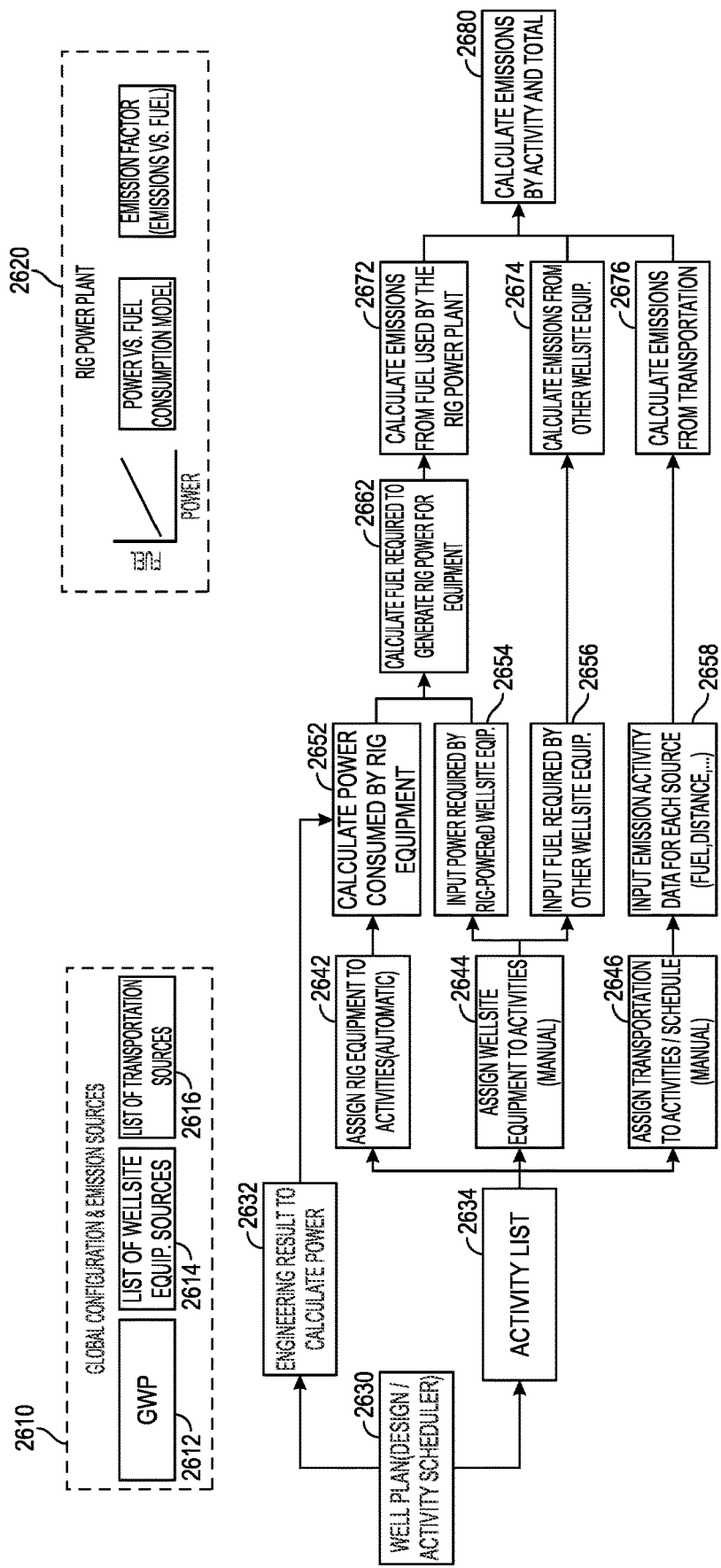
FIG. 26 illustrates a schematic view of a workflow that may be used to calculate GHG emissions, according to an embodiment.

FIG. 26 illustrates a schematic view of a workflow that may be used to calculate GHG emissions, according to an embodiment. The emission sources 2610 at a wellsite may be or include global warming potential (GWP) sources 2612, wellsite equipment sources 2614, transportation sources 2616, or a combination thereof. One or more models 2620 may be based upon the rig power source. The models 2620 may describe the power versus fuel consumption. The models 2620 may also describe the emissions factors (e.g., emissions versus fuel consumption).

The well plan 2630 may include or produce a calculation of the power used at the wellsite to accomplish a particular task (e.g., drill the wellbore), as at 2632. The well plan 2630 may also include or produce an activity list (e.g., the activities to accomplish the task), as at 2634.

In response to the activity list 2634, the rig equipment may be assigned to particular activities (as at 2642), the wellsite equipment may be assigned to particular activities (as at 2644), and/or transport units may be assigned to particular activities based upon a schedule (as at 2646).

The power consumed by rig equipment may be calculated based upon the calculation of power and/or the assigned rig equipment, as at 2652. Input power used by rig-powered well equipment may be determined based at least partially upon the assigned wellsite equipment, as at 2654. In addition, input fuel used by other wellsite and/or rig equipment may be determined based at least partially upon the assigned wellsite and/or rig equipment, as at 2656. Input emission activity data for each source (e.g., fuel, distance, etc.) may be determined based at least partially upon the assigned transportation units and/or schedule, as at 2658.

The fuel used to generate rig power for the equipment may be determined based at least partially upon the calculated power consumed by the rig equipment and/or the input power used by the rig-powered wellsite equipment, as at 2662. Emissions from fuel may be calculated based at least partially upon the fuel used to generate the rig power, as at 2672. Emissions from other wellsite equipment may be calculated based at least partially upon the input fuel used by the other wellsite equipment, as at 2674. Emissions from the transportation units may be calculated based at least partially upon the input emission activity data, as at 2676. The total emissions and/or emissions by activity may then be calculated based at least partially upon the emissions from fuel, the emissions from other wellsite equipment, the emissions from transportation units, or a combination thereof, as at 2680.

Figure 27:
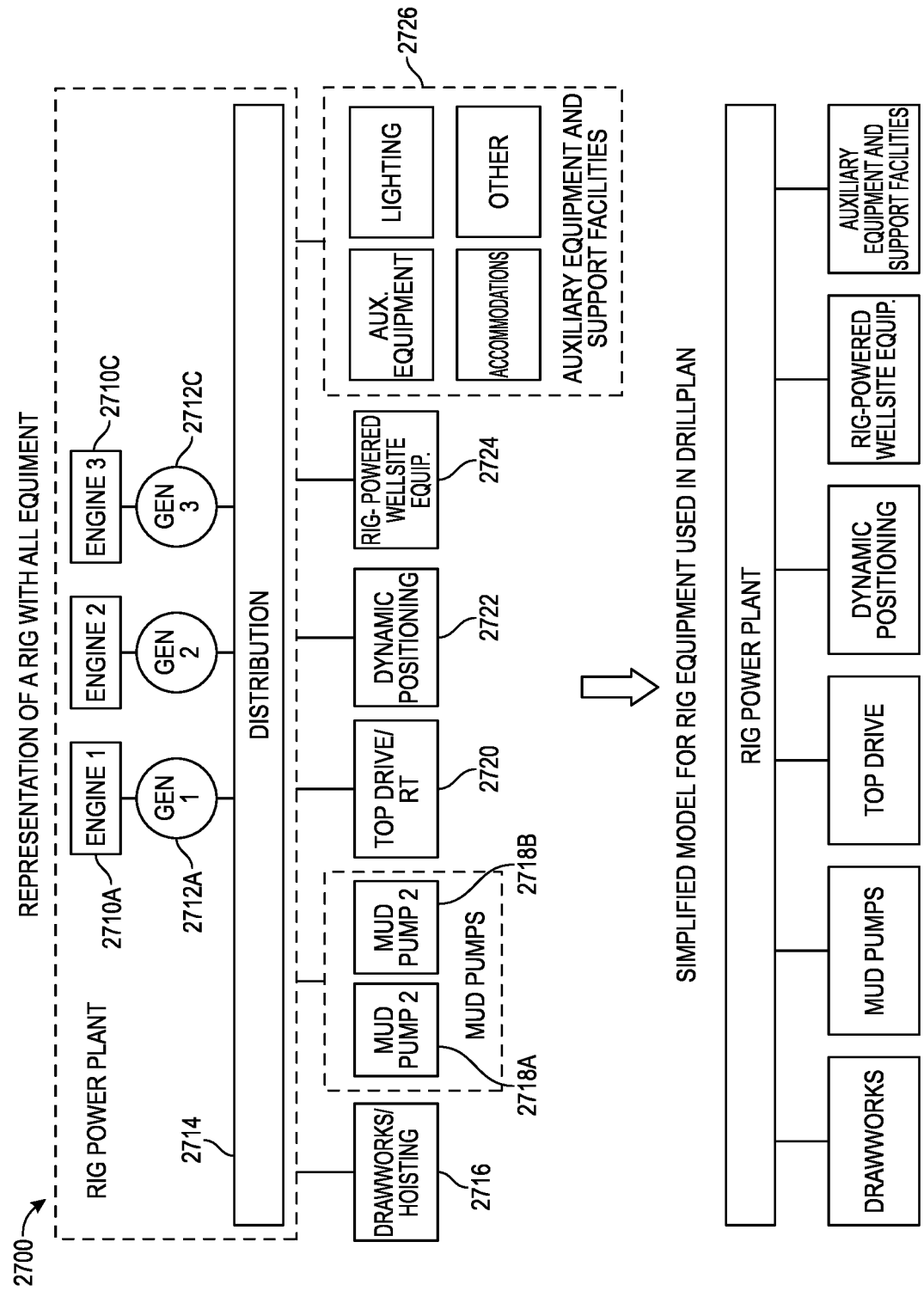
FIG. 27 illustrates a schematic view of a rig power plant emissions calculation model, according to an embodiment.

FIG. 27 illustrates a schematic view of a rig power plant emissions calculation model, according to an embodiment. The rig power plant 2700 may include one or more engines (three are shown: 2710A-2710C), one or more generators (three are shown: 2712A-2712C), a distribution hub 2714, a drawworks 2716, one or more mud pumps (two are shown: 2718A, 2718B), a top drive 2720, a dynamic positioning module 2722, rig-powered wellsite equipment 2724, and auxiliary equipment 2726. A simplified model 2730 may be generated for the rig power plant 2700 based upon the above elements. The model may include the rig power plant 2700, the drawworks 2716, the mud pumps 2718A, 2718B, the top drive 2720, the dynamic positioning module 2722, the rig-powered wellsite equipment 2724, the auxiliary equipment 2726, or a combination thereof.

CO2-e emissions mass may be determined as a function of consumed fuel. The model 2730 may be used in DRILL-PLAN to define the inputs to calculate emissions and provide emissions results. The fuel consumption may be modelled as a linear relationship between power and fuel consumption defined with user input(s). The power consumption from the drawworks 27, the mud pumps 2718A, 2718B, and/or the top drive 2720 may be calculated from engineering results for activities that are simulated in DRILLPLAN. The other rig equipment may be defined as a constant power consumption. For example, the dynamic positioning module 2722 and/or the auxiliary equipment and support facilities 2726 may be defined as a wellsite equipment source that is rig-powered.

Figure 28:
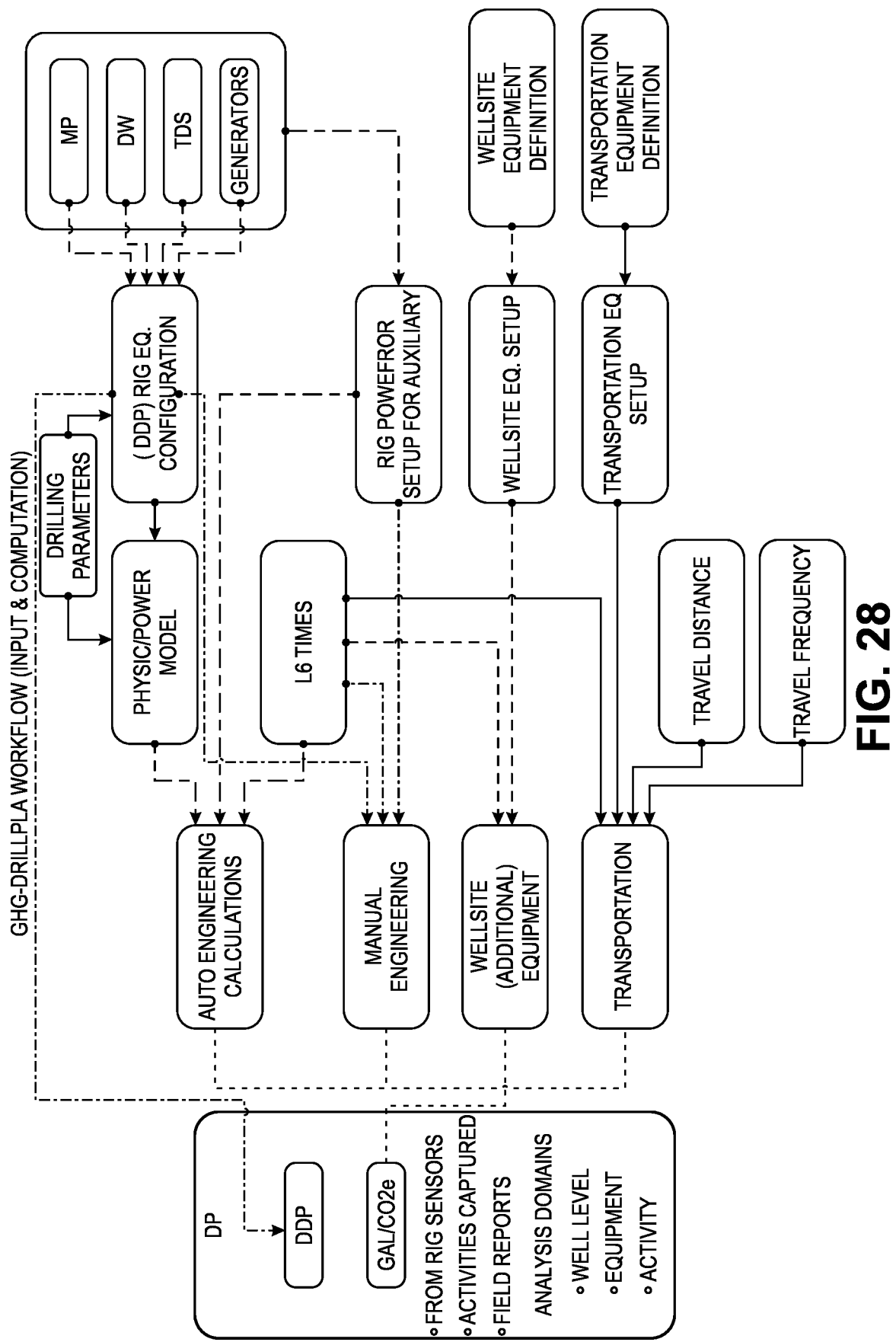
FIG. 28 illustrates a schematic view of a GHG drill plan workflow, according to an embodiment.

FIG. 28 illustrates a schematic view of a GHG drill plan workflow, according to an embodiment. The workflow may include actual (e.g., measured) parameters to determine the actual emissions at a field (e.g., wellsite).

Figure 29:
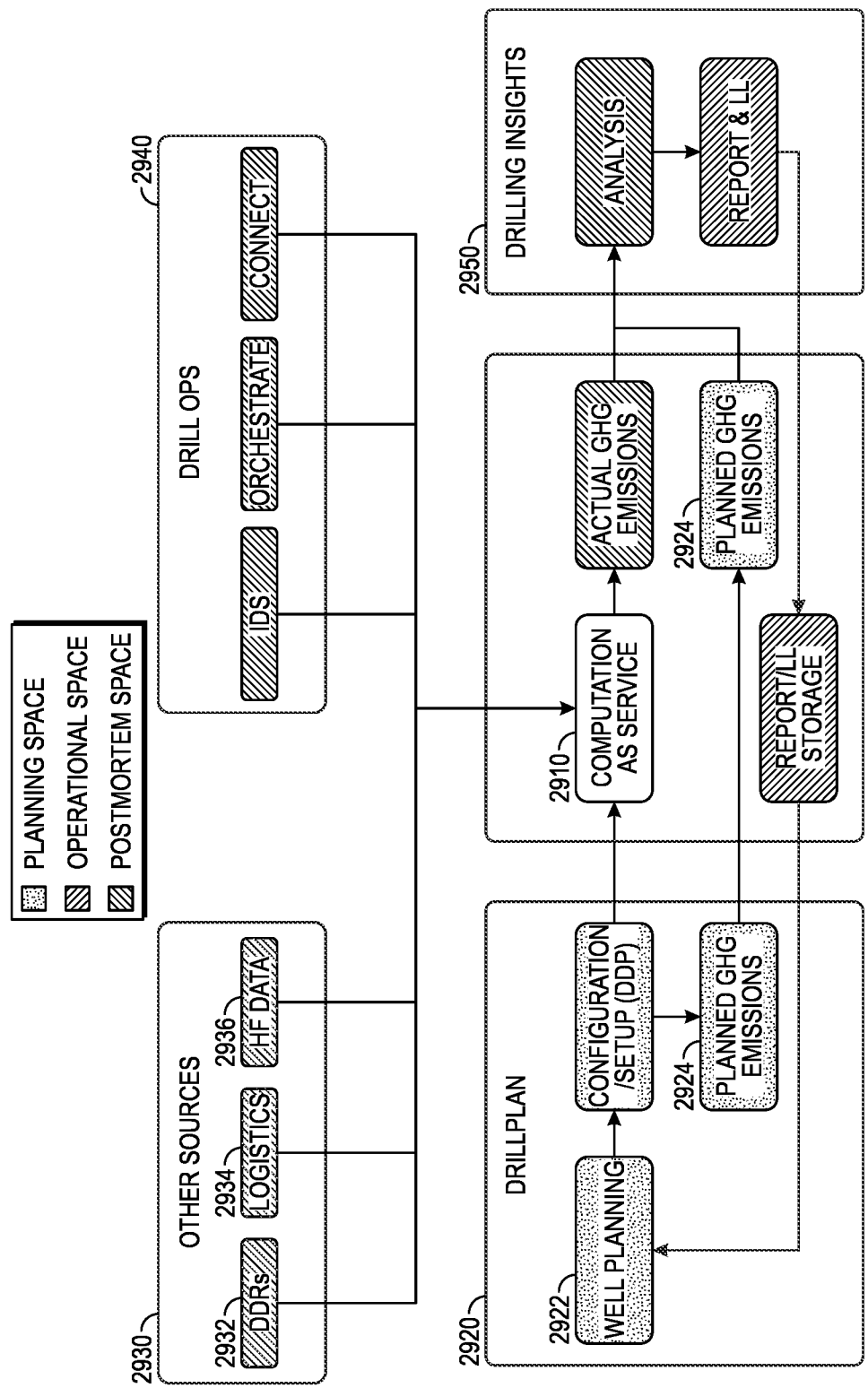
FIG. 29 illustrates a schematic view of a GHG information flow, according to an embodiment.

FIG. 29 illustrates a schematic view of a GHG information flow, according to an embodiment. The GHG information flow may be used to provide an iterative loop to continuously monitor and improve the GHG emissions at a field (e.g., wellsite). The GHG information flow represents the end-to-end flow of an emissions solution. The same modules (e.g., engines) that perform the planning stage(s) may also receive and process actual (e.g., measured) data from operations that generate the actual emissions. In one embodiment, the emissions may be measured directly. In another embodiment, the emissions may be determined indirectly. For example, the emissions may be derived from other parameters (e.g., energy consumed) using the same modules with the same configurations as used during the planning stage. This may allow an "apples to apples" comparison to generate insight.

More particularly, a computation engine 2910 may receive input data from a drill plan module 2920, other sources 2930, a drilling operations module 2940, or a combination thereof. More particularly, the computation engine 2910 may receive an (e.g., initial) well plan 2922, planned GHG emissions 2924, rig equipment configuration, auxiliary equipment, transportation, and the like from the drill plan module 2920. The computation engine 2910 may also receive the daily drilling reports 2932, logistics 2934, high-frequency (HF) data 2936, or a combination thereof from the other sources 2930. The HF data 2936 may be or include rig sensor data that is measured and/or transmitted with varying frequencies (e.g., from about 1 Hz to about 10 Hz). The computation engine 2910 may also receive the actual (e.g., measured) GHG emissions 2942 from the drilling operations module 2940.

The computation engine 2910 may process this input data and provide outputs to the drilling insights module 2950. The outputs may be or include an analysis of the GHG emissions, a report and lessons learned (LL), or a combination thereof. The report may be or include a post-mortem analysis of the well, section, and/or operation. By the time the report is completed, the planned GHG emissions 2924 and/or the actual GHG emissions 2942 may be received. The post-mortem analysis may compare the planned GHG emissions 2924 and the actual GHG emissions 2942 to provide insights to improve or reduce the emissions. The lessons learned may be or include a model of the actual emissions versus the planned emissions. This may help to determine if there is a discrepancy (e.g., due to inputs into the planned emissions). The lessons learned may also be or include operational lessons learned. This may include determining if one or more specific operations generated more or less emissions than planned due to specific parameters being configured during the operations, or by reducing the duration of specific operations (e.g., circulation).

The outputs may be transmitted back to the computation engine 2910 and/or the drill plan module 2920, where they may be used to modify the drill plan (e.g., to reduce GHG emissions).

Figure 30:
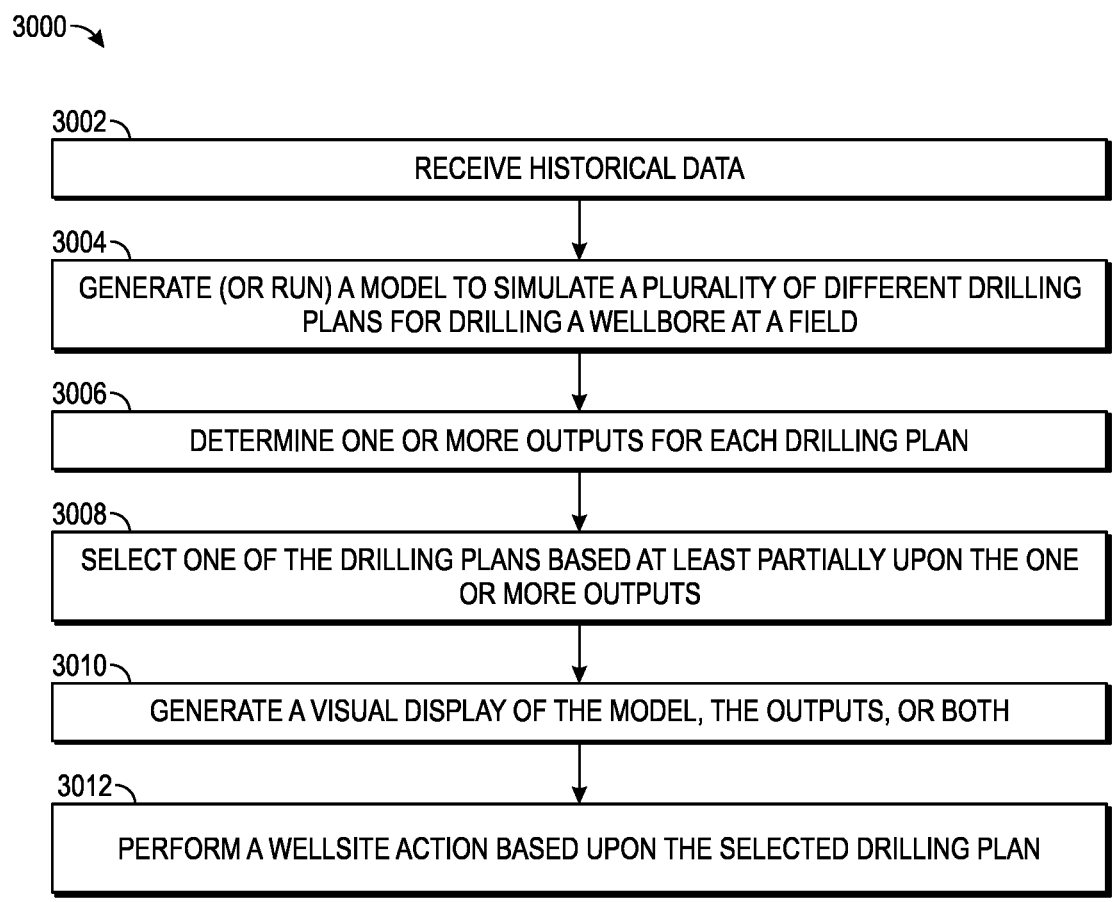
FIG. 30 illustrates a flowchart of a method for generating a drill plan for drilling a wellbore at a field, according to an embodiment.

FIG. 30 illustrates a flowchart of a method 3000 for generating a drill plan for drilling a wellbore at a field, according to an embodiment. An illustrative order of the method 3000 is provided below; however, one or more portions of the method 3000 may be performed in a different order, combined, split, repeated, or omitted. One or more portions of the method 3000 may be performed by a computing system.

The method 3000 may include receiving historical data, as at 3002. The historical data may be from one or more first previously-drilled wellbores at a field. The historical data may also or instead be from one or more second previously-drilled wellbores at one or more other fields. The field may include one or more wellbores. The other fields may be greater than a predetermined distance from any of the wellbores in the (first) field. The predetermined distance may be, for example, one mile, five miles, ten miles, or one hundred miles.

The historical data may be or include geological properties at the field, the one or more other fields, or both. The geological properties may include porosity, permeability, resistivity, heterogeneity, formation strength, or a combination thereof.

The historical data may also or instead include wellbore properties of the one or more first previously-drilled wellbores, the one or more second previously-drilled wellbores, or both. The wellbore properties may include geometry, trajectory, casing points, completion design, or a combination thereof.

The historical data may also or instead include drilling tool parameters of drilling tools used to drill the one or more first previously-drilled wellbores, the one or more second previously-drilled wellbores, or both. The drilling parameters may include steerability, durability, rate of penetration (ROP), rotary speed, torque, flow rate, pressure drop, or a combination thereof.

The historical data may also or instead include rig characteristics of drilling rigs used to drill the one or more first previously-drilled wellbores, the one or more second previously-drilled wellbores, or both. The rig characteristics may include specifications of equipment on the drilling rigs, operating performance of the equipment, an amount of emissions generated by the equipment, or a combination thereof. The equipment may include one or more generators. The equipment may also or instead include vehicles (e.g., trucks) that transport materials to and/or from the field. For example, this data may include the travel distance and/or travel frequency of each truck. The equipment may also or instead include forklifts.

The historical data may also or instead include working practices of a plurality of drilling crews used to drill the one or more first previously-drilled wellbores, the one or more second previously-drilled wellbores, or both. The working practices may include times when the drilling crews run the one or more generators, a number of the one or more generators that the working crews runs at each time, or both. For example, the drilling crews may run two generators while drilling, and a single generator when drilling is paused.

The method 3000 may also include generating or running a model to simulate a plurality of different drilling plans (also referred to as candidate drilling plans) for drilling the wellbore at the field, as at 3004. The model may be based at least partially upon the historical data. One or more of the geological properties, the wellbore properties, the drilling tool parameters, the rig characteristics, and the working practices may be different for each of the drilling plans.

The method 3000 may also include determining one or more outputs for each drilling plan, as at 3006. The outputs may be determined based at least partially upon the model. The outputs may include a cost to drill the wellbore using the drilling plan, a time to drill the wellbore using the drilling plan, the amount of emissions generated by the equipment to drill the wellbore using the drilling plan, or a combination thereof.

The method 3000 may also include selecting one of the drilling plans based at least partially upon the one or more outputs, as at 3008. This may also or instead include presenting for selection one of the drilling plans based at least partially upon the one or more outputs.

The method 3000 may also include generating a visual display of the model, the outputs, or both, as at 3010.

The method 3000 may also include performing a wellsite action using the selected drilling plan, as at 3012. The wellsite action may be or include selecting a location at a wellsite to drill a wellbore into a subterranean formation, (e.g., initiating and/or controlling) drilling the wellbore, varying a trajectory of the wellbore, varying a rate of penetration of a bottom hole assembly (BHA) that is drilling the wellbore, varying a weight on the drill bit (WOB) in the BHA, varying a flow rate and/or composition of a fluid pumped into the wellbore, or a combination thereof. In one embodiment, the computing system may transmit a signal (e.g., to a user or equipment) to instruct the user or equipment to perform the wellsite action. In one embodiment, performing the wellsite action may include controlling one or more of the drilling tool parameters, according to the selected drilling plan, while the wellbore is being drilled. In another embodiment, performing the wellsite action may include controlling one or more of the working practices, according to the selected drilling plan, while the wellbore is being drilled.

As mentioned above, one or more aspects of this method 3000 may be iterative. For example, at least a portion of the method 3000 may be performed to select the location at the field to drill the wellbore. As the wellbore is being drilled, actual data may be measured. The actual data may be or include geological properties at the field, wellbore properties of the field, drilling tool parameters of drilling tools used to drill the wellbore, rig characteristics of the drilling rig used to drill the wellbore, working practices of the drilling crew that is drilling the wellbore, or a combination thereof. The actual data may also or instead include measured emissions (e.g., from the generators, vehicles, etc.) generated while drilling the wellbore.

The actual data may be used to calibrate the model. In one embodiment, the actual data and/or the calibrated model may be used to modify the selected drilling plan to reduce emissions during a remainder of the drilling, completion, and/or production process. The actual data and/or the calibrated model may be shown on the visual display. The actual data and/or the calibrated model may also or instead be used to help generate a new drilling plan for a new wellbore.

Figure 31:
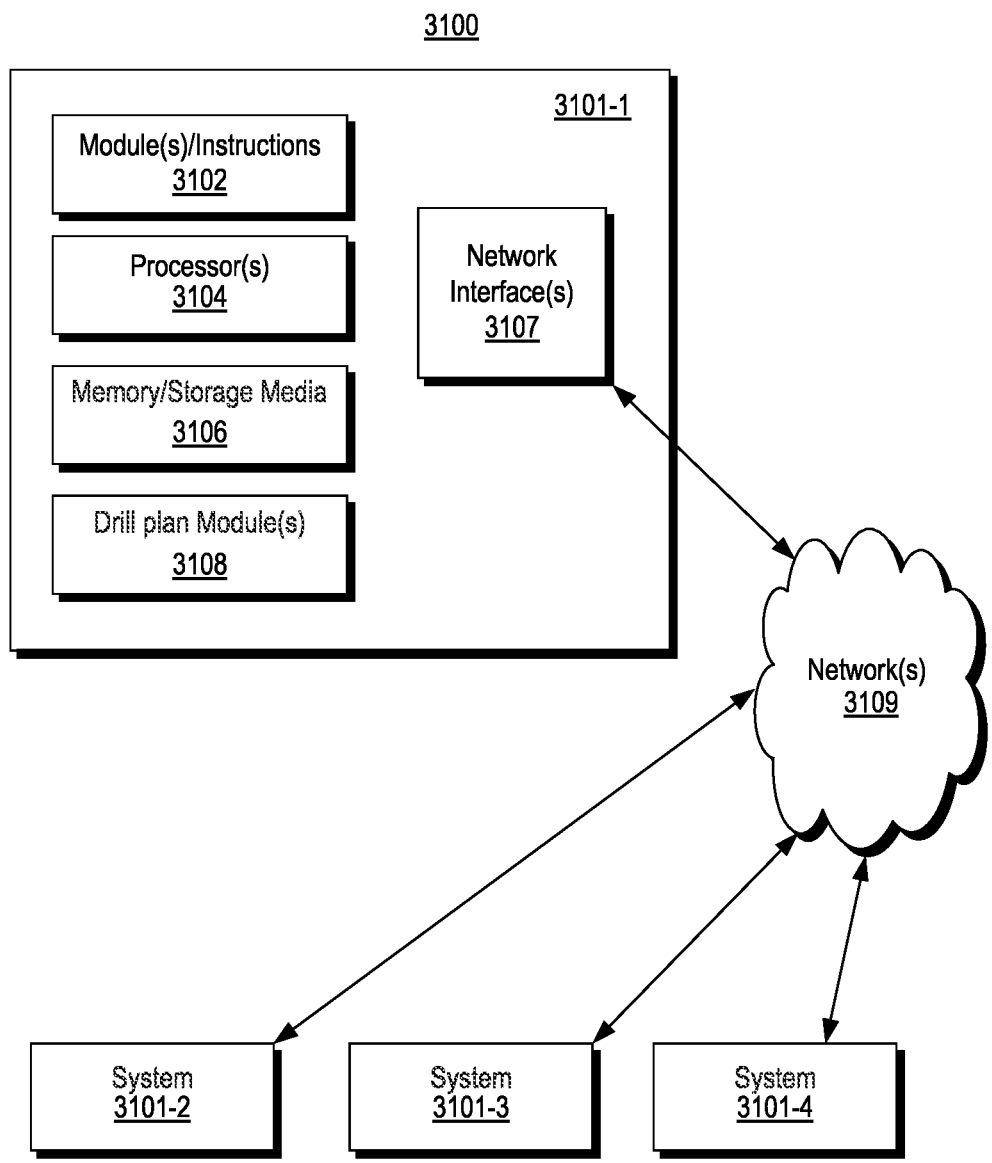
FIG. 31 illustrates an example of a computing system for performing at least a portion of one or more of the methods described herein, according to an embodiment.

In some embodiments, a method or methods may be executed by a computing system. FIG. 31 shows an example of a system 3100 that can include one or more computing systems 3101-1, 3101-2, 3101-3 and 3101-4, which may be operatively coupled via one or more networks 3109, which may include wired and/or wireless networks.

A system can include an individual computer system or an arrangement of distributed computer systems. In the example of FIG. 31, the computer system 3101-1 can include one or more modules 3102, which may be or include processor-executable instructions, for example, executable to perform various tasks (e.g., receiving information, requesting information, processing information, simulation, outputting information, etc.).

A module may be executed independently, or in coordination with, one or more processors 3104, which is (or are) operatively coupled to one or more storage media 3106 (e.g., via wire, wirelessly, etc.). As an example, one or more of the one or more processors 3104 can be operatively coupled to at least one of one or more network interface 3107. In such an example, the computer system 3101-1 can transmit and/or receive information, for example, via the one or more networks 3109 (e.g., consider one or more of the Internet, a private network, a cellular network, a satellite network, etc.).

The computer system 3101-1 may receive from and/or transmit information to one or more other devices, which may be or include, for example, one or more of the computer systems 3101-2, etc. A device may be located in a physical location that differs from that of the computer system 3101-1. As an example, a location may be, for example, a processing facility location, a data center location (e.g., server farm, etc.), a rig location, a wellsite location, a downhole location, etc.

A processor may be or include a microprocessor, microcontroller, processor module or subsystem, programmable integrated circuit, programmable gate array, or another control or computing device.

The storage media 3106 may be implemented as one or more computer-readable or machine-readable storage media. As an example, storage may be distributed within and/or across multiple internal and/or external enclosures of a computing system and/or additional computing systems.

The system 3100 may also include drill plan module 3108 that may be used to perform at least a portion of one or more of the methods described herein.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

FIG. 32 shows components of a computing system 3200 and a networked system 3210 with a network 3220. The system 3200 includes one or more processors 3202, memory and/or storage components 3204, one or more input and/or output devices 3206 and a bus 3208. According to an embodiment, instructions may be stored in one or more computer-readable media (e.g., memory/storage components 3204). Such instructions may be read by one or more processors (e.g., the processor(s) 3202) via a communication bus (e.g., the bus 3208), which may be wired or wireless. The one or more processors may execute such instructions to implement (wholly or in part) one or more attributes (e.g., as part of a method). A user may view output from and interact with a process via an I/O device (e.g., the device 3206). According to an embodiment, a computer-readable medium may be a storage component such as a physical memory storage device, for example, a chip, a chip on a package, a memory card, etc.

According to an embodiment, components may be distributed, such as in the network system 3210. The network system 3210 includes components 3222-1, 3222-2, 3222-3, . . . 3222-N. For example, the components 3222-1 may include the processor(s) 3202 while the component(s) 3222-3 may include memory accessible by the processor(s) 3202. Further, the component(s) 3222-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method for generating a drilling plan for drilling a wellbore at a field, the method comprising:
   receiving data comprising one or more of:
      geological properties at the field;
      wellbore properties;
      drilling tool parameters;
      rig characteristics of drilling rigs; and
      working practices of a plurality of drilling crews;
   generating a plurality of candidate drilling plans for drilling the wellbore at the field;

estimating one or more outputs for the plurality of candidate drilling plans based at least partially upon the data, wherein the one or more outputs comprise an amount of greenhouse gas (GHG) emissions generated to drill the wellbore using respective candidate drilling plans of the plurality of candidate drilling plans; and presenting for selection one or more candidate drilling plans of the plurality of candidate drilling plans based at least partially upon the one or more outputs; and generating and transmitting a signal to cause a drilling apparatus to perform a wellsite action according to a selected drilling plan included in the plurality of candidate drilling plans, wherein the wellsite action includes at least one of initiating drilling at a selected location, varying a trajectory of the wellbore, varying a rate of penetration of a bottom hole assembly that is drilling the wellbore, varying a weight on a drill bit in the bottom hole assembly, varying a flow rate of a fluid pumped into the wellbore, or varying a composition of a fluid that is pumped into the wellbore.

2. The method of claim 1, wherein the data is associated with at least one of one or more first previously-drilled wellbores at the field or one or more second previously-drilled wellbores at one or more other fields.

3. The method of claim 1, wherein one or more of the geological properties, the wellbore properties, the drilling tool parameters, the rig characteristics, and the working practices is different for each of the plurality of candidate drilling plans.

4. The method of claim 1, wherein the one or more outputs also comprise at least one of a cost to drill the wellbore using the one or more candidate drilling plans of the plurality of candidate drilling plans or a time to drill the wellbore using the one or more of the plurality of candidate drilling plans.

5. The method of claim 1, wherein the rig characteristics comprise at least one of specifications of equipment on the drilling rigs, operating performance of the equipment, or the amount of GHG emissions generated by the equipment, and wherein the equipment produces at least a portion of the GHG emissions.

6. The method of claim 1, wherein the working practices comprise times when the plurality of drilling crews runs one or more generators, a number of the one or more generators that the plurality of drilling crews runs at each time, or both, and wherein the one or more generators produce at least a portion of the GHG emissions.

7. The method of claim 1, further comprising generating a visual display of the plurality of candidate drilling plans, the one or more outputs, or both.

* * * * *